US012234531B2

(12) United States Patent
Strelitz

(10) Patent No.: US 12,234,531 B2
(45) **Date of Patent: *Feb. 25, 2025**

(54) APPARATUS AND METHOD FOR PRODUCTION OF HIGH PURITY COPPER-BASED ALLOYS

(71) Applicant: Doggone Investment Co. LLC, Los Angeles, CA (US)

(72) Inventor: Timothy Frederick Strelitz, Long Beach, CA (US)

(73) Assignee: Doggone Investment Co. LLC, Dover, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/295,752

(22) Filed: Apr. 4, 2023

(65) Prior Publication Data

US 2023/0313340 A1 Oct. 5, 2023

Related U.S. Application Data

(60) Provisional application No. 63/387,076, filed on Dec. 12, 2022, provisional application No. 63/362,509, filed on Apr. 5, 2022.

(51) Int. Cl.

*C22C 1/02* (2006.01)
*C22C 9/00* (2006.01)
*F27B 3/22* (2006.01)
*F27B 14/04* (2006.01)
*F27B 14/06* (2006.01)

(Continued)

(52) U.S. Cl.

CPC .................. *C22C 1/02* (2013.01); *C22C 9/00* (2013.01); *F27B 3/22* (2013.01); *F27B 14/04* (2013.01); *F27B 14/061* (2013.01); *F27D 1/1626* (2013.01); *C22C 9/02* (2013.01); *C22C 9/04* (2013.01); *C22C 9/06* (2013.01);

(Continued)

(58) Field of Classification Search

CPC ........................................................ C22C 1/02
See application file for complete search history.

(56) References Cited

U.S. PATENT DOCUMENTS 2,674,639 A 4/1954 Stevenson
2,828,813 A 4/1958 Holden (Continued)

FOREIGN PATENT DOCUMENTS

CN 101274363 A 10/2008
CN 101708510 B 5/2011

(Continued)

OTHER PUBLICATIONS

CN-105603225-A, Zhao et al., machine translation (Year: 2016).*

(Continued)

*Primary Examiner* — John A Hevey
(74) *Attorney, Agent, or Firm* — Knobbe, Martens, Olson & Bear, LLP

(57) ABSTRACT

In an aspect, a method of manufacturing a high purity copper-based alloy comprises providing in a melting furnace a feedstock and melting the feedstock. The method additionally includes bubbling an inert gas into the molten copper-based alloy to form the high purity copper-based alloy. Aspects are also directed to an apparatus and a method of fabricating an apparatus for manufacturing the high purity copper-based alloy.

30 Claims, 20 Drawing Sheets

(51) Int. Cl.

| | |
|---|---|
| ***F27B 14/08*** | (2006.01) |
| ***F27D 1/16*** | (2006.01) |
| ***F27D 7/06*** | (2006.01) |
| ***H05B 6/02*** | (2006.01) |
| *C22C 9/02* | (2006.01) |
| *C22C 9/04* | (2006.01) |
| *C22C 9/06* | (2006.01) |

(52) U.S. Cl.
CPC *F27B 2014/0843* (2013.01); *F27D 2007/063* (2013.01); *H05B 6/02* (2013.01)

(56) References Cited

U.S. PATENT DOCUMENTS

| | | | | | |
|---|---|---|---|---|---|
| 3,053,525 | A | | 9/1962 | Leroy et al. | |
| 3,652,068 | A | * | 3/1972 | Truppe | C21C 5/4673 432/50 |
| 3,753,690 | A | | 8/1973 | Emley et al. | |
| 3,836,613 | A | | 9/1974 | Granitzki et al. | |
| 3,837,630 | A | | 9/1974 | Kohl et al. | |
| 3,938,790 | A | | 2/1976 | Knuppel et al. | |
| 4,222,782 | A | | 9/1980 | Alliegro et al. | |
| 4,272,062 | A | | 6/1981 | Fuziwara et al. | |
| 4,331,471 | A | | 5/1982 | Langenfeld et al. | |
| 4,340,208 | A | | 7/1982 | Vayssiere et al. | |
| 4,353,534 | A | | 10/1982 | Janssen et al. | |
| 4,468,012 | A | | 8/1984 | Daussan et al. | |
| 4,705,563 | A | | 11/1987 | Poeppel et al. | |
| 4,762,305 | A | | 8/1988 | Rice | |
| 4,935,390 | A | | 6/1990 | Horiuchi et al. | |
| 4,960,738 | A | | 10/1990 | Hori et al. | |
| 4,973,433 | A | | 11/1990 | Gilbert et al. | |
| 4,989,218 | A | | 1/1991 | Tateno | |
| 5,007,366 | A | | 4/1991 | Handler | |
| 5,037,471 | A | | 8/1991 | Iwamura et al. | |
| 5,143,355 | A | | 9/1992 | Iwamura et al. | |
| 5,180,423 | A | | 1/1993 | Marcuson et al. | |
| 5,198,179 | A | * | 3/1993 | Bates | B22D 1/005 266/217 |
| 5,241,560 | A | | 8/1993 | Omori et al. | |
| 5,257,280 | A | | 10/1993 | Mimura et al. | |
| 5,465,943 | A | * | 11/1995 | Rinnhofer | C21C 5/5217 266/275 |
| 5,495,495 | A | | 2/1996 | Cullan | |
| 6,180,183 | B1 | | 1/2001 | Wentland et al. | |
| 6,231,641 | B1 | * | 5/2001 | Utigard | C22B 15/003 75/643 |
| 6,245,287 | B1 | | 6/2001 | Kokubo et al. | |
| 6,309,211 | B1 | | 10/2001 | Dock et al. | |
| 7,524,356 | B2 | | 4/2009 | Asao et al. | |
| 11,851,730 | B2 | * | 12/2023 | Strelitz | F27B 14/061 |
| 11,993,828 | B2 | * | 5/2024 | Strelitz | C22C 1/02 |
| 2004/0100004 | A1 | * | 5/2004 | Willoughby | B22D 1/005 266/286 |
| 2004/0248739 | A1 | | 5/2004 | Willoughby et al. | |
| 2008/0078484 | A1 | | 4/2008 | Johns | |
| 2009/0000288 | A1 | | 1/2009 | DeVoe | |
| 2009/0165902 | A1 | * | 7/2009 | Yoshida | C22C 9/00 148/414 |
| 2010/0044002 | A1 | | 2/2010 | Leffew | |
| 2013/0276680 | A1 | | 10/2013 | Piret et al. | |
| 2014/0248739 | A1 | * | 9/2014 | Bakke | H01L 21/67098 438/795 |
| 2014/0369883 | A1 | | 12/2014 | Ito et al. | |
| 2019/0113282 | A1 | | 4/2019 | Feiner et al. | |
| 2023/0349026 | A1 | | 11/2023 | Strelitz | |

FOREIGN PATENT DOCUMENTS

| | | | | | |
|---|---|---|---|---|---|
| CN | 202322062 | U | | 11/2012 | |
| CN | 103658567 | A | | 3/2014 | |
| CN | 105603225 | A | * | 5/2016 | C22C 1/02 |
| DE | 1807001 | A1 | | 5/1970 | |
| EP | 1 260 289 | A1 | | 11/2002 | |
| EP | 1 750 075 | A1 | | 2/2007 | |
| FR | 1246828 | A | | 11/1960 | |
| FR | 2671563 | A1 | | 7/1992 | |
| GB | 671678 | A | | 5/1952 | |
| JP | H03285739 | A | | 12/1991 | |
| KR | 101965768 | B1 | * | 4/2019 | |

OTHER PUBLICATIONS

KR-101965768-B1, Kim et al., machine translation. (Year: 2019).*
Teshigawara et al., "A Shaft Furnace Line for Producing Oxygen-Free Copper for Electron Devices Applications", Furukawa Review, No. 25, 2004, pp. 53-58.
Uceda et al., "Electrochemical evaluation of Copper deposition with gas sparging", Journal of Applied Electrochemistry, vol. 20, 1990, pp. 327-334.
Zavertkin, "Use of Vein Quartz For Lining Induction Furnaces During Melting Copper-Based Alloys", Refractories and Industrial Ceramics, vol. 60, Issue 5, Jan. 2020, pp. 468-471.
Andreini, et al., Characterization of Gas Bubbles Injected into Molten Metals Under Laminar Flow Conditions, Metallurgical Transactions, vol. 8B (Dec. 1977).
Campbell, The Mechanisms of Metallurgical Failure The Origin of Fracture, ISBN: 978-0-12-822411-3.
Copper Development Association Inc., Copper Alloy Data Sheet C96400.
Copper Development Association Inc., Copper Alloy Data Sheet C99500.
Copper Development Association Inc., Copper Alloy Data Sheet C89833.
Copper Development Association Inc., Copper Alloy Data Sheet C87850.
Friedrich, et al., Melt treatment of Copper and Aluminium—The complex step before casting, IME Process Metallurgy and Metal Recycling RWTH Aachen.
Hornby, Spal Process: Inert Atmosphere Protection of Molten Metal, ResearchGate, Article (Mar. 1988).
International Search Report and Written Opinion dated Aug. 4, 2023 in Application No. PCT/US2023/017481 in 14 pages.
International Search Report and Written Opinion dated Aug. 11, 2023 in Application No. PCT/US2023/017483 in 18 pages.
International Search Report and Written Opinion dated Aug. 4, 2023 in Application No. PCT/US2023/017487 in 19 pages.
Total Materia, Melting and Casting of Copper and Aluminum Alloys: Part One, Total Materia(totalmateria.com) (Published Jul. 2008).
Saint-Gobain Ceramics, Technical Bulletin, Norton® Dry Vibration Refractory VK-132, Refractor Material Data Sheet.
Shabestari, et al., Metallurgy Effect of process variables in rotary degassing of aluminum, ResearchGate, Article in CIM Bulletin (Feb. 2021).
International Search Report and Written Opinion dated Jul. 3, 2024 in Application No. PCT/US2024/022896 in 18 pages.
International Search Report and Written Opinion dated Aug. 27, 2024 in Application No. PCT/US2024/022892 in 21 pages.

* cited by examiner

APPARATUS AND METHOD FOR PRODUCTION OF HIGH PURITY COPPER-BASED ALLOYS

CROSS-REFERENCE TO RELATED APPLICATIONS

This application claims the benefit of priority to U.S. Provisional Patent Application No. 63/362,509, filed Apr. 5, 2022, and to U.S. Provisional Patent Application No. 63/387,076, filed Dec. 12, 2022. The content of each of these applications is hereby incorporated by reference herein in its entirety.

BACKGROUND

Field

The disclosed technology relates generally to apparatuses and methods for manufacturing copper-based alloys, and more particularly to apparatuses for manufacturing high purity copper-based alloys with reduced impurities.

Description of the Related Art

Copper can be alloyed with various elements to possess various properties of utility, including high toughness, high ductility, high thermal conductivity, high electrical conductivity and high corrosion resistance, to name a few. Because of these properties, copper-based alloys find many applications. For example, some copper-based alloys find uses in electrical components, fittings, locks, door handles, etc. Other copper-based alloys find uses in architecture, springs, connectors, terminals etc. Some uses of copper-based alloys demand improved mechanical and chemical properties.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

In one aspect, an apparatus for manufacturing a copper-based alloy comprises an enclosed melting furnace configured to form a molten copper-based alloy comprising at least 50 weight % copper under an enclosed inert atmosphere and to bubble an inert gas through the molten copper-based alloy. The apparatus additionally comprises a transfer ladle configured to receive the molten copper-based alloy from the melting furnace under the enclosed inert atmosphere and to transfer the molten copper-based alloy into one or more molds or a shot pit configured to solidify the molten copper-based alloy.

In another aspect, an apparatus for manufacturing a copper-based alloy comprises an enclosed melting furnace configured to form a molten copper-based alloy comprising at least 50 weight % copper under an enclosed inert atmosphere and to bubble an inert gas through the molten copper-based alloy. The apparatus additionally comprises a transfer ladle configured to receive the molten copper-based alloy from the melting furnace through a velocity control element, and to transfer the molten copper-based alloy into one or more molds or a shot pit configured to solidify the molten copper-based alloy.

In another aspect, a method of manufacturing a copper-based alloy comprises providing in a melting furnace a plurality of feedstock pieces having a combined composition configured to form a molten copper-based alloy comprising at least 50 weight % copper. The method additionally includes flowing an inert gas through gaps between the feedstock pieces prior to heating and heating the feedstock pieces while flowing the inert gas therethrough, thereby melting the feedstock pieces to form the molten copper-based alloy. The method additionally includes bubbling the inert gas through the molten copper-based alloy. The method further includes transferring the molten copper-based alloy into a transfer ladle.

In another aspect, a method of manufacturing a copper-based alloy comprises providing in a melting furnace a plurality of feedstock pieces having a combined composition configured to form a molten copper-based alloy comprising at least 50 weight % copper. The method additionally includes heating the feedstock pieces to form the molten copper-based alloy. The method additionally includes bubbling the inert gas through the molten copper-based alloy. The method further includes transferring the molten copper-based alloy into a transfer ladle. One or more of heating the feedstock pieces, bubbling the inert gas and transferring the molten copper-based alloy is performed at least partly under an enclosed inert atmosphere configured to substantially exclude outside ambient air from mixing with the enclosed inert atmosphere.

In another aspect, a method of manufacturing a copper-based alloy comprises providing in a melting furnace a plurality of feedstock pieces having a combined composition configured to form a molten copper-based alloy comprising at least 50 weight % copper. The method additionally includes heating the feedstock pieces to form the molten copper-based alloy. The method additionally includes bubbling the inert gas through the molten copper-based alloy. The method further includes transferring the molten copper-based alloy into a transfer ladle, wherein transferring comprises limiting a velocity of the molten copper-based alloy that is transferred from the melting furnace to the transfer ladle to less than 100 in/sec.

In another aspect, an apparatus for manufacturing a copper-based alloy comprises a melting furnace configured to form a molten copper-based alloy comprising at least 50 weight % copper. The melting furnace comprises a diffusive lining comprising an aluminum-silicate ceramic having a porous structure adapted for bubbling an inert gas through the molten copper-based alloy.

In another aspect, an apparatus for manufacturing a copper-based alloy comprises a melting furnace configured to form a molten copper-based alloy comprising at least 50 weight % copper. The melting furnace comprises a diffusive lining substantially covering a bottom inner surface thereof and having a porous structure adapted for bubbling an inert gas into the molten copper-based alloy.

In another aspect, an apparatus for manufacturing a copper-based alloy comprises a melting furnace configured to form a molten copper-based alloy comprising at least 50 weight % copper. The melting furnace comprises a diffusive lining having a porous structure. The diffusive lining is formed on at least two different inner surfaces of the melting furnace such that the diffusive lining is adapted for bubbling an inert gas into the molten copper-based alloy from the at least two different inner surfaces.

In another aspect, a method of manufacturing an apparatus for fabricating a copper-based alloy comprises providing a melting furnace chamber configured to form a molten copper-based alloy comprising at least 50 weight % copper. The method additionally comprises forming a diffusive lining on an inner surface of the melting furnace chamber, the diffusive lining comprising an aluminum-silicate ceramic material having a porous structure adapted for bubbling an inert gas through the molten copper-based alloy.

In another aspect, a method of manufacturing an apparatus for fabricating a copper-based alloy comprises providing a melting furnace chamber configured to form a molten copper-based alloy comprising at least 50 weight % copper. The method additionally comprises forming a diffusive lining substantially covering a bottom inner surface of the melting furnace and having a porous structure adapted for bubbling an inert gas into the molten copper-based alloy.

In another aspect, a method of manufacturing an apparatus for fabricating a copper-based alloy comprises providing a melting furnace chamber configured to form a molten copper-based alloy comprising at least 50 weight % copper. The method additionally comprises forming a diffusive lining having a porous structure on at least two different inner surfaces of the melting furnace such that the diffusive lining is adapted for bubbling an inert gas into the molten copper-based alloy from the at least two different inner surfaces.

In another aspect, a method of manufacturing an apparatus for fabricating an alloy comprises providing a melting furnace chamber and disposing a compacted powder layer on an inner surface of the melting furnace chamber. The compacted powder comprises a mixture of silica and alumina. The method additionally comprises sintering the compacted powder in the melting furnace to form a diffusive lining on the inner surface. The diffusive lining comprises an aluminum-silicate ceramic material having a porous structure adapted for diffusing gas therethrough.

In another aspect, a method of manufacturing an apparatus for fabricating an alloy comprises providing a melting furnace chamber and disposing a compacted powder layer on an inner surface of the melting furnace chamber. The method additionally comprises selectively sintering a surface portion of the compacted powder, thereby forming a diffusive lining on the inner surface comprising a sintered ceramic layer on an unsintered ceramic layer.

In another aspect, a method of manufacturing an apparatus for fabricating an alloy comprises providing a melting furnace chamber and disposing a compacted powder layer on an inner surface of the melting furnace chamber. The method additionally comprises sintering the compacted powder using heat from a heated material disposed in the melting furnace chamber, thereby forming a diffusive lining on the inner surface.

In another aspect, a method of manufacturing a copper-based alloy comprises providing in a melting furnace a feedstock having a composition configured to form a molten copper-based alloy comprising at least 50 weight % copper and heating the feedstock to melt the feedstock to form the molten copper-based alloy. The method additionally includes bubbling an inert gas into the molten copper-based alloy using a diffusive lining formed on an inner surface of the melting furnace chamber. The diffusive lining comprises an aluminum-silicate ceramic material having a porous structure adapted for bubbling the inert gas through the molten copper-based alloy.

In another aspect, a method of manufacturing a copper-based alloy comprises providing in a melting furnace a feedstock having a composition configured to form a molten copper-based alloy comprising at least 50 weight % copper and heating the feedstock to melt the feedstock to form the molten copper-based alloy. The method additionally includes bubbling an inert gas through the molten copper-based alloy using a diffusive lining formed in the melting furnace chamber. The diffusive lining substantially covers a bottom inner surface of the melting furnace and having a porous structure adapted for bubbling the inert gas into the molten copper-based alloy.

In another aspect, a method of manufacturing a copper-based alloy comprises providing in a melting furnace a feedstock having a composition configured to form a molten copper-based alloy comprising at least 50 weight % copper and heating the feedstock to melt the feedstock to form the molten copper-based alloy. The method additionally includes bubbling an inert gas through the molten copper-based alloy using a diffusive lining having a porous structure. The diffusive lining is formed on at least two different inner surfaces of the melting furnace such that the diffusive lining is adapted for bubbling the inert gas into the molten copper-based alloy from the at least two different inner surfaces.

DETAILED DESCRIPTION

Figure 1:
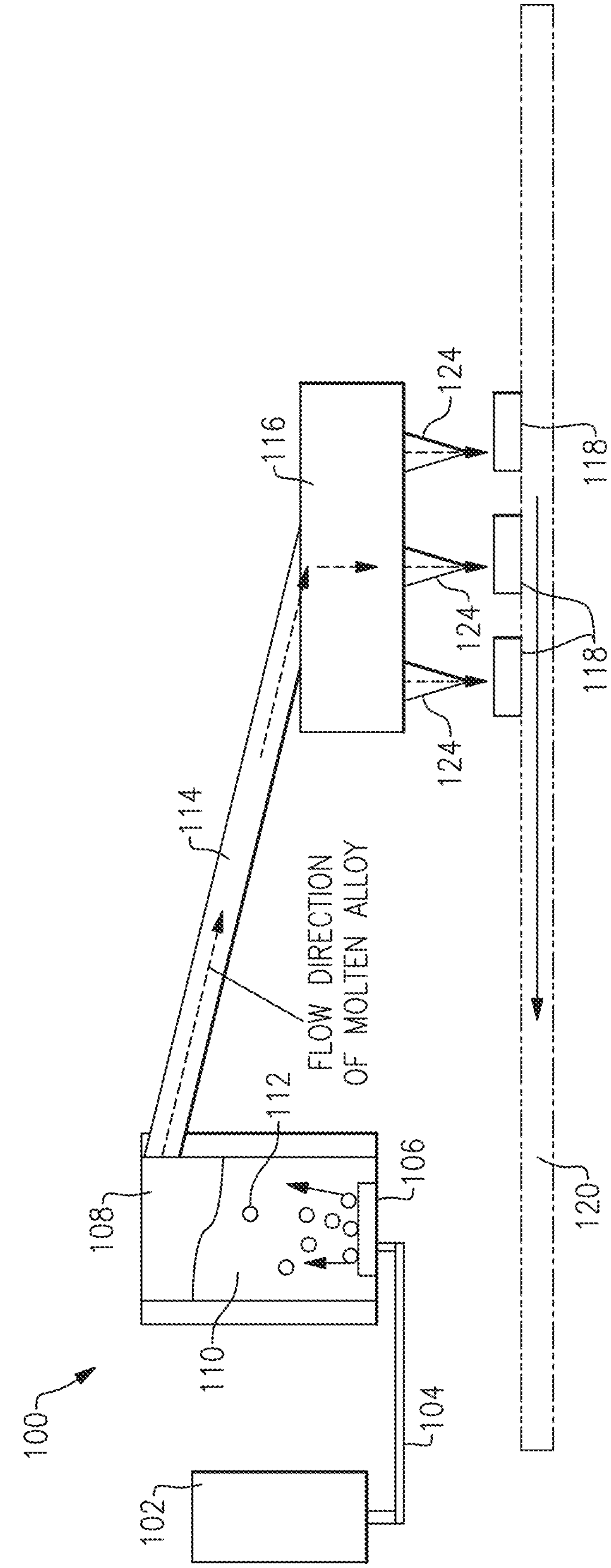
FIG. 1 is a schematic illustration of an apparatus for manufacturing a copper-based alloy having low impurity content, according to some embodiments.

The present disclosure may be understood by reference to the following detailed description. It is noted that, for purposes of illustrative clarity, certain elements in various drawings may not be drawn to scale, may be represented schematically or conceptually, or otherwise may not correspond exactly to certain physical configurations of embodiments.

Various impurities in copper-based alloys can degrade advantageous properties thereof. The presence of various unwanted impurities in various components formed of copper-based alloys can be caused by the presence of these impurities in the feedstock material, such as copper-based turnings, e.g., copper-based alloy scrap. For example, various impurities in copper-based turnings or copper-based alloy scrap that serve as feedstock materials can negatively affect the mechanical and chemical properties of the cast copper-based components and can lead to high failure rates during fixture casting as well as shorter life expectancy of the components, which in turn leads to higher replacement cost. This increased failure rate can lead to increased production cost for copper-based components, e.g., copper-based fixtures such as water fixtures. Thus, there is a need for improved apparatuses and methods for reducing the impurity content in copper feedstock materials, and thereby limiting the incorporation of impurities into final products. Thus, there is a need for technologies for manufacturing copper-based alloys, e.g., copper-based ingots or copper-based shot, with low levels of impurities for improved mechanical properties, while also moderating cost, improving casting efficiency and increasing component lifetime simultaneously.

The inventors have discovered that oxygen and oxygen-related defects can be particularly detrimental to copper-based alloys. Oxygen-related defects include, e.g., trapped oxygen-containing voids or pockets as well as oxides in the copper-based alloys. Without being bound to any theory, such oxygen-containing void or pocket formation can be caused by relatively high amounts of oxygen that become dissolved in a molten copper-based alloy. For example, as the molten copper-based alloy cools to solidify, the solubility of oxygen in the copper-based alloy decreases, leading to nucleation of oxygen-containing voids or pockets therein. Thus formed voids or pockets that do not escape to the atmosphere become trapped in the solidified copper-based alloy, leading to voids and pores that can in turn lead to degradation of mechanical properties such as yield strength and toughness. In particular, the oxygen-containing voids or pockets can serve as stress concentration centers that serve as initiation locations for fracture. Other oxygen-related impurities can include oxygen compounds, such as copper oxides, which may precipitate in the copper-based alloy to degrade the mechanical properties thereof.

The inventors have discovered that, in order to effectively reduce oxygen and oxygen-related impurities in copper-based alloys, oxygen content should be reduced from the copper-based alloy starting with the melting process and in the molten state. In addition, after forming the molten copper-based alloy with reduced oxygen content, oxygen and oxygen-related impurities should be prevented from being introduced or re-introduced thereinto, prior to solidification. Thus, to improve the mechanical properties of copper-based alloys, e.g., by reducing the oxygen content thereof, the disclosed embodiments relate to an apparatus and method for reducing oxygen content starting with the melting process and in the molten copper-based alloy, and preserving the low oxygen content through the solidification process including transferring to a mold. According to various embodiments, the apparatus for manufacturing a copper-based ingot or copper-based shot comprises an enclosed melting furnace configured to form a molten copper-based alloy under an enclosed inert atmosphere and to bubble an inert gas through the molten copper-based alloy. The apparatus additionally comprises a transfer ladle configured to receive the molten copper-based alloy from the melting furnace under the enclosed inert atmosphere and to transfer the molten copper-based alloy into one or more molds, e.g., an ingot mold or a component mold, configured to solidify the molten copper-based alloy, e.g., into a copper-based ingot or copper-based component. The transfer ladle may be configured to receive the molten copper-based alloy from the melting furnace through a velocity control element. The transfer ladle may also be configured to transfer the molten copper-based alloy into a shot pit configured to solidify the molten copper-based alloy into shot. The transfer ladle may be enclosed or not enclosed, depending on the tolerance for the amount of oxygen and oxygen-related impurities in the solidified copper alloy. As described herein, bubbling an inert gas through a molten alloy may be referred to as sparging. The furnace according to the disclosure may provide for reduced impurity content in copper-based alloys and components made thereof, e.g., ingots, shots, or components such as fixtures, which may be attributed to the sparging of the molten copper-based alloy within the furnace as described herein. By reducing the oxygen and oxygen-related impurity content in copper-based alloys and components made thereof, in particular by reducing the amount of oxygen or oxygen-related impurities by sparging, certain mechanical properties of the copper can be improved, including tensile strength and ductility.

According to various embodiments, a sparging furnace comprises a melting furnace which is configured to melt a copper-based feedstock. The melting furnace is configured to flow an inert gas through the feedstock material prior to melting and during heating, and to bubble an inert gas through the molten alloy within the melting furnace through, e.g., a diffuser. The melting furnace may be under an atmosphere of the inert gas. As configured, bubbling an inert gas through the molten copper-based alloy can entrain unwanted impurities and remove them from the molten copper-based alloy. The unwanted impurities may include, but not limited to, e.g., oxygen or oxygen-related impurities. As described herein, oxygen or oxygen-related impurities include bound and unbound oxygen such as atomic oxygen (O), molecular oxygen (02, 03) and any compound formed with or by oxygen including, without limitation, water, metal and non-metal hydroxides, metal and non-metal oxy-hydrides and metal and non-metal oxides. After being entrained by the inert gas, unwanted oxygen-related impurities, e.g., oxides, may form a slag layer or islands on top of the molten copper-based alloy. The slag layer may be removed from the melt, thereby removing oxide impurities from the molten alloy.

The inventors have found that thus configured sparging furnace effectively removes impurities including oxygen and oxygen-related impurities from the molten copper-based alloy. As described herein, while impurity removal may be descried in the context of removing oxygen-related impurities, it will be appreciated that embodiments are not so limited, and other impurities can be removed in a similar manner. Without being bound to any theory, sparging removes impurities such as oxygen from the molten alloy in accordance with Henry's Law, which states that, under equilibrium, the concentration of a gas in a liquid is proportional to the partial pressure of that gas in contact with the liquid. In accordance with Henry's Law, because the inert gas bubbles initially contain no oxygen, as they pass through the molten alloy, the oxygen dissolved in the molten alloy is removed therefrom and forms a gas mixture with the inert gas before escaping the alloy into the surrounding atmosphere. Moreover, oxide particles and other oxygen-related impurities may be removed through electrostatic forces. Without being bound to any theory, when small inert gas bubbles travel through the molten alloy, small oxide particles and oxygen-related impurities can adhere to the inert gas bubbles via electrostatic forces. Removing oxygen or oxygen-related impurities with inert gas bubbling may be preferable to methods that rely on chemical reactions between a reactive element, e.g., a reducing gas and oxygen or oxygen-related impurities in the molten copper-based alloy. Powerful reducing gases may not be suitable for some manufacturing facilities, as they may pose an increased risk to workers and necessitate heightened safety precautions. In addition, while some elements serve as deoxidizers, e.g., Zr, there may be a need to reduce the amount used during processing, e.g., to reduce the cost of manufacturing. The inventors have found that removing and suppressing impurities including oxygen and oxygen-related impurities from the molten alloy as described herein according to embodiments is correlated to improved mechanical performance of cast copper-based alloys, ingots, or copper-based shot.

The inventors have further found that, once a molten alloy with low impurities content, e.g., low oxygen content, is thus formed, the impurities including oxygen and oxygen-related impurities should be prevented from being reintroduced into the molten alloy. To this end, in some embodiments, the melting furnace is enclosed and disposed under an atmosphere of the inert gas. A controlled atmosphere can effectively prevent or reduce the reintroduction of oxygen or oxygen-related impurities into the metal alloy. However, embodiments are not so limited, and where some reintroduction of oxygen or oxygen-related impurities can be tolerated, or where inert gas can be flushed though the system at a high enough flow rate to substantially suppress outside air from mixing with the inert atmosphere inside the melting furnace, the melting furnace can be open to the surrounding atmosphere.

The inventors have further found that, as the molten alloy is transferred from the furnace to a transfer ladle, the velocity thereof should be carefully controlled to reduce any excessive turbulence, which can also lead to reintroduction of impurities such as oxygen or oxygen-related impurities including any slag that may have formed at the surface of the molten alloy, back into the molten alloy. Thus, according to some embodiments, a velocity control device, e.g. a ramp or launder, connects the melting furnace to a transfer ladle. The velocity control device is configured to transfer the copper-based alloy to a transfer ladle without excessive turbulence and entrainment of atmospheric gasses, including oxygen, or other oxygen-related impurities, including oxides, which may be present in the system.

The inventors have further found that, to further reduce or effectively prevent reintroduction of impurities including oxygen or oxygen-related impurities into the molten alloy, the transfer conduit between the melting furnace and the transfer ladle, and optionally the transfer conduit between the transfer ladle and the molds, can be at least partially enclosed and disposed under an inert atmosphere. Thus, in some embodiments, the transfer ladle is at least partially encapsulated and configured to receive molten copper-based alloy from the velocity control device. In some embodiments, the transfer ladle and the velocity control device may be enclosed under a common inert atmosphere as the melting furnace. In some embodiments, the transfer ladle is configured to transfer, e.g. inject or pour, the molten copper-based alloy into molds, e.g., ingot molds or component molds. After being poured in the molds, the sparged molten copper-based alloy may cool and harden into sparged copper-alloy in a solid form.

Figure 1A:
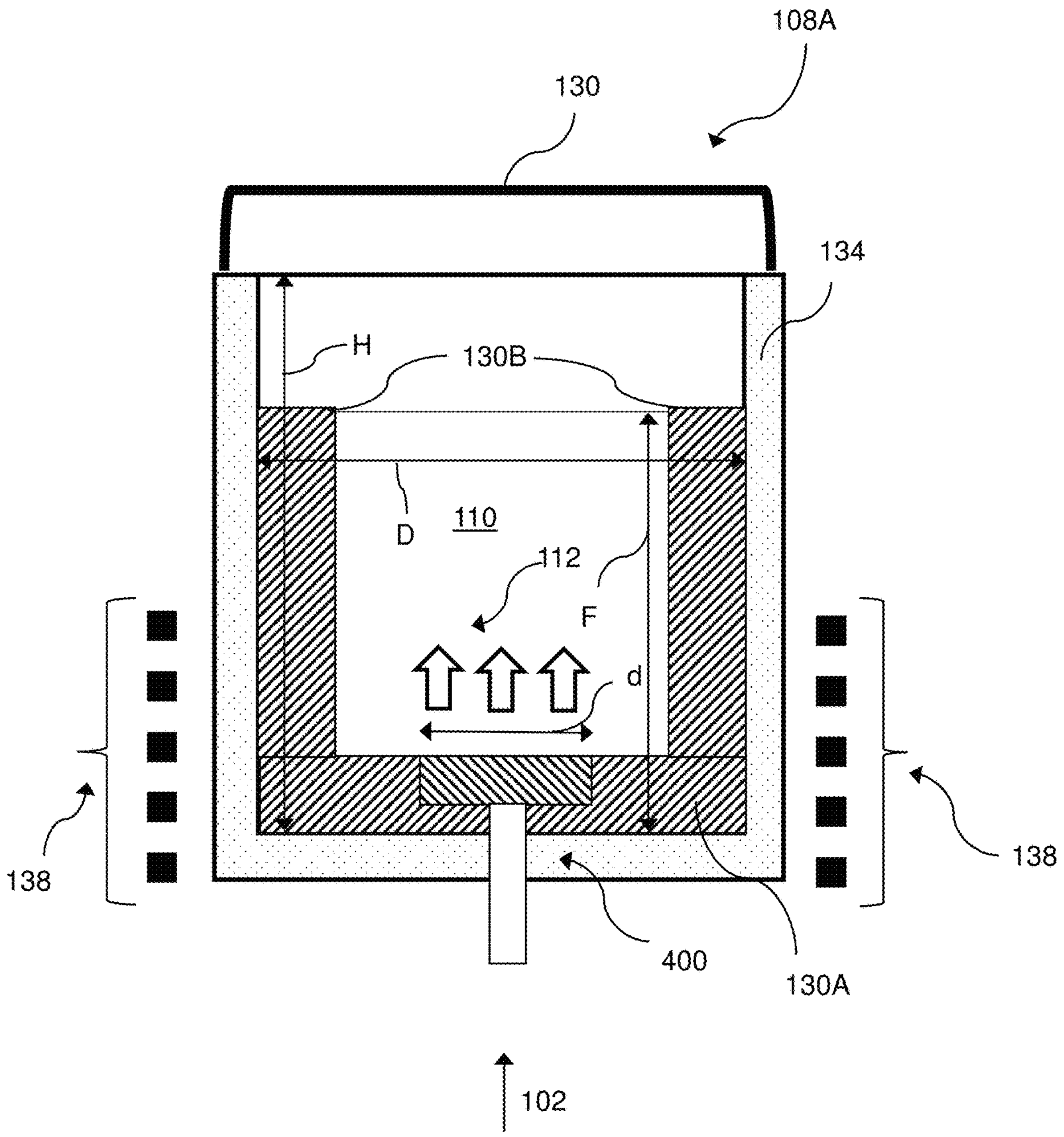
FIG. 1A is a schematic side view illustration of an enclosed configuration of a melting furnace for manufacturing a copper-based alloy, according to some embodiments.
Figure 1B:
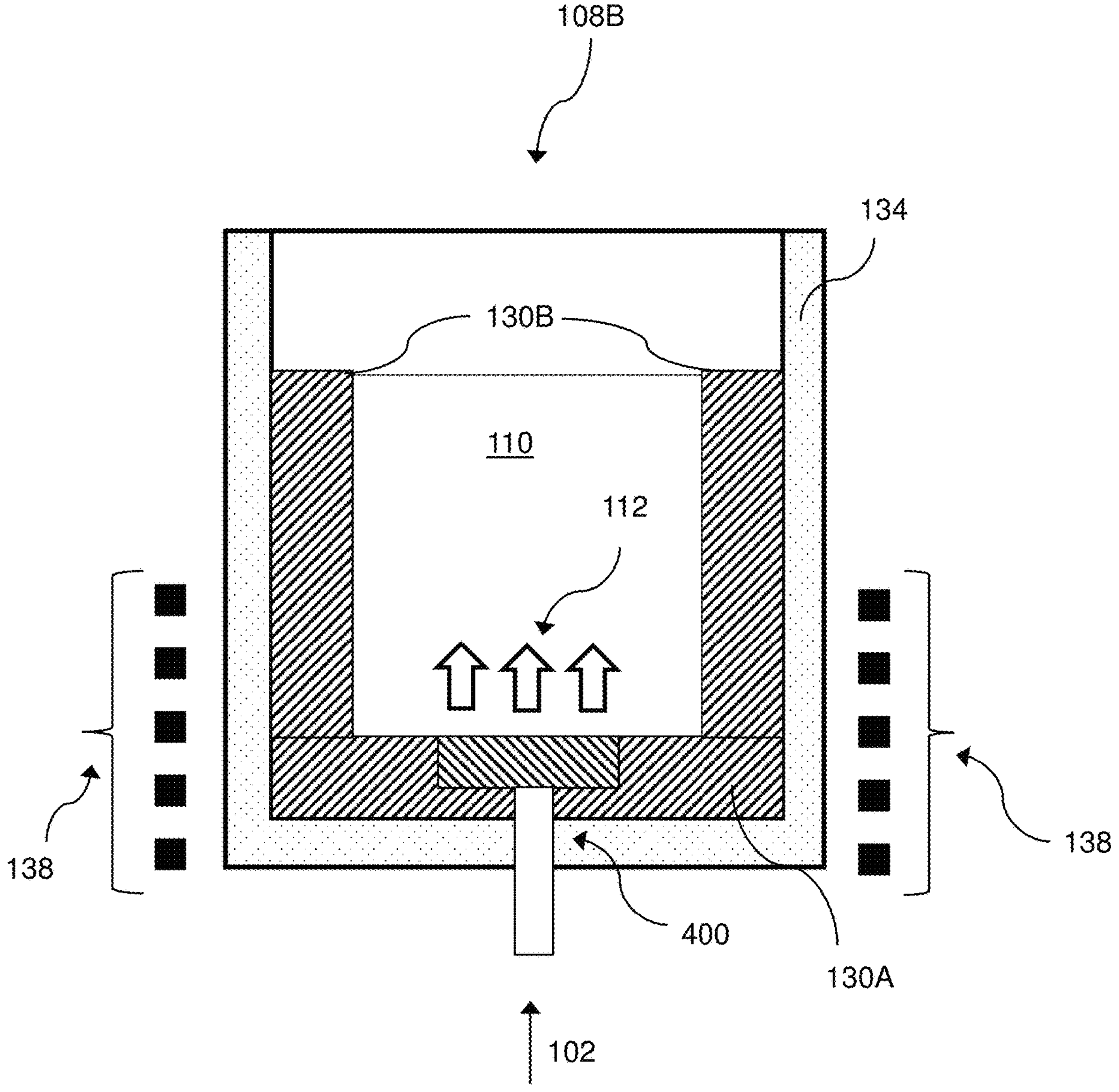
FIG. 1B is a schematic side view illustration of an open configuration of a melting furnace for manufacturing high purity copper-based alloys, according to some embodiments.
Figure 2:
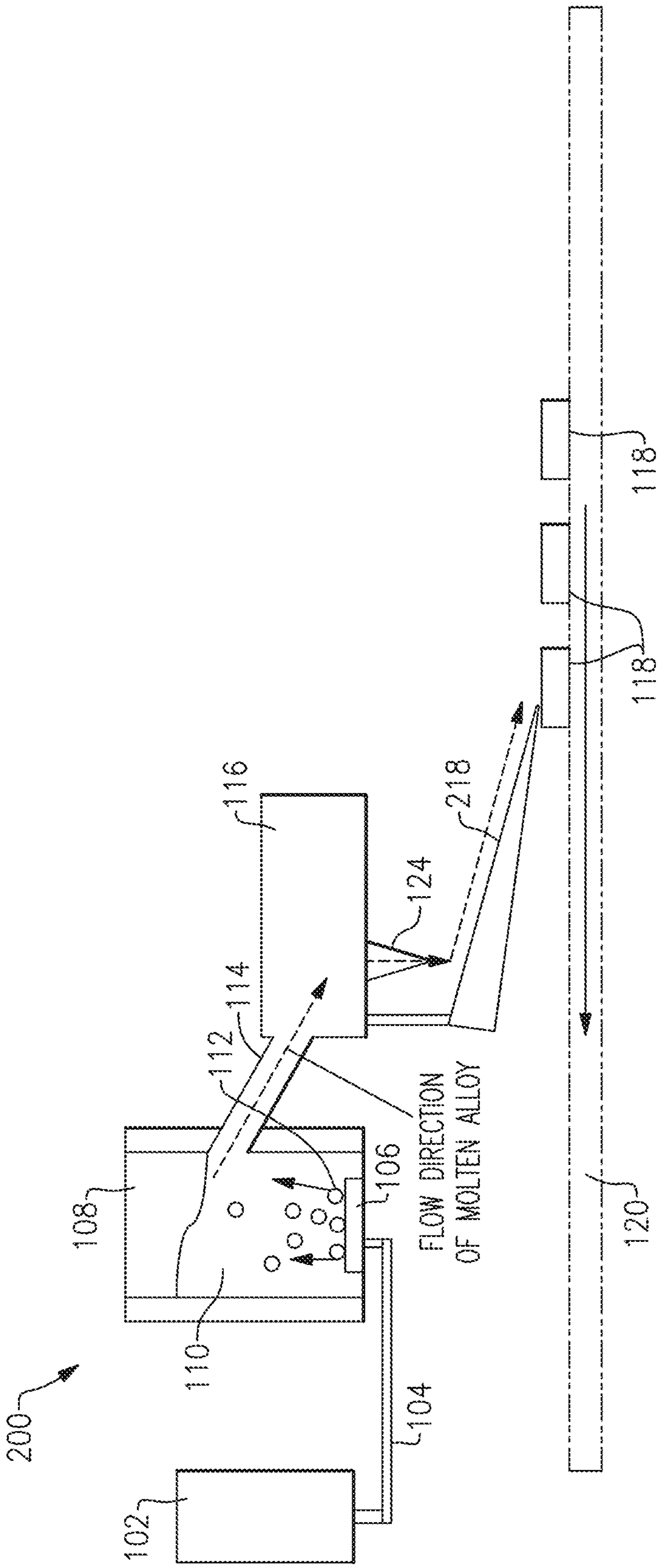
FIG. 2 is a schematic illustration of an apparatus for manufacturing a copper-based alloy having low impurity content, according to some other embodiments.
Figure 5:
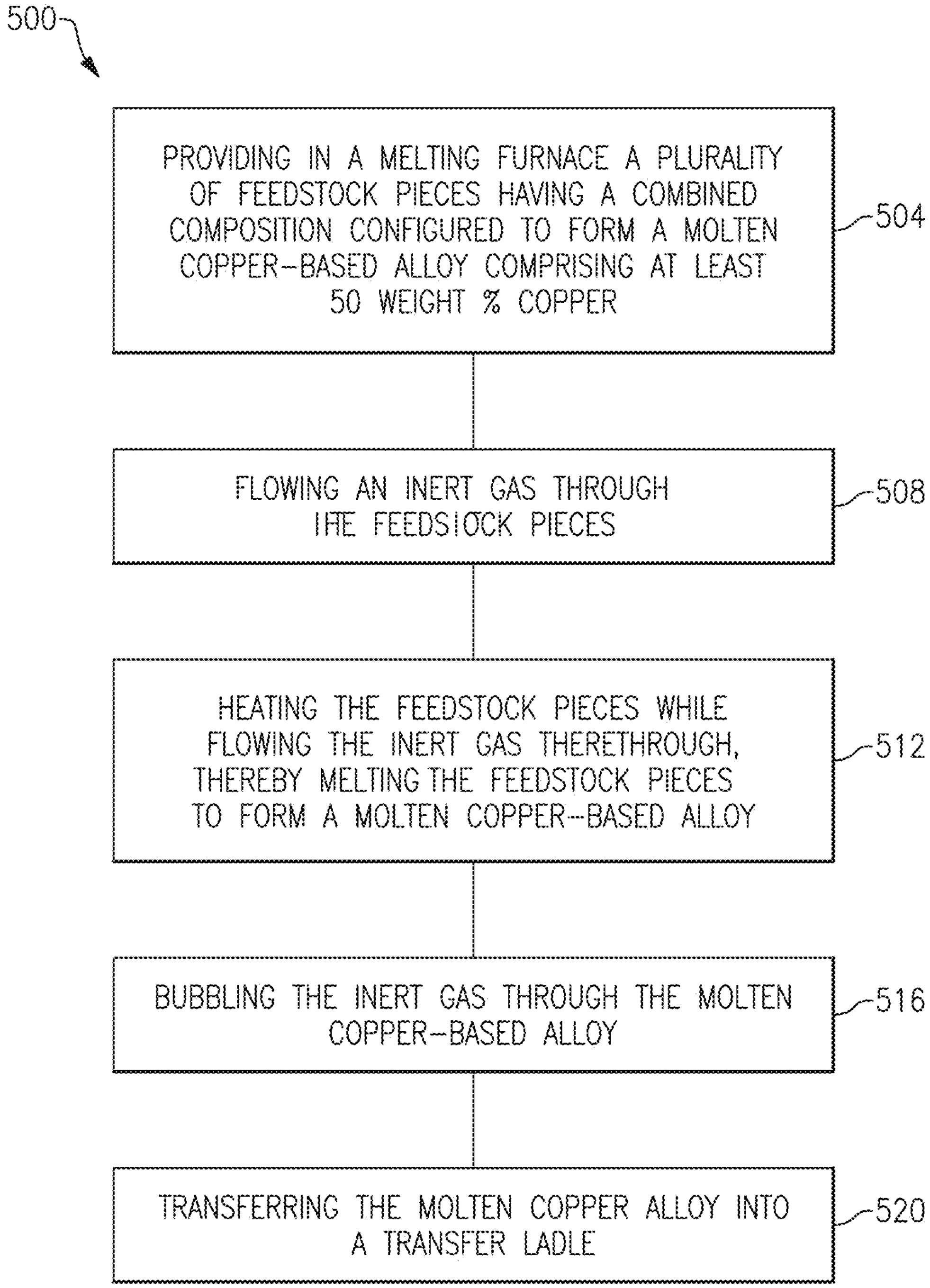
FIG. 5 illustrates method of manufacturing a copper-based alloy having low impurity content, according to embodiments.

Systems and Methods for Manufacturing High Purity Copper-Based Alloys Using Inert Gas FIGS. 1-3 illustrate furnace systems configured for manufacturing a copper-based alloy with reduced impurity content, including oxygen or oxygen-related impurities content, according to various embodiments disclosed herein. FIGS. 1A and 1B illustrate two different configurations of a melting furnace of the furnace systems for manufacturing a copper-based alloy, according to some embodiments. FIG. 5 illustrates a method of manufacturing a copper-based alloy using one of the furnace systems illustrated in FIGS. 1-3, according to embodiments. Each of the furnace systems 100, 200 and 300 illustrated in FIGS. 1, 2 and 3, respectively, comprises a melting furnace, which can be in an enclosed configuration (FIG. 1A) or an open configuration (FIG. 1B). Each of the melting furnaces 108A (FIG. 1A), 108B (FIG. 1B) is configured to form a molten copper-based alloy comprising at least 50 weight % copper, to flow inert gas through the feedstock prior to melting and during heat up, and to bubble an inert gas through the molten copper-based alloy. Each of the furnace systems 100, 200 and 300 additionally comprises a transfer ladle configured to receive the molten copper-based alloy from the melting furnace and to transfer the molten copper-based alloy into one or more molds or a shot pit configured to solidify the molten copper-based alloy.

Using any one of the furnace systems 100, 200 and 300, the method 500 illustrated in FIG. 5 can be performed. The method 500 of manufacturing a copper-based alloy comprises providing 504 in a melting furnace a plurality of feedstock pieces having a combined composition configured to form a molten copper-based alloy comprising at least 50 weight % copper. The method 500 additionally comprises flowing 508 an inert gas through gaps between feedstock pieces and heating 512 the feedstock pieces while flowing the inert gas therethrough, thereby melting the feedstock pieces to form a molten copper-based alloy. The method 500 additionally comprises bubbling 516 the inert gas through the molten copper-based alloy. The method 500 further comprises transferring 520 the molten copper-based alloy into a transfer ladle. In the following, details of the furnace systems 100, 200 and 300 illustrated in FIGS. 1, 2 and 3 are described along with the method 500 illustrated in FIG. 5.

FIG. 1 is a schematic view of a sparging furnace system 100 for manufacturing a copper-based alloy, e.g., an ingot, ingot shot, or copper-based component, having low impurity content including oxygen or oxygen-related impurities, according to one embodiment. The sparging furnace system 100 includes a melting furnace 108, which can be configured as an enclosed melting furnace 108A (FIG. 1A) or an open melting furnace 108B (FIG. 1B). As disclosed herein, unless indicated contrariwise, a reference made to the melting furnace 108 will be understood to apply to one or both of the melting furnaces 108A FIG. 1A), 108B (FIG. 1B).

The melting furnace 108 is connected to a gas supply 102 via a gas line 104 and a diffuser 106. Referring to FIGS. 1A and 1B, the melting furnace 108 is enclosed by a chamber wall 134. The melting furnace 108 comprises a refractory lining 130A, 130B comprising a suitable refractory material at least at inner surfaces thereof. The refractory lining 130A lines a bottom inner surface of the melting furnace 108 and the refractory lining 130B lines a sidewall surface of the melting furnace 108. When the melting furnace 108 is an enclosed melting furnace 108A, the melting furnace 108A further incudes a lid 130. As shown in FIG. 1, the melting furnace 108 includes an opening for transferring out the molten copper-based alloy 110. For example, in FIG. 1, the opening is disposed at an upper portion of the melting furnace 108. The opening may be connected to a channel, e.g., a velocity control element 114. The diffuser 106 is configured to bubble an inert gas through a molten copper-based alloy 110 formed in the melting furnace 108. The diffuser 106 has a surface area that covers a portion of a cross-sectional area of the molten copper-based alloy 110 formed in the melting furnace 108, thereby removing impurities in the path of bubbles passing through the cross-sectional area. The melting furnace 108 is configured to produce the molten copper-based alloy 110 from a copper-based feedstock material. As an inert gas flows through the diffuser 106, it forms gas bubbles 112 that pass through the molten copper-based alloy 110. The gas bubbles 112 pass through the molten copper-based alloy 110 and entrain impurities, including oxygen and oxygen-related impurities, from the molten copper-based alloy 110.

After the impurities are removed from the melting furnace 108, the molten copper-based alloy 110 is transferred through the opening formed through a sidewall 134 of melting furnace 108, as shown in FIG. 1 (not shown in FIGS. 1A and 1B for clarity). For example, the molten copper-based alloy 110 may be transferred by tilting the melting furnace to pour the copper-based alloy 110 out of the melting furnace 108. In the illustrated configuration, the molten copper-based alloy 110 is transferred from the melting furnace 108 to the transfer ladle 116 via a first velocity control element 114 at a controlled velocity. As described herein, the velocity may be controlled using, among other structures, a sloped ramp or launder that utilizes the gravity force. In some embodiments, the transfer ladle 116 comprises one or more injectors 124. After being transferred to the transfer ladle 116, the molten copper-based alloy 110 is transferred, e.g. poured or injected through the injectors 124, into one or more ingot molds 118. The molten copper-based alloy 110 solidifies in the molds 118, thereby forming a solidified copper-based alloy ingot. The molds 118 can be moved via a conveyer belt 120 where they may be further processed, e.g., cooled, prior to being collected.

Still referring to FIG. 1, in some embodiments, the molds 118 could be any suitable mold, including ingot molds and fixture molds. In some embodiments, molds 118 could be molds for a final component, e.g., fixture molds. In some embodiments, fixture molds could be molds for any suitable water fixture, e.g., faucets, valves, or pipes.

Still referring to FIG. 1, in some embodiments, the molds 118 can be replaced by hardware suitable for producing metal shots. For example, some shot production methods include passing the molten copper-based alloy through a screen, e.g., a stainless steel screen, and into a fluid, e.g., water, in which the molten copper-based alloy is quenched and solidified into metal shots. In some other shot production methods, air or other suitable gas is passed through a molten copper-based alloy and the molten copper-based alloy is quenched in a fluid such as water. Although two example methods of suitable shot production methods are described, it should be understood that other known methods of shot production are also within the scope of this disclosure.

Still referring to FIG. 1, the gas supply system supplies an inert gas to the melting furnace. In some embodiments, the inert gas can include, e.g., argon (Ar) or any other noble gas. In some other embodiments, the inert gas includes nitrogen ($N_2$). In some embodiments, the inert gas is any one or combination of suitable inert gases. In some embodiments, the inert gas may be substantially or essentially free or reactive gases including reducing or oxidizing gases, e.g., hydrogen. In these embodiments, the inert gas is reactive gas-free, e.g., hydrogen-free, except for impurity-level amounts of such gases such as hydrogen.

Still referring to FIG. 1, the gas supply system is configured to purge or begin flowing the inert gas through the feedstock material prior to substantially melting the feedstock. The inventors have discovered that it can be important to reduce the presence of ambient oxygen and/or moisture in the melting furnace 108 not only during melting of the feedstock, but also prior to forming the molten alloy 110, e.g., prior to and during heating-up. Otherwise, unwanted oxidation of the feedstock from the ambient oxygen and/or moisture can be accelerated at elevated temperatures during the heat-up, prior to forming the molten alloy 110. Thus formed oxide on the surfaces of the feedstock, which can be relatively stable at the temperature of the molten alloy 110, can remain in oxide form or release oxygen in the molten alloy 110, thereby contributing to the oxygen and oxygen-related impurities in the molten alloy 110, which can detrimentally affect the mechanical properties of the resulting ingot or shot. Furthermore, the inventors have discovered that oxides can also form from surface-adsorbed oxygen or moisture, which can also be effectively removed by flowing the inert gas through the feedstock. Thus, prior to substantially heating up the feedstock and throughout the melting process, inert gas is purged through the feedstock in the furnace 108. In some embodiments, flowing the inert gas comprises flowing at a sufficient flow rate such that the feedstock is substantially under a flowing inert gas atmosphere prior to and during melting.

As described above, the melting furnace 108 can be in an enclosed configuration (108A, FIG. 1A) or an open configuration (108B, FIG. 1B). Referring to FIG. 1A, under the enclosed configuration of the melting furnace 108A, a lid 130 or a comparable device may be used to enclose the furnace 108A. Under the enclosed configuration, the surfaces of the feedstock and the molten alloy 110 may be placed under a substantially inert atmosphere. As disclosed herein, a substantially inert atmosphere refers to an atmosphere under substantially reduced ambient air over the molten alloy 110, e.g., less than 50%, 40%. 30%, 20%, 10% or a value in a range defined by any of these values, relative to a normal atmosphere. It will be appreciated that, while the enclosed configuration illustrated in FIG. 1A, e.g., using the lid 130, is an effective way place the surface of the molten alloy 110 under a substantially inert atmosphere, embodiments are not so limited. For example, the inventors have discovered that, without the lid 130, in the open configuration of the melting furnace 108B (FIG. 1B), a substantially inert atmosphere can still be achieved, by increasing the inert gas flow rate to suppress the presence of ambient air. Under sufficiently high flow or purge rate of the inert gas, surfaces of the feedstock and the molten alloy 110 may be subjected under a substantially inert gas atmosphere, even without a lid or a lid partially enclosing the inner volume of the furnace 108.

In some embodiments, purging or flowing the inert gas through the feedstock material prior to substantially melting the feedstock can be, e.g., 5, 10, 30, 60 minutes or more before substantial heating to initiate the melting may commence. During the purging, prior to initiating the melting of the feedstock material, the melting furnace 108 may be heated to a relatively low temperature substantially below the melting temperature that is sufficient to accelerate the removal of moisture, e.g., less than 200° C., while insufficient to substantially oxidize the feedstock.

As described herein, an enclosed system or a component thereof refers to an arrangement in which the enclosed sparging furnace system 100 or sub-components thereof are substantially physically sealed or isolated from the outside atmosphere at least part of the time during operation thereof. For example, during loading of the feedstock that may comprise a plurality of feedstock pieces, the volume occupied by the feedstock will decrease as the feedstock pieces melt. As such, during the loading process of the melting furnace 108, a chamber lid, when present, may be opened one or more times before the molten alloy 110 reaches a fill line of the melting furnace 108 representing a liquid level of a fully loaded melting furnace 108. According to embodiments, the inert gas may be flown into the melting furnace and through the molten alloy 110 throughout the entire filling process until the molten alloy 110 reaches the fill line, which may include several cycles of adding solid feedstock pieces into the pool of molten alloy 110. It will be appreciated that, even while the chamber lid may be opened during the addition of the feedstock to fill the melting furnace 108, the inert gas may be flowing into the melting furnace 108 and through the additional feedstock, thereby reducing or substantially preventing the oxidation of the additional feedstock. However, once the melting furnace 108 is fully loaded, the system 100 including at least the gas supply 102, the gas line 104, the melting furnace 108, the first velocity control element 114 and the transfer ladle 116 may be enclosed or sealed from the outside atmosphere, at least temporarily, while being purged with the inert gas from the gas supply 102 to suppress the introduction of oxygen thereinto. As such, in the method 500 (FIG. 5), one or more of flowing 508 the inert gas, heating 512 feedstock pieces and bubbling 516 the inert gas through the molten copper-based alloy is performed at least partly under an enclosed inert atmosphere configured to substantially exclude outside air from mixing with the enclosed inert atmosphere. In the illustrated configuration of FIG. 1, transferring the molten alloy 110 into the transfer ladle 116 through the first velocity control element 114 can also be performed at least partly under an enclosed inert atmosphere configured to substantially exclude outside air from mixing with the enclosed inert atmosphere. The enclosure to isolate relevant portions of the enclosed sparging furnace system 100 from the outside air may be performed using, e.g., one or more valves disposed therein, e.g., between the melting furnace 108 and the transfer ladle 116, and/or between the transfer ladle 116 and the outside world. For example, the injectors 124 may comprise a valve or other shutoff mechanisms that serves to isolate the transfer ladle 116 and the melting furnace 108 prior to being opened to eject molten alloy therethrough.

The feedstock can be present in a variety of forms, including one or more alloy pieces and/or elemental metal pieces. The feedstock pieces may or may not have the same composition. However, the pieces have a combined composition configured to form a molten copper-based alloy having a target composition of the alloy to be formed, and comprises at least 50 weight % copper. Depending on the sizes of the feedstock pieces, the inventors have further discovered that the amount or flow rate of the inert gas that is effective to suppress oxidation of the feedstock prior to melting as described above can be different. The amount or flow rate of the inert gas can depend on, among other things, the relative amount of open space between the feedstock pieces, or the permeability of the copper-based alloy feedstock material, that form the raw material to create the molten alloy 110. A relatively high amount of open space or permeability, which may be present when the feedstock comprises relatively large feedstock pieces, may have a relatively small amount of surface area of alloy exposed to the inert gas. For instance, in some embodiments, the feedstock material may comprise feedstock pieces having a relatively large size and correspondingly higher amount of open space or permeability. For feedstocks with high permeability, relatively high flow rates of inert gas, e.g. greater than or about 5 liters/minute, may be suitable to remove various impurities including the oxygen and oxygen-related impurities from the feedstock. In some embodiments, the feedstock material may comprise feedstock pieces having a relatively small size and correspondingly lower amount of open space or permeability. For example, the feedstock may be relatively small copper-based alloy turnings (e.g., copper based scrap). For feedstocks with low permeability, relatively low flow rates of inert gas, e.g. less than about 5 liters/minute, may be suitable to remove the impurities including oxygen and oxygen-related impurities from the feedstock. The flow rate of inert gas prior to melting as described herein can have any value that is the same or different relative to the flow rate of inert gas during bubbling of the inert gas through the molten alloy 110, as described below, which values are not repeated herein for brevity.

The inventors have discovered that, for effective removal of impurities including oxygen and oxygen-related impurities from the molten alloy 110 as described above, particular combinations of various process parameters can be effective. In particular, the inventors have discovered that the size, density and velocity distributions of the gas bubbles 112 traveling through the molten alloy 110 can be correlated to the effectiveness of the impurity removal process. When the size, density per unit volume and velocity of the gas bubbles 112 are too small or low, the bubbles can be too slow or ineffective at removing oxygen or oxygen-related impurities. On the other hand, when the size, density and velocity of the gas bubbles 112 are too large or high, the bubbles can create substantial turbulence as the bubble rise and break at the surface of the molten alloy 110. The inventors have discovered that such turbulence, when substantial, can not only negate any removal of oxygen or oxygen-related impurities, but can even increase the content of oxygen or oxygen-related impurities. As such, the inventors have discovered that controlling the size, density and velocity distributions of the inert gas bubbles can be critical. The size, density and velocity distributions of the bubbles can be optimized based on a variety of factors, including the viscosity of the molten alloy 110, flow rate of the inert gas though the molten alloy 110, the cross-sectional flow area of the molten alloy 110 through which the inert gas flows, the porosity of the diffuser 106, and the volume of the molten alloy 110 that is in part defined by the dimensions of the furnace 108, to name a few. It will be appreciated that these parameters can be inter-dependent. For example, the flow rate of the inert gas and the cross-sectional flow area through the diffuser determine the flux of the inert gas. In addition, certain values of flow parameters such as the flow rate can be particularly relevant when there is a proportional relationship to the overall volume of the molten alloy 110.

The viscosity of the molten alloy 110 depends, among other things, on the composition and temperature thereof. For a given composition of the various compositions of the molten alloy 110 described herein, including molten copper-based alloy compositions comprising at least 50 weight % copper, the viscosity can be controlled by controlling the temperature of the molten alloy 110 above a melting temperature, e.g., a liquidus temperature. For this and other reasons, the inventors have discovered that the methods described herein can be effective at removal of impurities including oxygen and oxygen-related impurities from the molten alloy 110 when the molten alloy 110 is heated to a temperature greater than the liquidus temperature of the alloy by 100-400° C. According to various embodiments, the molten alloy 110 is heated to a temperature greater than 50° C., 100° C., 150° C., 200° C., 250° C., 300° C., 350° C., 400° C., 450° C. or any temperature in a range defined by any of these values.

As discussed above, inventors have discovered that the flow rate of inert gas during bubbling should be optimized such that the size, density and velocity distributions of the inert gas bubbles are effective at reducing various impurities including oxygen and oxygen-related impurities while not creating excessive turbulence, which can have negative effects. Further, as described above, the optimized flow rate is different depending on whether the melting furnace 108 is in an enclosed configuration (FIG. 1A) or an open configuration (FIG. 1B). According to various embodiments, when the melting furnace 108A (FIG. 1A) is in an enclosed configuration, the inert gas is bubbled into the melting furnace 108A at a flow rate greater than 10 liters/minute, 9 liters/minute, 8 liters/minute, 7 liters/minute, 6 liters/minute, 5 liters/minute, 4 liters/minute, 3 liters/minute, 2 liters/minute, 1 liter/minute or any value in a range defined by these values, such as 1-10 liters/minute or 2-6 liters/minute, for instance about 4 liters/minute. According to various embodiments, when the melting furnace 108B (FIG. 1B) is in an open configuration, the inert gas is bubbled into the melting furnace 108B at a higher flow rate than the flow rate under the enclosed configuration. For example, the flow rate under an open configuration may be greater than 13 liters/minute, 12 liters/minute, 11 liters/minute, 10 liters/minute, 9 liters/minute, 8 liters/minute, 7 liters/minute, 6 liters/minute, 5 liters/minute, 4 liter/minute or any value in a range defined by these values, such as 4-13 liters/minute or 5-9 liters/minute, for instance about 7 liters/minute. When the configurations of the enclosed melting furnace 108A and the open melting furnace 108B are otherwise the same, the optimized flow rate of the inert gas in the open melting furnace configuration 108A is higher, relative to the enclosed melting furnace 108A, by 2 liters/minute, 3 liters/minute, 4 liters/minute, or a value in a range defined by any of these values.

To further control the size, density and velocity distributions of the inert gas bubbles, the inert gas is flown into the melting furnace through the diffuser 106 having an effective diffuser area, thereby controlling the flux. According to various embodiments, the inert gas is diffused through the diffuser 106 having a diameter d (FIG. 1A) greater than 5 cm, 10 cm, 15 cm, 20 cm, 25 cm, 30 cm, 35 cm, 40 cm, 45 cm, 50 cm or a value in a range defined by any of these values.

The size, density and velocity distributions of inert gas bubbles can also be controlled by the pores of the diffuser 106. The pore size of the diffuser 106 should be controlled so that the bubbles have suitable size, density and velocity distributions, while preventing molten liquid alloy from infiltrating. The diffuser 106 can have an average pore size of greater than 20 μm, 30 μm, 40 μm, 50 μm, 60 μm, 70 μm, 80 μm, 90 μm, 100 or a value in a defined by any of these values. Further, the diffuser 106 has a porosity, defined as a ratio of void space to the overall macroscopic volume, which is greater than 10%, 15%, 20%, 25%, 30%, 35%, or a value in a range defined by any of these values.

In the illustrated embodiment, the diffuser 106 is disposed at a bottom surface of the melting furnace. However, embodiments are not so limited and the diffuser 106 may be formed at other surface locations, including side surfaces.

Figure 4A:
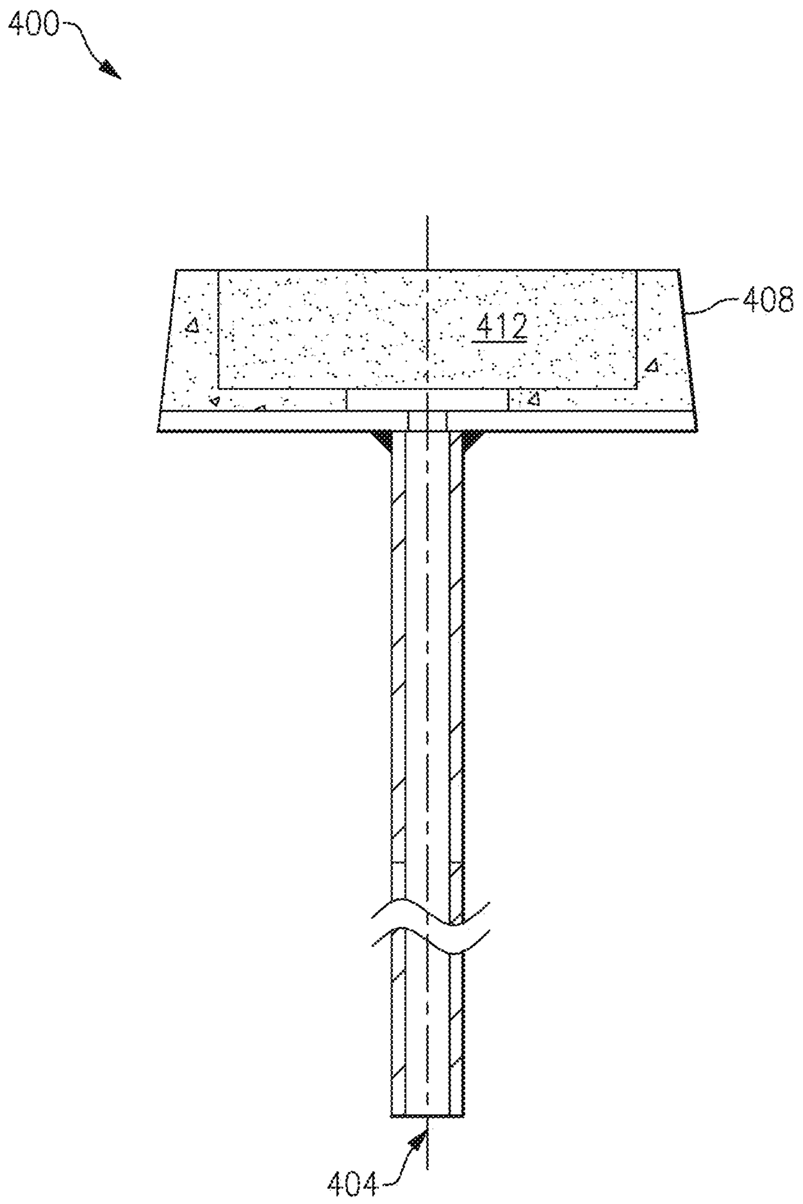
FIG. 4A illustrate a schematic cross-sectional view of a diffuser according to embodiments.
Figure 4C:
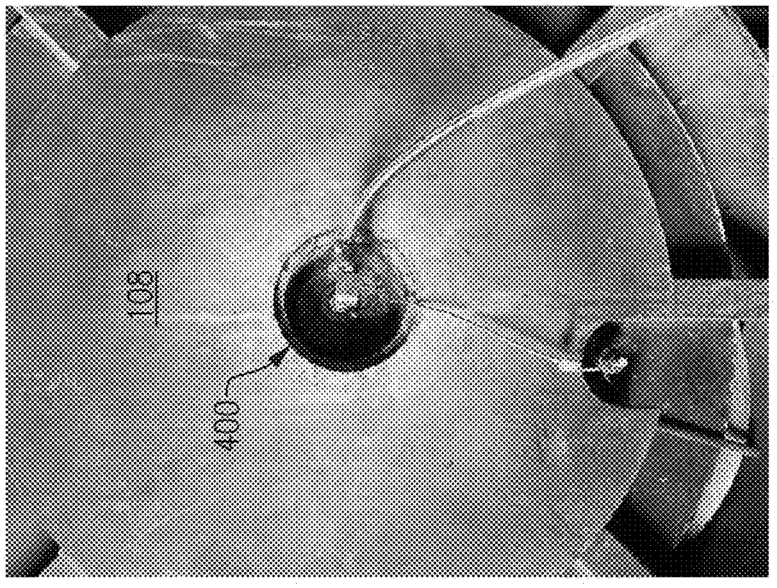
FIG. 4C is a photograph of a diffuser installed at a bottom of a melting furnace, according to embodiments.
Figure 4B:
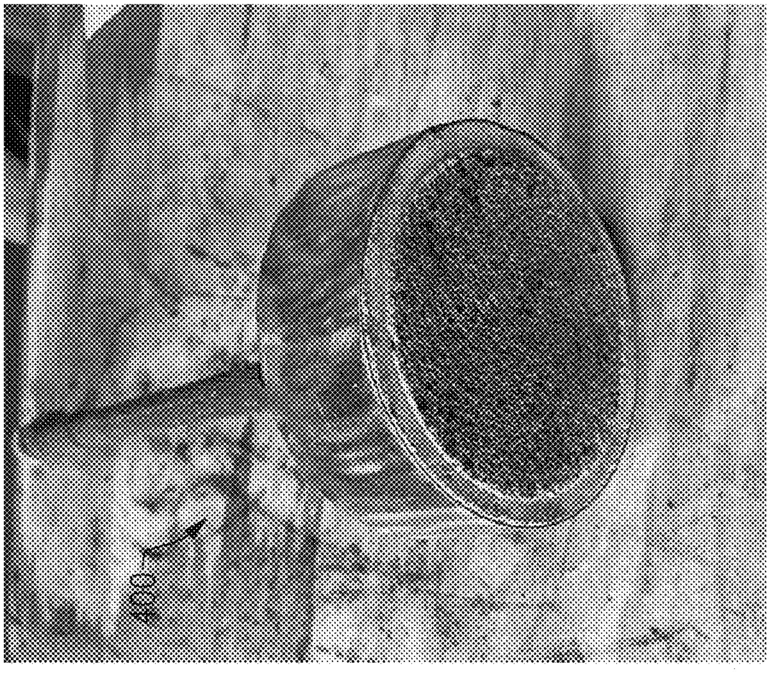
FIG. 4B is a photograph of a diffuser according to embodiments.

FIGS. 4A and 4B illustrate a schematic cross-sectional view and a photograph, respectively, of a diffuser which meets the criteria described herein, according to embodiments. FIG. 4C is a photograph of a diffuser installed at a bottom of a melting furnace 108, according to embodiments. As illustrated in FIG. 4A, the diffuser 400 comprises a gas inlet 404 through which the inert gas is introduced, and a container 408 for holding a diffuser material or medium 412. The illustrated diffuser material or medium 412 comprises a porous refractory ceramic material. FIG. 4B is a photograph of one example of a diffuser 400 having a diffuser material or medium formed primarily of porous alumina and silica. The diffuser material or medium 412 comprises alumina in an amount of 50-80 mol %, 55-75 mol %, 60-70 mol %, or a mol % in a range defined by any of these values, for instance 65 mol %. The diffuser material or medium 412 further comprises silica in an amount of 10-35 mol %, 15-30 mol %, 20-25 mol %, or a mol % in a range defined by any of these values, for instance 24 mol %. The diffuser material or medium can have various properties and structures described below with respect to the diffusive lining described in FIGS. 6A and 6B. For example, the diffuser material 412 has a porosity of 27.6% and a density of 2.45 g/cm$^3$. The diffusive material or lining 412 can also have a two layer structure described with respect to FIGS. 6A and 6B.

Still referring to FIGS. 4A-4C, according to embodiments, the inert gas is bubbled into the melting furnace 108 at a flow rate as described above, e.g., 1-10 liters/minute, through the diffusive material or medium 412 (FIG. 4A) having a diameter (d in FIG. 1A) of 5-50 cm, in a furnace having a capacity to melt alloys in an amount greater than 1000 lbs., 2000 lbs., 5000 lbs., 10,000 lbs., 20,000 lbs. 50,000 lbs., 100,000 lbs. or a value in a range defined by any of these values. For instance, the inert gas is bubbled into the melting furnace at a flow rate between 1-10 liters/minute in a 4000 lbs. furnace, or a furnace having a capacity to melt alloys in am an amount of about 4000 lbs.

Referring back to FIGS. 1A and 1B, in addition to the capacity of the melting furnace 108A, 108B, the furnace may have a volume, defined by an area e.g., a cylindrical area, and a height. In various embodiments, the furnace may have a cylindrical volume defined by an inner diameter D greater than 50 cm, 100 cm, 150 cm, 200 cm, 250 cm, 300 cm, 350 cm, 400 cm, 450 cm, 500 cm, or a value in a range defined by any of these values. The melting furnace 108A, 108B may further have a height H such that, when fully loaded with molten alloy 110, the molten metal may have a fill line F at a height, measured from a bottom surface of the furnace, that is greater than 50 cm, 100 cm, 150 cm, 200 cm, 250 cm, 300 cm, 350 cm, 400 cm, 450 cm, 500 cm, or a value in a range defined by any of these values.

The inventors have discovered that, in conjunction with various other configurations of the melting furnace 108, the disclosed inert gas flow rate generates a combination of gas bubble size, density per unit volume and velocity distributions that are suitable to produce the various advantageous effects described herein. The density of bubbles is such that excessive coalescence of the bubbles within the molten metal is largely avoided, and the velocity and size are such that excessive turbulence is avoided. In some embodiments, the diffuser 106 can have an average pore distribution that are correlated to the bubble size and density per unit volume such that the inert gas bubbles do not substantially coalesce or have excessive velocity.

When enclosed, the atmosphere in contact with the molten alloy 110 in the melting furnace 108 can be determined by the inert gas introduced by the gas supply system. In some embodiments, the atmosphere in the melting furnace is argon. In some embodiments, the atmosphere in the melting furnace is nitrogen. In some embodiments, the atmosphere in the melting furnace is any suitable inert gas.

Referring to FIGS. 1A and 1B, the melting furnace 108 (108A, 108B) is configured to melt a feedstock material. As illustrated in FIGS. 1A, 1B, without limitation, the melting furnace 108 may be an induction-type furnace. The melting furnace 108 can be configured to have a variable internal temperature to accommodate various copper-based alloy systems. In some embodiments, the temperature of the melting furnace 108 is between 700° F. and 3000° F. In some embodiments, the temperature of the melting furnace 108 is 900°, 1000° F., 1200° F., 1400° F., 1600° F., 1800° F., 2000° F., 2200° F., 2400° F., 2500° F., or 3000° F. or a value in a range defined by any of these values.

Still referring to FIGS. 1A and 1B, the melting furnace 108 (108A, 108B) configured as an induction type includes an induction coil 138 surrounding at least a portion of the melting furnace 108A, 108B. An induction heating system includes an induction power supply which converts line power to an alternating current, delivers it to the coil 138 to create an electromagnetic field within the coil. The feedstock disposed in the coil where this field induces a current therein, which in turn generates the heat sufficient to melt the feedstock. Advantageously, the inventors have realized that, under some circumstances, for optimum results, the uppermost winding of the coil 138 should remain below the fill line (F). Such configuration allows the lower region of the molten alloy 110 to be at a higher temperature relative to the upper region of the molten alloy 110. The inventors have found that such configuration results in higher effectiveness in removing impurities. Without being bound to any theory, the improved effectiveness may be due in part to the fact that, impurity removal may occur with higher effectiveness at the hotter lower region due to increased local solubility of the impurities. Subsequently, in the upper region, the impurities become incorporated into a slag at the topmost surface of the molten alloy 110, thereby being removed from the molten copper-based alloy 110. According to embodiments, the uppermost winding of the induction coil 138 is disposed at or below a vertical level corresponding to the top surface of the molten copper-based alloy 110, or the fill line F. The induction coil 138 may have a height, relative to a height of the molten copper-based alloy 110, corresponding to 90%, 80%, 60%, 50%, 40%, 30%, or a percentage in a range defined by any of these values, as measured from a bottom inner surface of the melting furnace 108.

The operating frequency for an induction heating system may be affected by the range of feedstock sizes for the application. Without being bound to any theory, this may be due to the “skin effect,” which is related to the depth below the surface in the metal feedstock in which a current is induced by the electromagnetic field. Generally, higher operating frequency corresponds to a shallower skin depth, and lower operating frequency corresponds to a deeper skin depth. The skin depth is in turn correlated to the penetration of the heating effect. Skin depth or penetrating depth is dependent on the operating frequency, material properties and the temperature of the feedstock. As a general rule, for a given material, heating smaller feedstock pieces by induction can be performed at higher operating frequencies, while heating larger feedstock pieces can be performed at lower operating frequencies. According to various embodiments, the feedstock can have a smallest major dimension, e.g., a width, which is greater than 2 cm, 5 cm, 10 cm, 20 cm, 30 cm, 40 cm, 50 cm, or a value in a range defined by any of these values. The inventors have found that, for melting copper-based alloy feedstock pieces according to embodiments, the optimum frequency of the melting furnace 108 is set at less than 10 kHz, 5 kHz, 2 kHz, 1 kHz, 500 kHz, or a frequency in a range defined by any of these values, for instance 600 kHz.

As described above, the inventors have found that, for enhanced removal of impurities including oxygen and oxygen-related impurities from the molten alloy 110, the molten alloy 110 is heated to a temperature greater than a melting temperature, e.g., the liquidus temperature, of the alloy by 100-400° C. On the other hand, the inventors have found that, prior to transferring the molten alloy 110 to a mold, it is advantageous to lower the temperature of the molten metal in the furnace close to liquidus. Thus, according to various embodiments, the molten alloy 110 is, immediately prior to being transferred out of the melting furnace 108, cooled down, relative to the temperature at which the inert gas has been bubbled therethrough, by a temperature greater than 50° C., 100° C., 150° C., 200° C., 250° C., 300° C., 350° C., 400° C., 450° C. or any temperature in a range defined by any of these values. However, the temperature inside the melting furnace 108 remains above the melting temperature of the alloy.

After forming the molten alloy 110 having low content of impurities including oxygen or oxygen-related impurities, the molten alloy is transferred to the transfer ladle 116. The inventors have found that the content of oxygen or oxygen-related impurities may not be constant as a function of depth of the molten alloy 110. In general, the inventors have discovered that the content of oxygen or oxygen-related impurities tend to be higher towards the surface of the molten alloy 110. Thus, advantageously, when a portion of the molten alloy 110 containing less than average content of oxygen is desired, the molten alloy 110 at a lower portion of the melting furnace may be preferentially transferred to the transfer ladle 116. This can be achieved, e.g., by connecting the first velocity control element 114 at a lower portion, e.g., within bottom 10% 20%, 30%, 40%, 50% or 60% of the melting furnace 108. Alternatively, a mechanical pump may be employed to preferentially pump the molten alloy 110 from a bottom portion thereof, which is then transferred to the transfer ladle 116.

Still referring to FIG. 1, as described above, after a molten alloy 110 having low content of impurities including oxygen or oxygen-related impurities is formed in the melting furnace 108, the molten alloy 110 can be transferred to the transfer ladle 116 via the first velocity control element 114, e.g., a launder or a ramp, which may be under an enclosed and/or inert atmosphere to reduce the reintroduction of oxygen or oxygen-related impurities thereinto. In some embodiments, bubbling the inert gas through the molten alloy 110 can continue throughout the process of transferring the molten copper-based alloy into the transfer ladle 116. When the first velocity control element 114 is enclosed or isolated from the surrounding atmosphere as illustrated, the atmosphere within the first velocity control element can be the same as that of the melting furnace. As such, the atmosphere within the first velocity control element is argon, nitrogen, and/or any suitable inert gas.

The first velocity control element 114 is configured to introduce the molten alloy 110 into the transfer ladle 116 at a controlled velocity to suppress turbulence, which may introduce or reintroduce impurities including oxygen or oxygen-related impurities. The inventors have discovered that the controlling the velocity at this stage can also be critical to prevent or suppress introduction or reintroduction of oxygen and oxygen-related impurities into, and to suppress void formation in, the molten alloy 110 as it cools. The first velocity control element 114 can be, e.g., a launder or a ramped channel, which can be enclosed and shielded from the external atmosphere as illustrated. In some embodiments, the first velocity control element 114 is configured to transfer the molten alloy 110 from the melting furnace 108 to the transfer ladle 116 at a velocity of 1 in/s, 2 in/s, 5 in/s, 10 in/s, 15 in/s, 16 in/s, 17 in/s, 18, in/s, 19 in/s, 20 in/s, 21 in/s, 22 in/s, 23 in/s, 24 in/s, 25 in/s, 26 in/s, 27 in/s, 29 in/s, 30 in/s, 35 in/s, 40 in/s, 45 in/s, 50 in/s, 55 in/s, 60 in/s, 65 in/s, 70 in/s, 75 in/s, 80 in/s, 85 in/s, 90 in/s, 95 in/s, 100 in/s, 105 in/s, 110 in/s, 115 in/s, or 120 in/s or a value in a range defined by any of these values. In some embodiments, the first velocity control element 114 is configured to transfer the molten alloy 110 from the melting furnace 108 to the transfer ladle 116 at a velocity between 5 and 30 in/s. In some embodiments, the first velocity control element 114 controls the velocity of the molten copper-based alloy as it is being transferred from the melting furnace 108 to the transfer ladle 116.

Still referring to FIG. 1, in some embodiments, to control the velocity of the molten alloy 110 within a speed range disclosed above, the enclosed sparging furnace system 100 is configured to transfer the molten alloy 110 from the melting furnace 108 to the transfer ladle 116 using the first velocity control element 114 that is configured to control the velocity of the flowing molten alloy 110 using gravity by being arranged to have, e.g., about a 0.5 to 5 inches of vertical drop over about 3-5 feet of horizontal length. In some embodiments, the first velocity control element 114 is configured to have 0.5 to 2 or 1 to 2 inches drop over a length of 3, 4, 5, or 3-5 feet of length. The first velocity control element can have an angle, relative to a horizontal plane parallel to ground of 5-10 degrees, 10-20 degrees, 20-30 degrees, 30-40 degrees, 40-50 degrees, 50-60 degrees, or a value in a range defined by any of these values.

As described above, after the molten alloy 110 having a low content of impurities including oxygen or oxygen-related impurities is formed in the melting furnace 108, the molten alloy 110 can be transferred to the transfer ladle 116 under an enclosed and/or inert atmosphere to further suppress reintroduction of the impurities thereinto. Thus, as illustrated, according to various embodiments, the transfer ladle 116 as well as the first velocity control element 114 connecting the melting furnace 108 and the transfer ladle 116 may be enclosed. When the transfer ladle 116 is enclosed from the surrounding atmosphere, the atmosphere within the transfer ladle 116 can be common or shared with that of the melting furnace 108 and/or the first velocity control element 114. As such, the atmosphere within the transfer ladle is argon, nitrogen, and/or any suitable inert gas.

Still referring to FIG. 1, after the molten alloy 110 is transferred to the transfer ladle 116 at a controlled velocity using the first velocity control element 114, the molten ally 110 is injected into the molds 118 using the injectors 124. The injectors 124 may, e.g., be gravity-driven injectors in which the molten alloy 110 is injected therethrough solely by force of gravity. For example, the injectors 124 may comprise a piston which normally rests on a valve seat having an opening that is smaller than a diameter of the piston. In this configuration, the injectors 124 are closed, and the system 100 including one or more of the transfer ladle 116, the first velocity control element 114 and the melting furnace 108 may be enclosed within and connected by a common inert atmosphere. When the piston is lifted up from the valve seat, the molten alloy 110 is allowed to flow through the valve seat opening, thereby ejecting the molten alloy 110 into the molds 118 by gravity. The inventors have discovered that the distance between the injecting tip of the injectors 124 and the molds 118 should not exceed 0.5", 1.0", 1.5", 2.0". 2.5", 3.0", 3.5" or have a value in a range defined by any of these values, in order to prevent excessive turbulence, which again may cause introduction or reintroduction of oxygen or oxygen-related impurities as the molten alloy 110 solidified.

FIG. 2 is a schematic view of an enclosed sparging furnace system 200 for manufacturing a copper-based alloy, e.g., ingot, copper-based shot, or copper-based component, having low content of oxygen or oxygen-related impurities, according to one embodiment. The enclosed sparging furnace system 200 shares various components that are broadly configured similarly to the corresponding components of the enclosed sparging furnace system 100 described above, and a detailed description of some of those components may be omitted herein for brevity. The enclosed sparging furnace system 200 includes a gas supply 102 connected via a gas line 104 to a diffuser 106 configured to bubble a gas through a molten copper-based alloy 110 in the melting furnace 108. In a similar manner as described above with respect to FIG. 1, as an inert gas flows through the diffuser 106, the system 200 is configured to form inert gas bubbles 112 that pass through the molten copper-based alloy 110. The gas bubbles 112 pass through the molten copper-based alloy 110 and entrain impurities, including oxygen and oxygen-related impurities, from the molten copper-based alloy 110, as described above. After the impurities are removed from the melting furnace 108, the molten copper-based alloy 110 is transferred from the melting furnace 108 to the transfer ladle 116 via a first velocity control element 114 at a first controlled velocity. In some embodiments, the transfer ladle 116 comprises one or more injectors 124.

The inventors have discovered that, under some circumstances, in addition to advantageously controlling the velocity of the molten alloy 110 being delivered from the melting furnace 108 to the transfer ladle 116 using the first velocity control element 114, it may be further advantageous to additionally control the velocity of the molten alloy 110 being delivered from the transfer ladle 116 to the molds 118. To address these and other needs, in the system 200 illustrated in FIG. 2, unlike the system 100 of FIG. 1 in which the molten alloy 110 is transferred directly to the molds 118 from the transfer ladle 116, after being transferred to the transfer ladle 116, the molten copper-based alloy 110 is transferred to the molds 118 via a second velocity control element 218. The second velocity control element 218 can be, e.g., a launder or a ramped channel, and can be enclosed and shielded from the external atmosphere. The molten alloy 110 solidifies in the molds 118 creating a solidified copper-based alloy. The molds 118 can be moved via a conveyer belt 120 where they may be further processed.

In addition to the first velocity control element 114, which may be configured as described above with respect to FIG. 1, the system 200 illustrated in FIG. 2 includes the second velocity control element 218. The added velocity control element provides added velocity control to further reduce reintroduction of oxygen or oxygen-related impurities into the molten alloy 210 as it is introduced into the ingot molds 118. The second velocity control element 218 may be configured according to various configuration parameters described above with respect to the first velocity control element 114, including the dimensions and the slope, the detailed description of which is omitted herein for brevity.

Thus configured, in the system 200 illustrated in FIG. 1, after the molten alloy 110 having reduced content of oxygen or oxygen-related impurities is formed in the melting furnace 108 and transferred to the transfer ladle 116 using the first velocity control element 114 at a first velocity, the molten alloy 110 may be transferred to the ingot molds 118 using the second velocity control element 218 at a second velocity that is further reduced relative to the first velocity. In some embodiments, the velocity control element 218 is enclosed from the surrounding atmosphere. However, embodiments are not so limited and in some other embodiments, the second velocity control element 218 may be open to the surrounding atmosphere. In some embodiments, the atmosphere within the second velocity control element 218 can the same as that of the melting furnace 108 and/or the first velocity control element 114 and/or the transfer ladle 116. As such, the atmosphere within the second velocity control element 218 may be argon, nitrogen, and/or any suitable inert gas.

The second velocity control element 218 is configured to transfer the molten alloy 110 from the transfer ladle at a velocity having any value as described above with respect to the velocity of the molten copper-based alloy 110 as controlled by the first velocity control element 114. However, it will be appreciated that, because the velocity of the molten alloy 110 arriving the second velocity control element 218 is already reduced by the first velocity control element 114, the velocity of the molten alloy 110 arriving at the mold 118 will be substantially lower than that of the molten alloy 110 arriving at the molds 118 without the presence of the second velocity control element 218, e.g., as illustrated in FIG. 1. According to various embodiments, the second velocity of the molten alloy 110 at the terminal end of the second velocity control element 218 is 20%, 30%, 40%, 50%, 60%, 70%, or a value in a range defined by any of these values, of the first velocity of the molten alloy at the terminal end of the first velocity element 112.

As discussed above with respect to FIG. 1, the inventors have discovered that the turbulence caused by vertically dropping molten alloy 110 can introduce or reintroduce oxygen or oxygen-related impurities in the molten alloy 110. As such, the vertical drop between the injecting tip of the injectors 124 and the second velocity control element 218, as well as the vertical drop between the second velocity control element 218 and the molds 118 should not exceed 0.5", 1.0", 1.5", 2.0" or have a value in a range defined by any of these values, in order to prevent excessive turbulence.

Thus configured, the second velocity control element 218 is configured to transfer the molten copper-based alloy 110 from the transfer ladle 216 to the ingot molds 118 at a substantially reduced velocity and without a vertical drop.

Figure 3A:
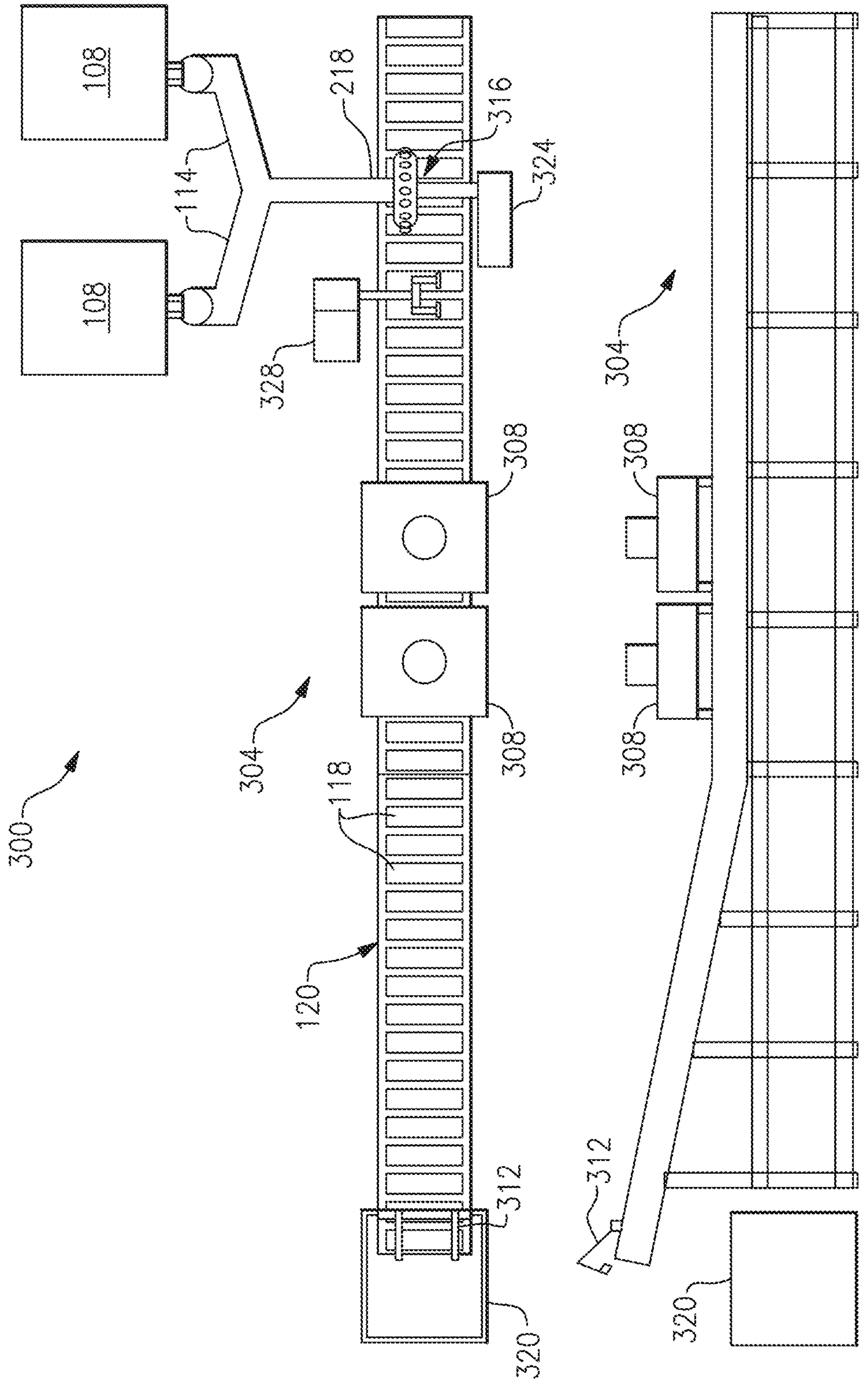
FIG. 3A is a schematic illustration of an apparatus for manufacturing a copper-based alloy having low impurity content, according to some other embodiments.

FIG. 3A is a schematic illustration of an enclosed sparging furnace system 300 for manufacturing a copper-based alloy, e.g., ingot, copper-based shot, or copper-based component, having low content of oxygen or oxygen-related impurities, according to another embodiment. In particular, the system 300 illustrates one example implementation of a conveyor system 304. The upper illustration represents a top-down view of the system 300 including the conveyor system 304 and the lower illustration represents a side view of the conveyor system 304. The enclosed sparging furnace system 300 shares various components that are broadly configured similarly to the corresponding components of the enclosed sparging furnace system in 100 and 200 described above with respect to FIG. 1 and FIG. 2 respectively, and a detailed description of those components may be omitted herein for brevity. Unlike the systems 100 and 200 described above with respect to FIGS. 1 and 2, the system 300 comprises two melting furnaces 108 for higher productivity. However, embodiments are not so limited and it will be appreciated that any one of the systems 100, 200 and 300 can have a suitable number of melting furnaces 108, e.g., one or more. After the oxygen-related impurities are removed from the melting furnaces 108 in a similar manner as described above, the molten copper-based alloy 110 is transferred from the melting furnace 108 to a transfer wheel 316 via a first velocity control element 114 at a first controlled velocity and optionally further via a second velocity control element 218 at a second controlled velocity, which may be the same as or lower than the first velocity. Unlike the systems 100 and 200 described above with respect to FIGS. 1 and 2, the second velocity control element 218, when present, is connected directly to the first velocity control element 114, without being separated by a transfer ladle. Thereafter, the molten alloy 110 is ejected into one or more molds 118. Further unlike the systems 100 and 200 (FIGS. 1 and 2), in the illustrated system 300, the molten alloy 110 is ejected into the molds 118 using the transfer wheel 316, also referred to as a casting wheel, described further in detail with respect to FIGS. 3B and 3C. Thus ejected molten alloy 110 is dropped into one or more molds 118 and are conveyed by a conveyer belt 120 of the conveyor system 304. The conveyor belt 120 may be driven by a suitable driver assembly, which may include, e.g., a motor drive 324. The conveyor system 304 may optionally include, e.g., cooling fans 308 and knockers 312 to loosen the ingots from the molds, to be collected into a collection bin 320.

Figure 3B:
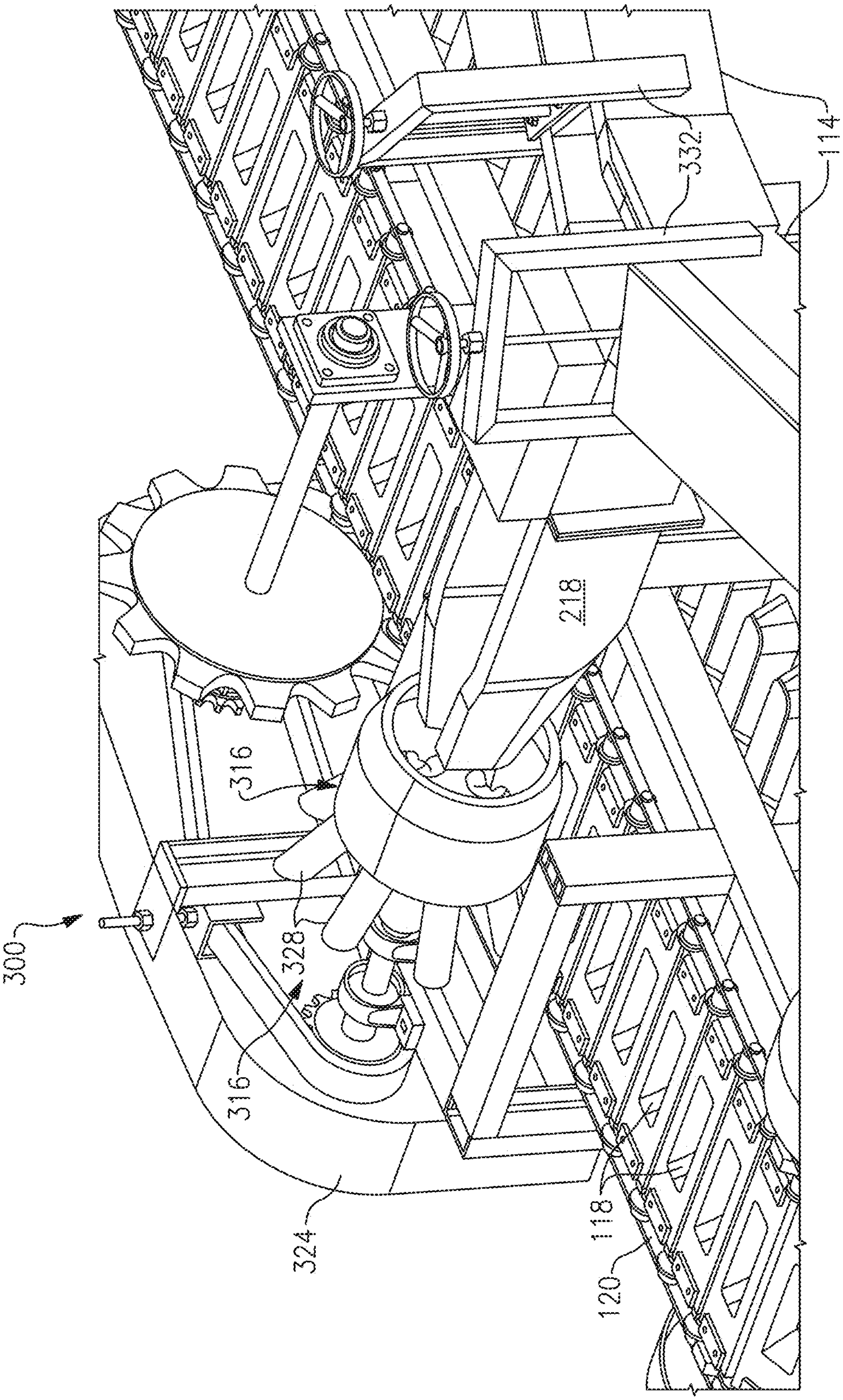
FIG. 3B is a detailed perspective view of a portion of the apparatus illustrated in FIG. 3A including a transfer wheel for manufacturing a copper-based alloy having low impurity content, according to some other embodiments.
Figure 3C:
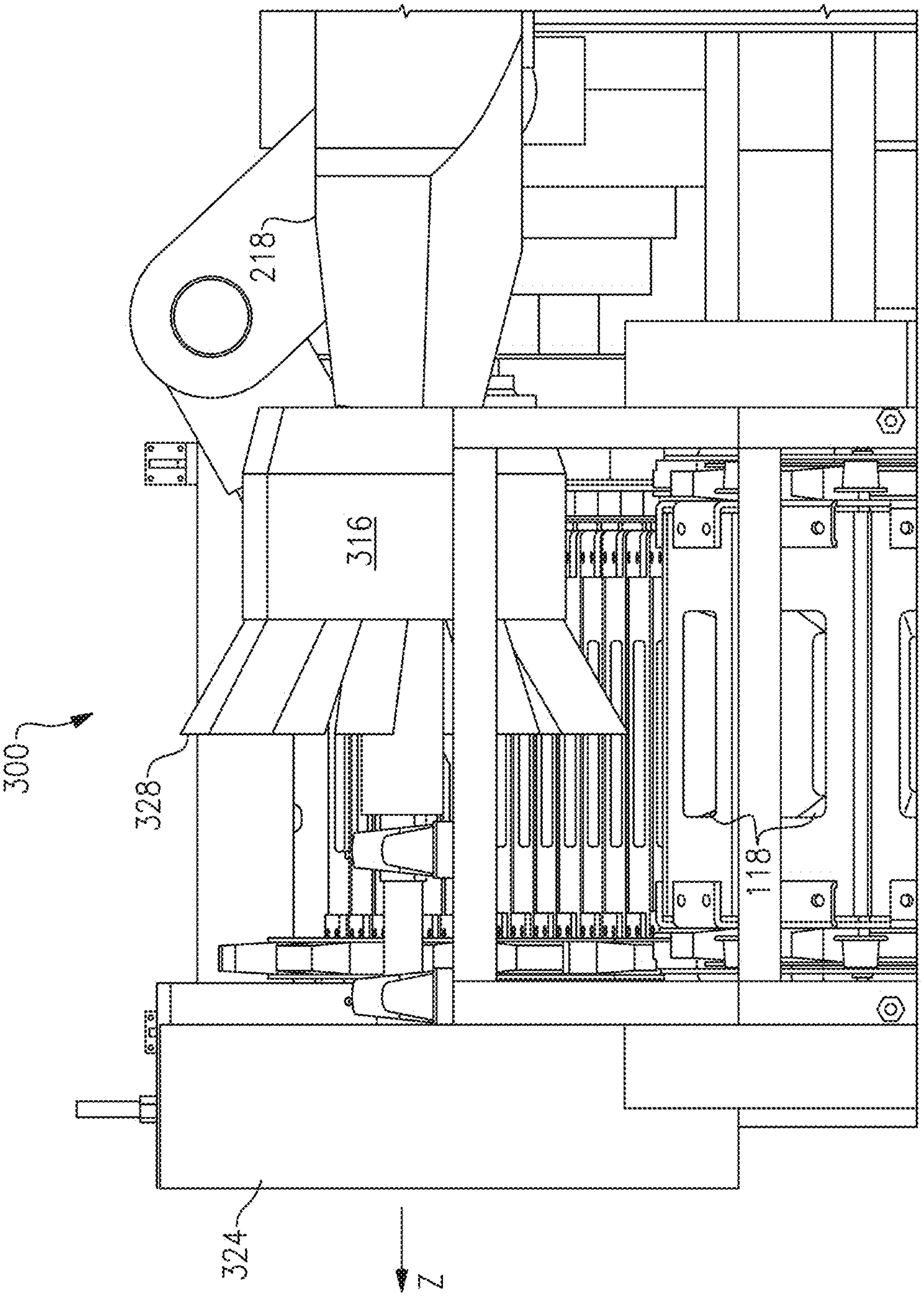
FIG. 3C is a detailed side view of the portion of the apparatus illustrated in FIG. 3A including a transfer wheel for manufacturing a copper-based alloy having low impurity content, according to some other embodiments.

FIG. 3B and FIG. 3C show a detailed perspective view and a side view, respectively, of a portion of the system 300 illustrated in FIG. 3A for manufacturing a copper-based alloy having low content of oxygen or oxygen-related impurities, according to some other embodiments. The portions of the system 300 illustrated in FIGS. 3B and 3C show additional details of the system 300 including the arrangements of the transfer wheel 316 and the conveyor belt 120. The side view of FIG. 3C is that along the direction of movement of the conveyor belt 120. Notably, as described above with respect to FIG. 3A, in the system 300, the molten alloy 110 is ejected into the molds 118 via a transfer wheel 316 instead of a transfer ladle 116 described with respect to FIGS. 1 and 2. Unlike the transfer ladle 116 (FIGS. 1 and 2), in which the injectors 124 are separated by a linear distance, e.g., along a bottom surface of the transfer ladle 116, in the transfer wheel 316, the injectors 328 are separated by an arc defined by an angle of separation therebetween, and extend in different directions. As shown in FIGS. 3B and 3C, the transfer wheel 316 is configured to rotate about a central radial (z) axis. Without limitation, in the illustrated transfer wheel 316, the z axis extends generally in the direction of flow of the molten metal 110 in the second velocity control element 218.

The plurality of injectors 328 of the transfer wheel 316 are sloped to radially extend at oblique angles relative to the z axis. The oblique angles of extension of the injectors 328 are such that, instead of ejecting the molten metal 110 vertically into the molds 118 as described above with respect to the arrangement shown in the systems 100 and 200 (FIGS. 1 and 2), the slopes of the injectors 328 allow for further reduction of the velocity of the molten alloy 110 as it is delivered to the molds 118.

A motor drive 324 is configured to synchronize the motion of the transfer wheel 316 and the conveyor belt 120. The motor drive 324 is configured to rotate the transfer wheel 316 about the z axis at a predetermined angular velocity, and to linearly translate the molds 118 disposed at regular intervals such that adjacent ones of the sloped injectors 328 of the transfer wheel 316 are separated by an arc corresponding to the linear distance between adjacent ones of the mols 118. Thus, as the transfer wheel 316 rotates, the adjacent ones of the molds 118 are filled with the molten metal 110 by the corresponding ones of the injectors 328.

Referring to FIG. 3B, disposed at the end each arm of the first velocity control element 114 is a gate valve 332. The gate valve 332 is configured to keep the molten metal 110 enclosed and under an inert atmosphere until it is ready to be transferred to the transfer wheel 316. For illustrative purposes, the second velocity control element 218 is shown as being open at the top portion thereof. However, in operation, the second velocity control element 218 may also be enclosed under an inert atmosphere, to benefit therefrom as described above.

According to various embodiments, the apparatus is configured such that a molten copper-based alloy that is formed and finally solidifies in the molds 118 according to embodiments has substantially lower oxide content relative to copper-based alloys produced using conventional copper furnaces. In some embodiments, the solidified copper-based alloy has an oxide content 5%, 10%, 15%, 20%, 25%, 30%, 50%, 75%, or up to 99% or any values therebetween lower than solidified copper-based alloys produced by a conventional reference furnace using the same feedstock material.

According to various embodiments, the apparatus according to embodiments is configured such that one or more testing results obtained using an ASTM E8/E8M-21 method from the solidified copper-based alloy has, relative to a reference solidified copper-based alloy formed from a reference apparatus configured to be the same as the apparatus except for the melting furnace and the transfer ladle being under the same enclosed inert atmosphere, one or more of an ultimate tensile strength that is increased by at least 10, 20, 40, 50 ksi or a value in a range defined by any of these values; 0.5% yield strength that is increased by at least 1, 2, 3, 6, 8, 10 ksi or a value in a range defined by any of these values; an elongation that is increased by at least 3%, 5%, 10%, 20%, 30%. 40%, 50%, or a value in a range defined by any of these values; and a reduction in cross-sectional area that increased by at least 3, 5, 10% or a value in a range defined by any of these values.

Systems for Manufacturing High Purity Copper-Based Alloys Including Enhanced Diffuser Assembly In the above, various aspects of furnace systems configured for manufacturing a copper-based alloy with reduced impurity content, and methods of manufacturing a copper-based alloy using such systems, have been described. As described above, among other things, controlling the inert gas bubble characteristics can be critical for producing an optimized condition for reducing the impurity content from the molten copper-based alloy 110. The bubble characteristics include the bubble size, density per unit volume and velocity distributions. These bubble characteristics are in turn determined by various flow characteristics, including the flow rate, the flux and the pore size distribution through the diffuser 106.

In the illustrated melting furnaces 108A, 108B (FIGS. 1A and 1B), the diffuser 106 has a diameter d (FIG. 1A) that is smaller than the diameter D of the melting furnace 108. The diffuser 106 is described further with respect to FIGS. 4A-4C. As illustrated in FIG. 4A, the diffuser material or medium 412 is connected to the inlet 404 for flowing inert gas therethrough. The diameter d of the diffuser 106 in contact with the molten copper-based alloy 110 may be optimized to flow the inert gas uniformly out of its outer surface. The porosity may be optimized to control the size of the inert gas bubbles. The inventors have discovered that, because the diameter d or the area of the diffuser 106 is smaller than the diameter D or the area of the melting furnace 108A, 108B, the inert gas bubbles 112 may not flow substantially across the entire cross section of the molten copper-based alloy 110. As a result, depending on the diffusivities of impurities, the molten copper-based alloy 110 outside of the path of the inert gas bubbles 112 may not be as effectively purified. As such, the inventors have recognized a need to increase the cross-sectional area of the molten copper-based alloy 110 through which the inert gas bubbles traverse towards a surface thereof.

To address these and other needs, to further improve upon various embodiments disclosed herein, further embodiments of an apparatus for manufacturing a copper-based alloy comprises a melting furnace configured to form a molten copper-based alloy comprising at least 50 weight % copper. According to embodiments the melting furnace 108 comprises a diffuser assembly comprising one or more diffuser lining. The diffuser assembly comprises a diffusive lining formed on a surface of the melting chamber wall. The diffusive lining can be employed in addition to or in lieu of the diffuser 106 described above.

Figure 6A:
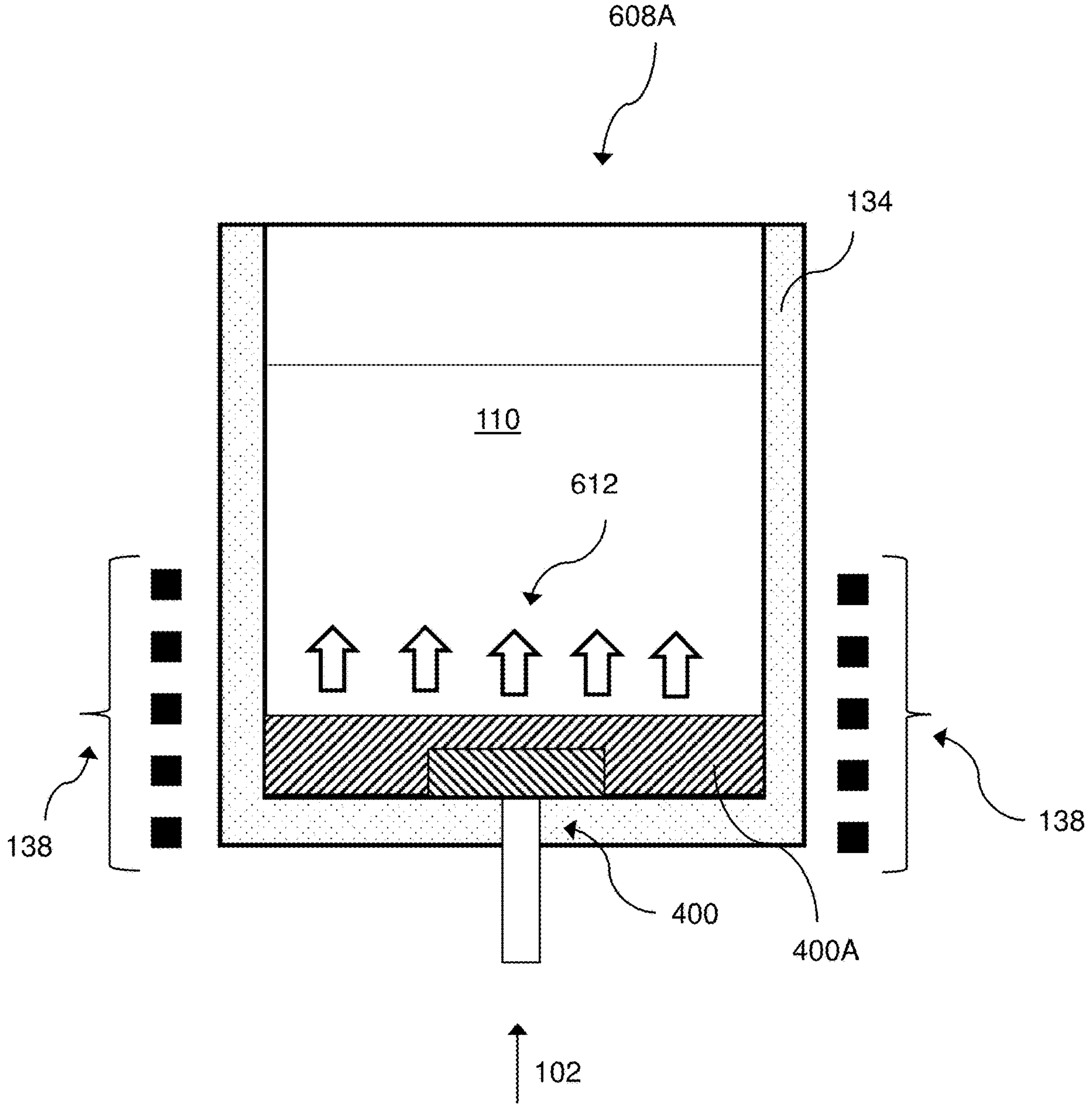
FIG. 6A is a schematic side view illustration of a melting furnace comprising a diffusive lining for manufacturing high purity copper-based alloys, according to some embodiments.
Figure 6B:
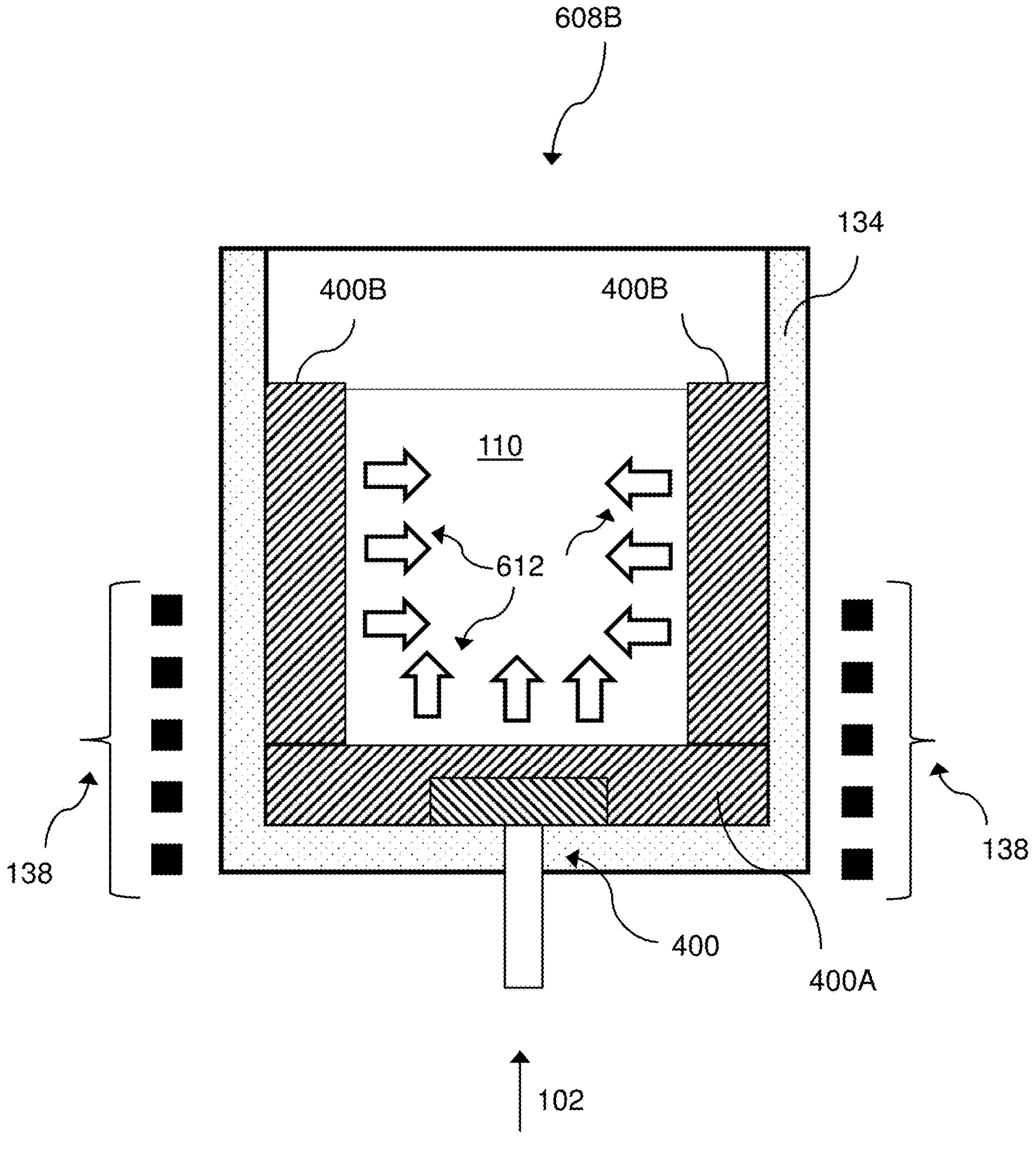
FIG. 6B is a schematic side view illustration of a melting furnace comprising a diffusive lining for manufacturing high purity copper-based alloys, according to some other embodiments.

FIGS. 6A and 6B are schematic side view illustrations of a melting furnace comprising a diffuser assembly for manufacturing high purity copper-based alloys, according to some embodiments. The diffuser assembly includes one or both of a diffuser 400 and a diffusive lining 400A, 400B. Unlike the melting furnace 108A, 108B described above with respect to FIGS. 1A and 1B, in which the diffuser 400 is configured to contact the molten copper-based alloy 110, in the illustrated embodiments in FIGS. 6A and 6B, the diffuser 400 is disposed at a depth inside the diffusive lining 400A, 400B. As configured, the inert gas diffusing out of the diffuser 400 traverses the diffusive lining 400A disposed thereover, such that inert gas is further diffused by the diffusive lining 400 before being introduced into the molten copper-based alloy 110. According to various embodiments, the diffusive lining 400A, 400B comprises a porous high temperature refractory ceramic material. The ceramic material comprises an aluminum-silicate having a porous structure adapted for bubbling an inert gas through the molten copper-based alloy. It will be appreciated that, while the refractory lining 130A, 130B described above with respect to FIGS. 1A, 1B can have a similar structure as the diffusive lining 400A, 400B and/or be formed using a similar method, as described herein, the diffusive lining 400A, 400B serves an important function of further diffusing the inert gas before being introduced into the molten metal 110 to form the inert gas bubble therein.

FIG. 6A illustrates a melting furnace 600A including a diffusive lining 400A, which substantially covers a bottom inner surface thereof and having a porous structure adapted for bubbling an inert gas into the molten copper-based alloy 110. FIG. 6B illustrates a melting furnace 600B including a diffusive lining 400A, 400B formed on at least two different inner surfaces thereof, e.g., bottom and sidewall surfaces of the melting furnace 608B.

The melting furnace 608A includes various features described above with respect to the melting furnace 108 (FIGS. 108A, 108B) described above with respect to FIGS. 1, 1A. 1B and 2. The melting furnace 608A can be configured as an enclosed melting furnace similar to the melting furnace 108A (FIG. 1A) or an open melting furnace 108B (FIG. 1B). As disclosed herein, unless indicated contrariwise, a reference made to the melting furnace 108 will be understood to apply to one or both of melting furnaces 108A, 108B. As described above with respect to FIGS. 1A and 1B, the melting furnace 608A, 608B receives the inert gas supply 102 through diffuser 400. The melting furnace 608A, 608B is enclosed by a chamber wall 134 comprising a suitable refractory material\. The chamber wall 134 may be formed of relatively airtight refractory material, such that ambient air does not contaminate the molten copper-based alloy 110. The melting furnace 608A, 608B is surrounded by a coil 138 for inductive heating of the feedstock, as described above.

In the melting chamber 608A illustrated in FIG. 6A, the diffuser assembly according to embodiments includes the diffuser 400 and the diffusive lining 400A. Advantageously, the diffusive lining 400A envelopes the diffuser 400 covers a larger area relative to the diffuser 400. As configured, the upper surface of the diffuser 400 is disposed below an upper surface of the diffusive lining 400A. The inert gas diffusing out of the diffuser 400 traverses and further diffuses over a thickness of the diffusive lining 400A formed over the diffuser 400. As a result, the diffusive lining 400A substantially increases the cross sectional area of the molten copper-based alloy 110 through which inert gas bubbles 612 travers in a vertical direction, relative to having the diffuser 400 alone, e.g., as described above with respect to FIGS. 1A and 1B. The inventors have found that, when the inert gas enters the molten copper-based alloy 110 directly from a diffuser 400, due to the limited thickness and surface area of the diffuser 400, the inert gas bubbles may not enter the molten copper-based alloy 110 uniformly across a cross section thereof, but rather through an effective area that is much smaller than that of the cross sectional area of the molten copper-based alloy 110. On the other hand, with the illustrated two stage diffuser assembly, the inert gas first diffuses through the diffuser 400 and further diffuses through the diffusive lining 400A. Because the inert gas exiting the diffuser 400 already flows out through an increased cross-sectional area relative to the cross-sectional area of the gas line, further diffusing the inert gas through the diffusive lining 400A is facilitated, and the inert gas exiting the diffusive lining 400A can flow substantially uniformly through substantially the entire cross sectional area of the molten copper-based metal 110. As a result, as illustrated in FIG. 6A, the inert gas bubbles 612 cover a substantially larger cross-sectional area relative to a cross-sectional area covered by the diffuser 400 alone. The inventors have discovered that the impurity removal efficiency for a given flow rate of inert gas can be substantially improved by using the two stage diffuser assembly.

In the melting chamber 608B illustrated in FIG. 6B, the diffuser assembly according to embodiments includes the diffuser 400 and the diffusive lining 400A, in a similar manner as illustrated in the melting chamber 608A (FIG. 6A). Advantageously, in addition to the diffusive lining 400A covering the bottom surface of the melting chamber 608B, the melting chamber 608B further includes a diffusive lining 400B covering sidewalls of the melting chamber 608B. The diffusive lining 400A, 400B covering bottom and sidewall inner surfaces is adapted for further increasing the cross sectional area of the molten copper-based alloy 110 through which inert gas bubbles 612 passes. In addition to the diffusive lining 400A covering a larger area of the molten copper-based alloy 110 through which inert gas bubbles pass through in a vertical direction relative to having the diffuser 400 alone, the diffusive lining 400B further allows for inert gas bubbles 612 to enter the molten copper-based alloy 110 in a lateral or horizontal direction at side surfaces of the molten coper-based alloy 110. With the illustrated three stage diffuser assembly, the inert gas first diffuses through the diffuser 400 and further diffuses through the diffusive lining 400A as described above with respect to FIG. 6A. In addition, a portion of the inert gas exiting the diffusive lining 400A that is not bubble through the molten copper-based alloy 110 enters the diffusive lining 400B. The inert gas entering the diffusive lining 400B diffuses further therein, before entering the molten copper-based alloy 110 at the sidewalls in a lateral direction. As a result, as illustrated in FIG. 6B, the inert gas bubbles 612 cover a substantially larger cross-sectional area relative to having the diffuser 400 alone, the diffusive lining 400A alone, or a combination of the diffuser 400 and the diffusive lining 400. The inventors have discovered that the impurity removal efficiency for a given flow rate of inert gas can be substantially improved by using the three stage diffuser assembly.

It will be appreciated that, in addition to increased surface area of the molten copper-based alloy 110 through which inert gas is introduced for improved removal of impurities that are already present in the feedstock, the diffusive lining 400A, 400B allows for removal of excess moisture or oxygen that may be absorbed on the chamber walls of the melting furnace 608A, 608B prior to melting the feedstock. Because substantial surface area of the melting furnace 608A, 608B is covered with the diffusive lining 400A, 400B, flowing the inert gas through the diffuser 400, diffusive lining 400A, 400B prior to melting the feedstock material can substantially prevent oxygen and/or moisture from the chamber walls from entering the molten copper-based alloy 110. Without the diffusive lining 400A, 400B, the oxygen and/or moisture that is absorbed on the inner surfaces the melting furnace 608A, 608B can be released and introduced into the molten copper-based alloy 110, which has detrimental effect on the resulting copper-based alloy as described above, including ingots and shots.

Various parameters associated with the operation of the melting furnaces 608A, 608B are substantially similar to those described above with respect to FIGS. 1, 1A, 1B and 2, and the details of the same features are not repeated herein for brevity.

Figure 6C:
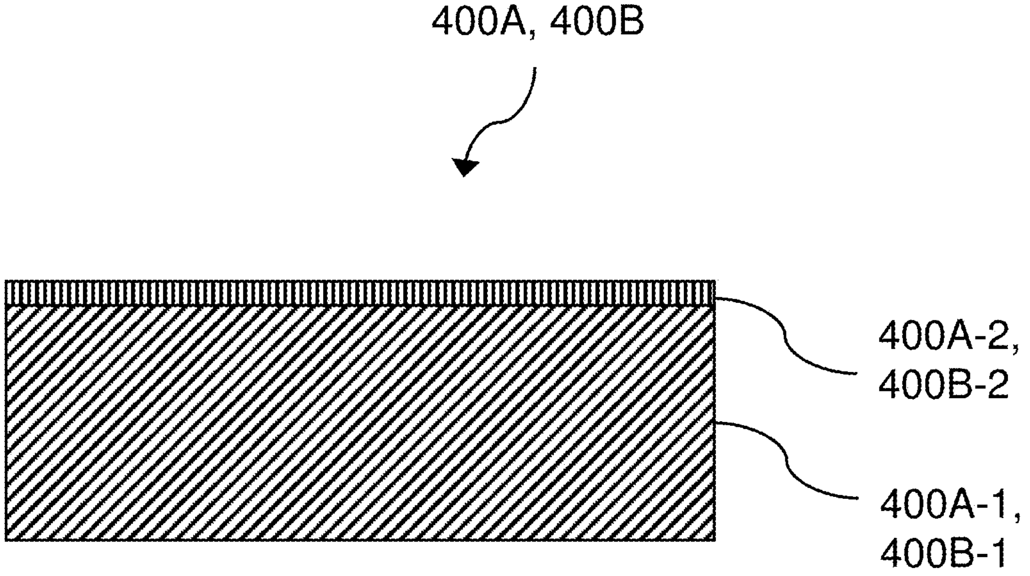
FIG. 6C is a cross sectional view of the diffusive lining for a melting furnace illustrated in FIGS. 6A and 6B.

FIG. 6C is a cross sectional view of the diffusive lining 400A, 400B according to various embodiments. The diffusive lining 400A, 400B according to various embodiments includes a refractory material including alumina, silica and aluminosilicate. The composition is such that the molten copper-based alloy 110 is not contaminated at high temperatures. In addition to the chemical composition adapted for high temperature melting of copper-based alloys, the diffusive lining 400A, 400B has physical structure adapted for mechanical strength in addition to optimized porosity for controlling the inert gas bubble characteristics, in a similar manner as described above with respect to the diffuser 400.

The inventors have discovered that the various chemical and physical characteristics adapted for effective sparging as described herein can be satisfied using a diffusive lining 400A, 400B having at least two different layers or regions. The diffusive lining 400A includes an upper layer or region 400A-2 and a lower layer or region 400A-1, and the diffusive lining 400B includes an upper layer or region 400B-2 and a lower layer or region 400B-1. The upper layer 400A-2, 400B-2 is configured to be closer to, e.g., to contact, the molten copper-based alloy 110, and is configured to be interposed between the lower layer 400A-1, 400B-1 and the molten copper-based alloy 110.

According to embodiments, the upper layer 400A-2, 400B-2 is formed of a sintered ceramic layer, while the lower layer 400A-1, 400B-1 is formed of an unsintered ceramic layer. In particular, the upper layer 400A-2, 400B-2 may be a partly or locally sintered ceramic layer, where neighboring ceramic grains are partially fused while leaving gaps therebetween, to retain a porous surface for diffusing the inert gas therethrough. In contrast, the lower layer 400A-1, 400B-1 may be an unsintered ceramic layer, e.g., a compacted ceramic power layer, where neighboring ceramic grains contact each other without being fused by sintering, also having gaps therebetween, for diffusing the inert gas therethrough. Such two layer structure provides mechanical stability to the diffusive lining 400A, 400B, while providing the high porosity adapted for diffusing the inert gas into the molten copper-based alloy 110.

While embodiments are not so limited, in some embodiments, the upper layer 400A-2, 400B-2 and the lower layer 400A-1, 400B-1 are formed from the same initial compacted ceramic powder layer. As described further below, a surface portion of a compacted ceramic powder layer may be partially sintered to form the two layer structure. In these embodiments, the sintered upper layer 400A-2, 400B-2 and the unsintered lower layer 400A-1, 400B-1 have substantially the same chemical composition while having different phases. That is, the initial compacted ceramic powder layer may include component ceramic compounds that form a new phase of the upper layer 400A, 400B-2 upon sintering. The inventors have found that one ceramic powder composition that is particularly suitable is a mixture of alumina and silica configured to form mullite upon sintering.

Mullite ($3Al_2O_3 \cdot 2SiO_2$) is particularly suitable as the upper layer 400A-1, 400B-1 because of its low density, high thermal stability, high chemical stability in severe environments, low thermal conductivity and favorable strength and creep behavior. Mullite is the only thermodynamically stable crystallized compound in the phase diagram of the alumina-silica ($Al_2O_3$—$SiO_2$) system. The compound incongruently melts at a temperature of 1828±10° C. Thus, according to embodiments, the initial compacted powder layer includes a mixture having a composition that can form a substantial volume fraction of mullite.

The two layer structure is formed by, as described further below, locally subjecting the surface of a compacted ceramic powder layer to a sintering temperature sufficient to form mullite from the power composition. The resulting two layer structure includes an upper sintered layer 400A-2, 400B-2 comprising mullite, and a lower unsintered layer 400A-1, 400B-1 formed predominantly alumina and silica. According to some embodiments, the two layer structure is formed using a powder composition comprising alumina in an amount of 50-80 mol %, 55-75 mol %, 60-70 mol %, or a mol % in a range defined by any of these values, for instance about 65 mol %. The powder composition further comprises silica in an amount of 10-35 mol %, 15-30 mol %, 20-25 mol %, or a mol % in a range defined by any of these values, for instance about 24 mol %. The powder composition may further comprise SiC in an amount of 2-8 mol %, 4-6 mol % or about 5 mol %, $TiO_2$ in an amount of 1-3 mol %, 1.5-2.5 mol % or about 2.2 mol %, and $Fe_2O_3$ in an amount of 0.5-2 mol %, 1-1.5 mol % or about 1.2 mol %. It will be appreciated that substantial deviation from a mullite-forming composition can lead to insufficient mechanical, thermal or chemical stability. For example, the $Al_2O_3$—$SiO_2$ system has eutectic composition with melting points 1587±10° C., corresponding to the composition of approximately 6 mol % $Al_2O_3$, which may lead to lower performance with respect to various properties described above.

The inventors have discovered that a suitable average particle size of the starting powder for forming the diffusive lining 400A, 400B can be defined using what is known in the industry as the phi (ϕ) scale, which is based on the relationship $D=D_0\,(2^{-\Phi})$, where $D_0$ is a reference diameter of 1 mm. For example, ϕ scales of 2 to 1, 3 to 2, 4 to 3 and 8 to 4 correspond to 0.25-0.5 mm, 125-250 μm, 62.5-125 μm and 3.9-62.5 μm, respectively. The inventors have determined that a suitable average particle size of the mullite-forming powder is less than 125 μm, 100 μm, 75 μm, 50 μm, for instance less than 63 μm corresponding to a ϕ number of 4.

According to various embodiments, the diffusive lining 400A, 400B has a suitable thickness such that the inert gas diffuses out of the diffusive lining 400A, 400B through substantial area portions thereof. The diffusive lining 400A, 400B according to various embodiments has a thickness greater than 2 inches, 3 inches, 4 inches, 5 inches, 6, inches, 7 inches, or a thickness in a range defined by any of these values. In FIGS. 6A and 6B, this thickness corresponds to the thickness of the diffusive lining 400A above the surface of the diffuser 400, and in FIG. 6B, this thickness corresponds to the thickness of the diffusive lining 600B. For instance, the diffusive material or medium of the diffuser 400 can be about 2 inches, and the thickness of the diffusive lining 400A above the suffer 400 can be about 3-4 inches, for a combined thickness of 5-6 inches. Similarly, the thickness of the diffusive lining 400B can be about 3-4 inches. It will be appreciated that if the thickness of the diffusive lining 400A, 400B is too thin, insufficient spreading of the inert gas may occur, leading to localized bubble formation as opposed to bubble formation across substantial cross sectional area of the molten copper-based metal 110.

Still referring to FIG. 6C, according to various embodiments, the sintered top layer 400A-2, 400B-2 has a thickness less than 1 inch, 0.8 inch, 0.6 inch, 0.4 inch, 0.2 inch, 0.1 inch, or a value in a range defined by any of these values. The remainder of the diffusive lining 400A, 400B can be the unsintered bottom layer 400A-1, 400B-1.

Further, the diffusive lining 400A, 400B has a porosity, defined as a ratio of void space to the overall macroscopic volume, which is greater than 10%, 15%, 20%, 25%, 30%, 35%, or a value in a range defined by any of these values.

According to some embodiments, the diffusive lining 400A, 400B has the same structure and/or composition as the diffuser 400. That is, the diffuser 400 may have the same mullite forming composition and may have a two layer structure including a sintered ceramic layer and an unsintered ceramic layer. Advantageously, matching the composition and/or structure of the refractory material between the diffuser 400 and the diffusive lining 400A, 400B can allow optimized flow of the inert gas through the diffuser 400, further through refractory lining 400A, 400B and into molten copper-based metal 110. However, embodiments are not so limited, and in other embodiments, the diffusive lining 400A, 400B can have a composition and structure that is different from those of the diffuser 400.

Referring back to FIGS. 6A and 6B, while in illustrated embodiments the diffusive lining 400A and 400B cover substantially the entire bottom and sidewall surfaces of the melting furnace 6008A, 608B, respectively, embodiments are not so limited. For example, the diffusive lining 400A may have a diameter that is greater than that of the diffuser 400 while being smaller than that of the inner diameter D (FIG. 1A) of the melting furnace 608A, 608B. For example, the diameter of the diffusive lining 400A may be less than 0.8 D, 0.6 D, 0.4 D or a value in a range defined by any of these values. Similarly, the diffusive lining 400B may have a height that is smaller relative that of the fill line height F (FIG. 1A) of the melting furnace 608A, 608B. For example, the height of the diffusive lining 400B may be less than 0.8 F, 0.6 F, 0.4 F or a value in a range defined by any of these values.

Figure 7A:
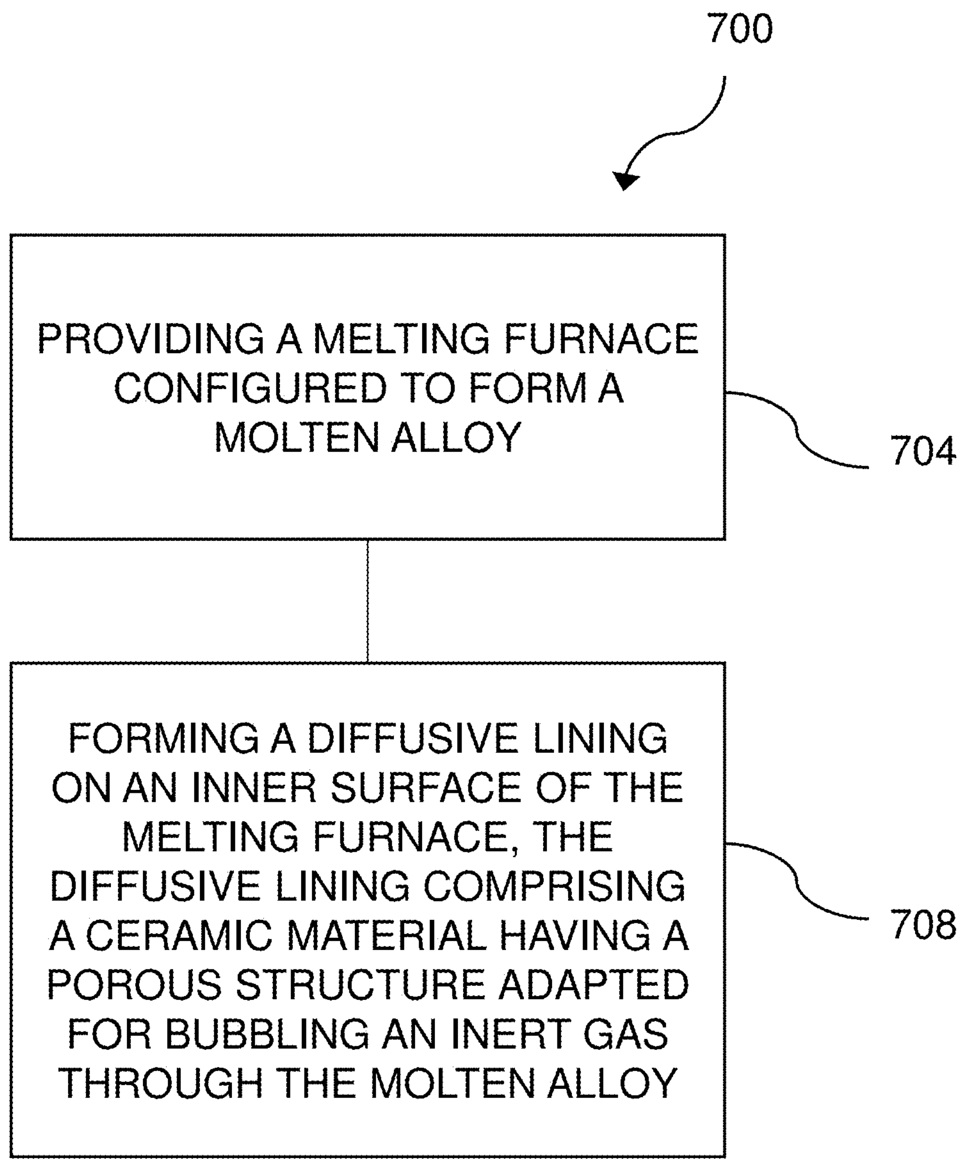
FIG. 7A illustrates a method of forming a diffusive lining in a melting furnace for manufacturing high purity copper-based alloys, according to various embodiments.

In the following, a method of manufacturing a melting furnace including a diffusive lining is described. FIG. 7A illustrates a method of forming a diffusive lining in a melting furnace for manufacturing high purity copper-based alloys, according to various embodiments. The method 700 includes providing 704 a melting furnace chamber configured to form a molten alloy. The method additionally includes forming 708 a diffusive lining on an inner surface of the melting furnace chamber, where the diffusive lining comprises a ceramic material having a porous structure adapted for bubbling an inert gas through the molten copper-based alloy.

According to various embodiments, providing 704 the molten alloy comprises providing a copper-based alloy comprising at least 50 weight % copper. According to various embodiments, forming 708 the diffusive lining comprises providing the diffusive lining comprising a ceramic material such as an aluminum-silicate ceramic material having a porous structure adapted for bubbling an inert gas through the molten copper-based alloy. According to various embodiments, forming 708 the diffusive lining comprises substantially covering a bottom inner surface of the melting furnace and having a porous structure adapted for bubbling an inert gas into the molten copper-based alloy. According to various embodiments, providing 708 the diffusive lining comprises forming a diffusive lining having a porous structure on at least two different inner surfaces of the melting furnace such that the diffusive lining is adapted for bubbling an inert gas into the molten copper-based alloy from the at least two different inner surfaces.

According to various embodiments, forming 708 the diffusive lining comprises disposing a compacted powder layer on an inner surface of the melting furnace chamber. The compacted ceramic powder layer comprises a mixture of silica and alumina. Forming 708 the diffusive lining further comprises sintering the compacted ceramic powder layer in the melting furnace to form a diffusive lining on the inner surface. According to embodiments, sintering includes selectively sintering a surface portion of the compacted ceramic powder layer, thereby forming a diffusive lining on the inner surface comprising a two layer structure, which includes a sintered ceramic layer on an unsintered ceramic layer. According to embodiments, sintering the compacted ceramic powder layer includes in situ sintering using power from the melting furnace itself. In particular, sintering the compacted ceramic powder layer includes using heat from a heated material disposed in the melting furnace chamber, to form the diffusive lining on the inner surface. Thus formed diffusive lining comprises an aluminum-silicate ceramic material having a porous structure adapted for diffusing the inert gas therethrough. The method 700 is further described herein with respect to FIGS. 7B-7F.

FIGS. 7B-7F are schematic side view illustration of a melting furnace at various stages of forming a diffusive lining therein, to configure the melting furnace for manufacturing high purity copper-based alloys, according to the method 700 illustrated in FIG. 7A.

Figure 7B:
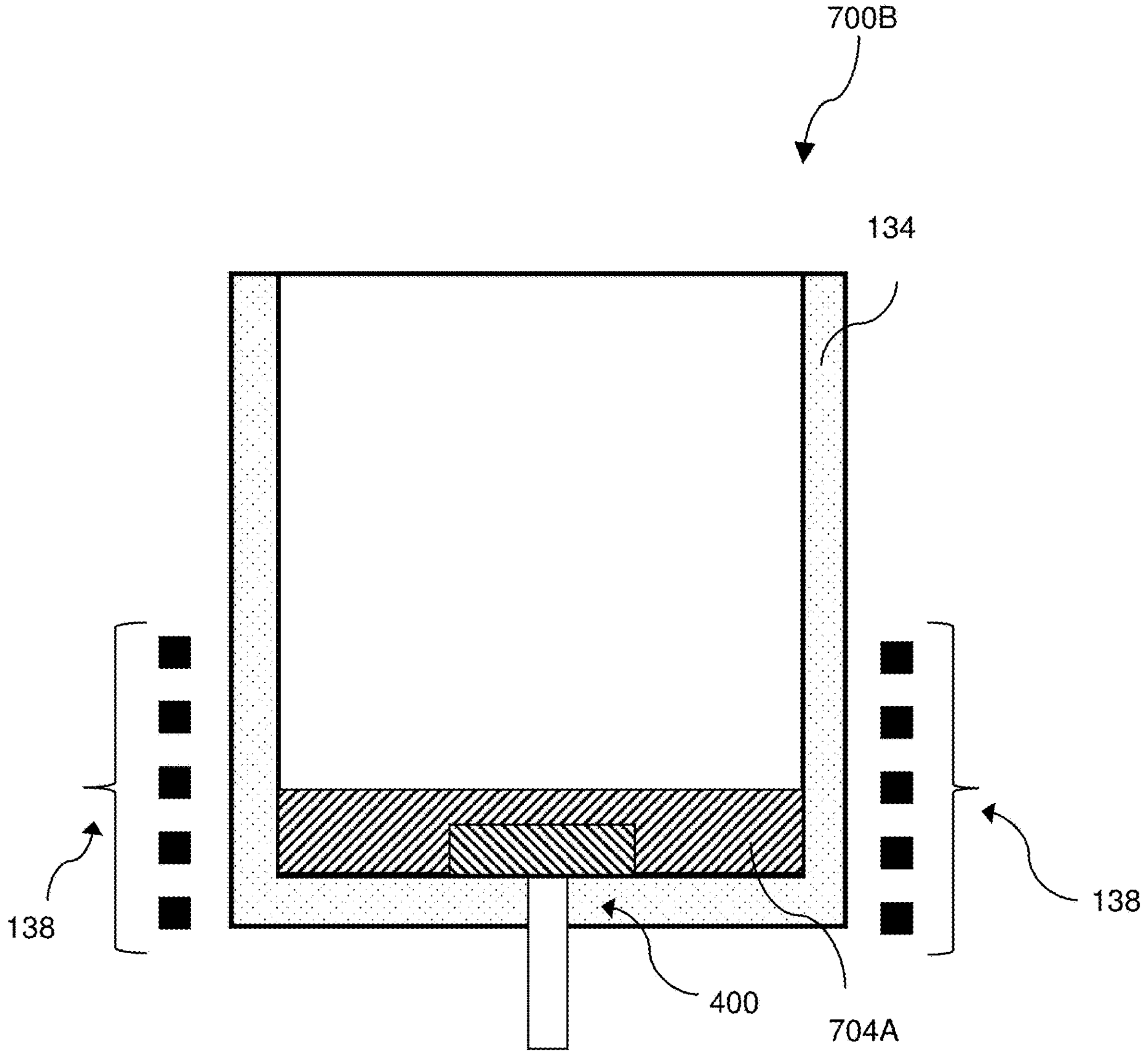
FIG. 7B is a schematic side view illustration of a melting furnace at a stage of forming a diffusive lining therein for manufacturing high purity copper-based alloys, according to the method illustrated in FIG. 7A.

Referring to FIG. 7B, providing 704 the melting chamber comprises providing a melting furnace 700B that is similar to the melting chamber 108A, 108B described above with respect to FIGS. 1A and 1B. The melting furnace 700B includes a frame including a chamber wall 134 formed of a suitable refractory material that is relatively airtight. A diffuser 400 is installed over a central region of the bottom inner surface of the melting furnace 700B. The inert gas is introduced into the molten copper-based alloy 110 via the gas inlet 404 formed through a bottom plate of the melting furnace 700B, as shown above with respect to FIG. 4C.

After installing the diffuser 400, a compacted ceramic powder layer 704 for forming the diffusive lining 400A (FIGS. 6A-6C) is formed over the bottom inner surface of the melting furnace 700B. To form the compacted ceramic powder layer 704A, a ceramic powder having the composition and particle size as describe above with respect to FIGS. 6A-6C is poured on the bottom surface of the melting furnace 700B and over the diffuser 400. The ceramic powder is tapped to remove air pockets and densify into a compacted ceramic powder layer 704A having a thickness described above with respect to FIGS. 6A-6C.

Figure 7C:
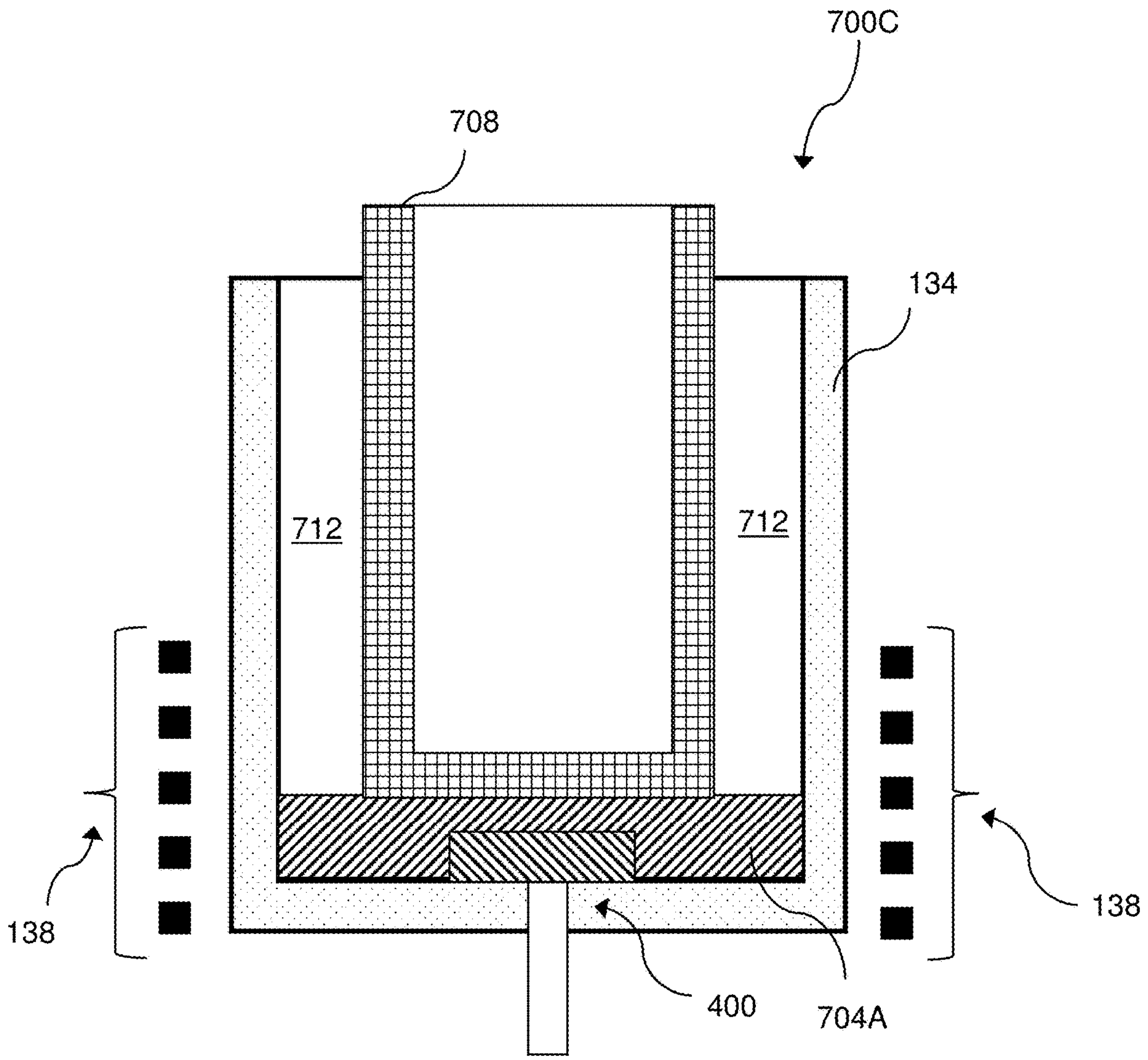
FIG. 7C is a schematic side view illustration of a melting furnace at another stage of forming a diffusive lining therein for manufacturing high purity copper-based alloys, according to the method illustrated in FIG. 7A.
Figure 7D:
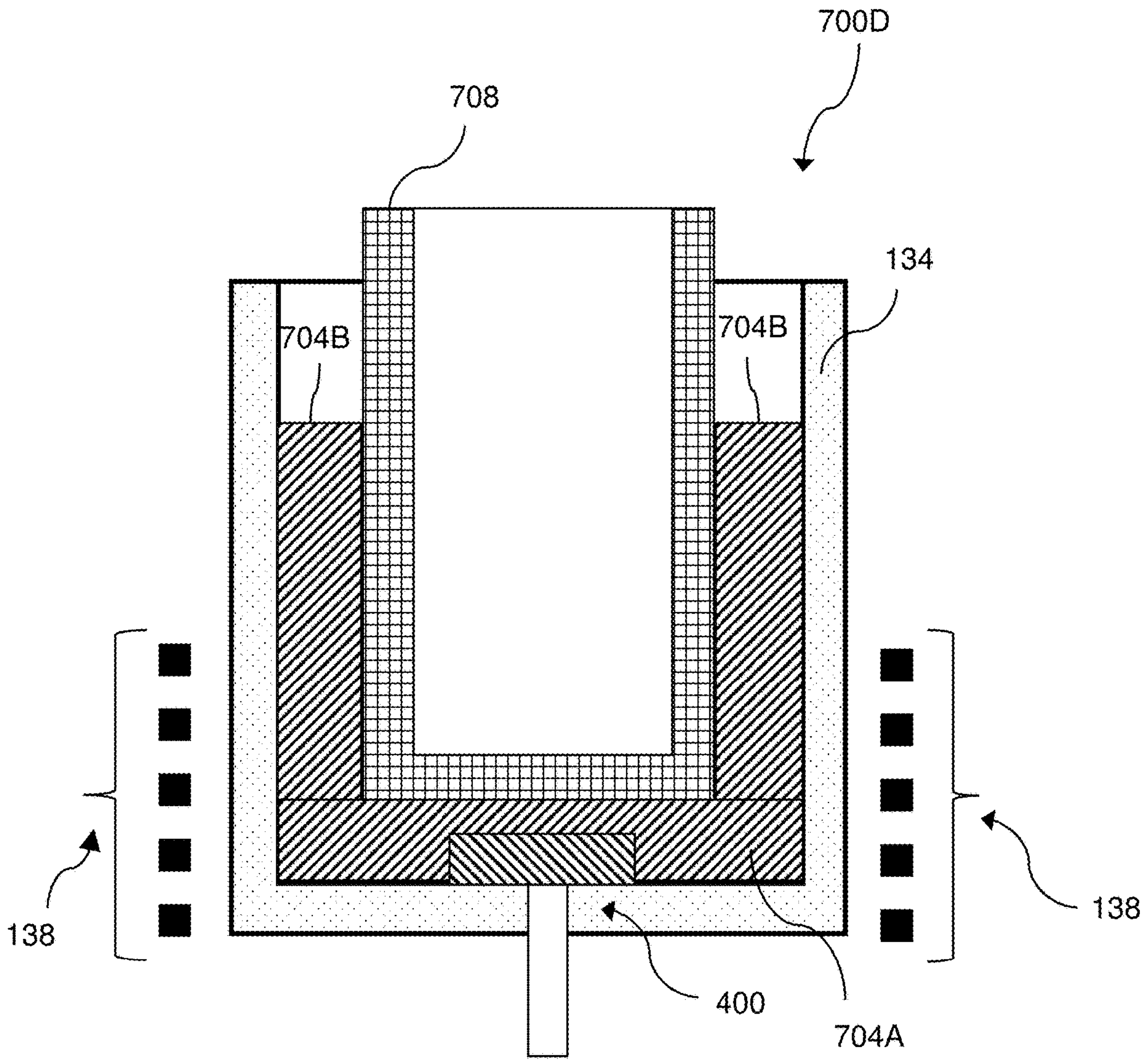
FIG. 7D is a schematic side view illustration of a melting furnace at another stage of forming a diffusive lining therein for manufacturing high purity copper-based alloys, according to the method illustrated in FIG. 7A.

Referring to FIGS. 7C and 7D, after forming the compacted ceramic powder layer 704A at the base or the bottom surface of the melting furnace 700B (FIG. 7B), further compacted ceramic powder layer 704B for forming the diffusive lining 400B (FIGS. 6B-6C) is formed on the sidewall surface of the melting furnace 700C. Referring to FIG. 7C, a heating can 708 is disposed on the compacted ceramic powder layer 704A. The heating can 708 is formed of a metal that can form a molten metal liquid by in-situ inductive heating thereof using the induction coil 138. The heating can 708 is configured to be heated to a temperature sufficient for it to be melted, along with a feedstock disposed therein, to provide the heat for partially or locally sintering the compacted ceramic powder layer 704A, 704B in contact therewith. According to embodiments, without limitation, the heating can 708 can be formed of an iron-based alloy such as a mild steel. The heating can 708 has dimensions such that the width of a gap 712 formed between the outer surface of the heating can 708 and the inner sidewall of the melting furnace 700C corresponds to the final thickness of the diffusive lining 400B.

Referring to FIG. 7D, to form the compacted ceramic powder layer 704B, a ceramic powder having the composition and particle size as describe above with respect to FIGS. 6A-6C is poured into the gap 712 between the sidewall of the melting furnace 700C (FIG. 7C) and the outer surface of the heating can 708. The ceramic powder is tapped to remove air pockets and densify into a compacted ceramic powder layer 704B having a thickness defined by the width of the gap 712 and a height corresponding to the fill line (F) or a fraction thereof, as described above with respect to FIGS. 6A-6C. It will be appreciated that, if only the diffusive lining 403A is to be formed, e.g., as illustrated in FIG. 6B, the formation of the ceramic powder layer 704B can be omitted.

Figure 7E:
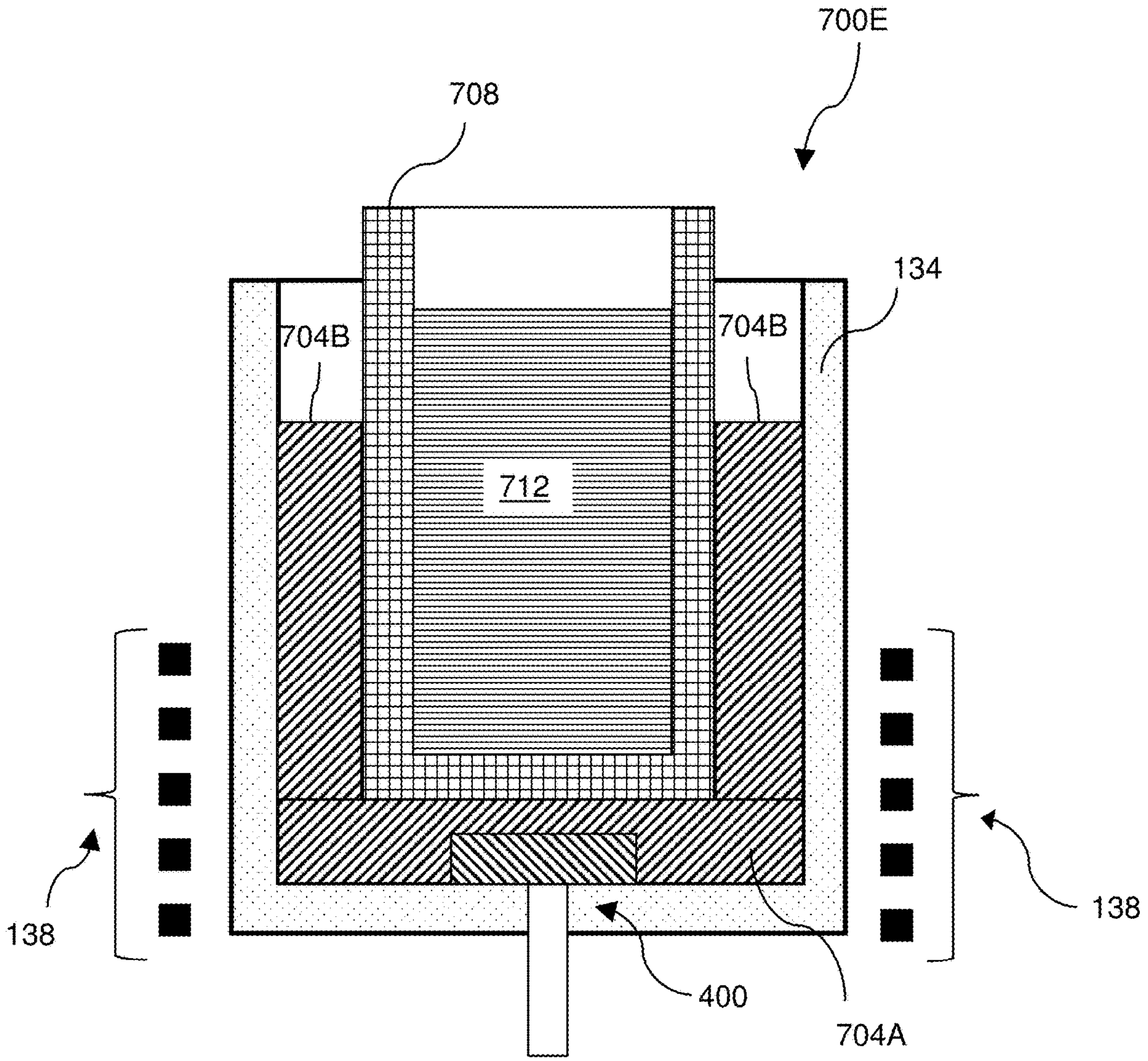
FIG. 7E are schematic side view illustration of a melting furnace at another stage of forming a diffusive lining therein for manufacturing high purity copper-based alloys, according to the method illustrated in FIG. 7A.
Figure 7F:
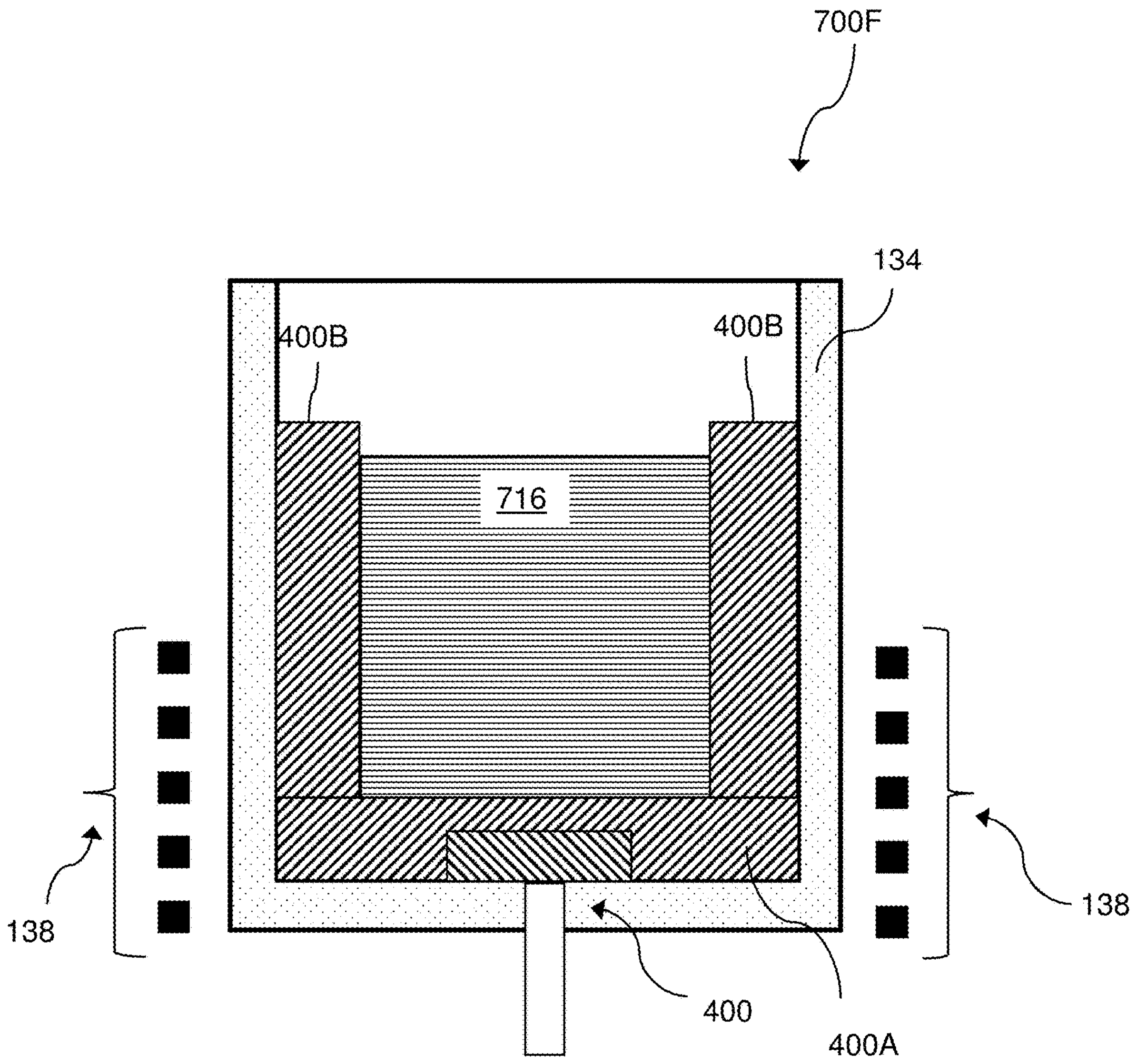
FIG. 7F are schematic side view illustration of a melting furnace at another stage of forming a diffusive lining therein for manufacturing high purity copper-based alloys, according to the method illustrated in FIG. 7A.

Referring to FIGS. 7E and 7F, thus formed compacted ceramic powder layers 704A and 704B on the bottom surface and sidewall surface of the melting furnace 700E, respectively, are ready to be partially or locally sintered to form the two layer structure described above with respect to FIG. 6C. The partial or local sintering at the surface regions of the ceramic powder layers 704A, 704B is performed in situ using the induction coil 138. In particular, the local sintering is performed indirectly using the induction coil 138, using heat from a molten liquid formed by melting the can 708 and a heating feedstock disposed therein, as described herein. Referring to FIG. 7E, the can 708 is filled with a heating feedstock 712. Similar to the heating can 708, the heating feedstock 712 is formed of a metal, e.g., an iron-based feedstock that can form a heating molten metal mixture and be heated in situ in the melting furnace 700E, using the induction coil 138, to a temperature sufficient to partially or locally sinter the compacted ceramic powder layer 704A, 704B in contact therewith. According to embodiments, without limitation, the heating feedstock 712 can be formed of an iron-based material such as a mild steel or cast iron. The heating feedstock 712 and the heating can 708 can be formed of the same material or different materials. Regardless, the heating feedstock 712 and the heating can 708 are both adapted to melt and form a heating molten metal mixture that can be heated to a temperature sufficient to sinter at least the surface region of the compacted ceramic powder layers 704A, 704B.

Referring to FIG. 7F, after filling the heating can 708 with the heating feedstock 712, both the heating can 708 and the heating feedstock 712 are inductively heated using the induction coil 138 to a temperature high enough to form a heating molten metal mixture 716 comprising molten mild steel and/or cast iron. The heating molten metal mixture 716 is further heated to a temperature sufficient to provide the heat sufficient to partially or locally melt the compacted ceramic powder layers 704A, 704B, e.g., at surface regions thereof, on the bottom and sidewall surfaces of the melting furnace 700F.

It will be appreciated that the heating condition to form the heating molten metal mixture 716 depends on the sintering temperature for the compacted ceramic powder layers 704A, 704B to sinter at least the surface regions thereof to form, e.g., the two layer structure described above with respect to FIG. 6C. According to embodiments, the sintering temperature used can be greater than 0.7 $T_m$, 0.75 $T_m$, 0.8 $T_m$ and 0.85 $T_m$ and less than 0.9 $T_m$, or a value in a range defined by any of these values, where $T_m$ is the melting temperature of the compacted ceramic powder layers 704A, 704B. For example, for a ceramic powder having a mullite-forming composition with a melting temperature of 1828° C., the heating molten metal mixture 716 can be heated to between about 1280° C. to 1650° C., for instance about 1430° C. (about 2600° F.). After sintering, the final diffusive lining 403A, 403B, e.g., having a two layer structure described above with respect to FIG. 6C, is formed. Afterwards, the heating molten metal mixture 712 is poured off, and the melting furnace 608A (FIG. 6A) or 608B (FIG. 6B) is obtained.

Figure 8:
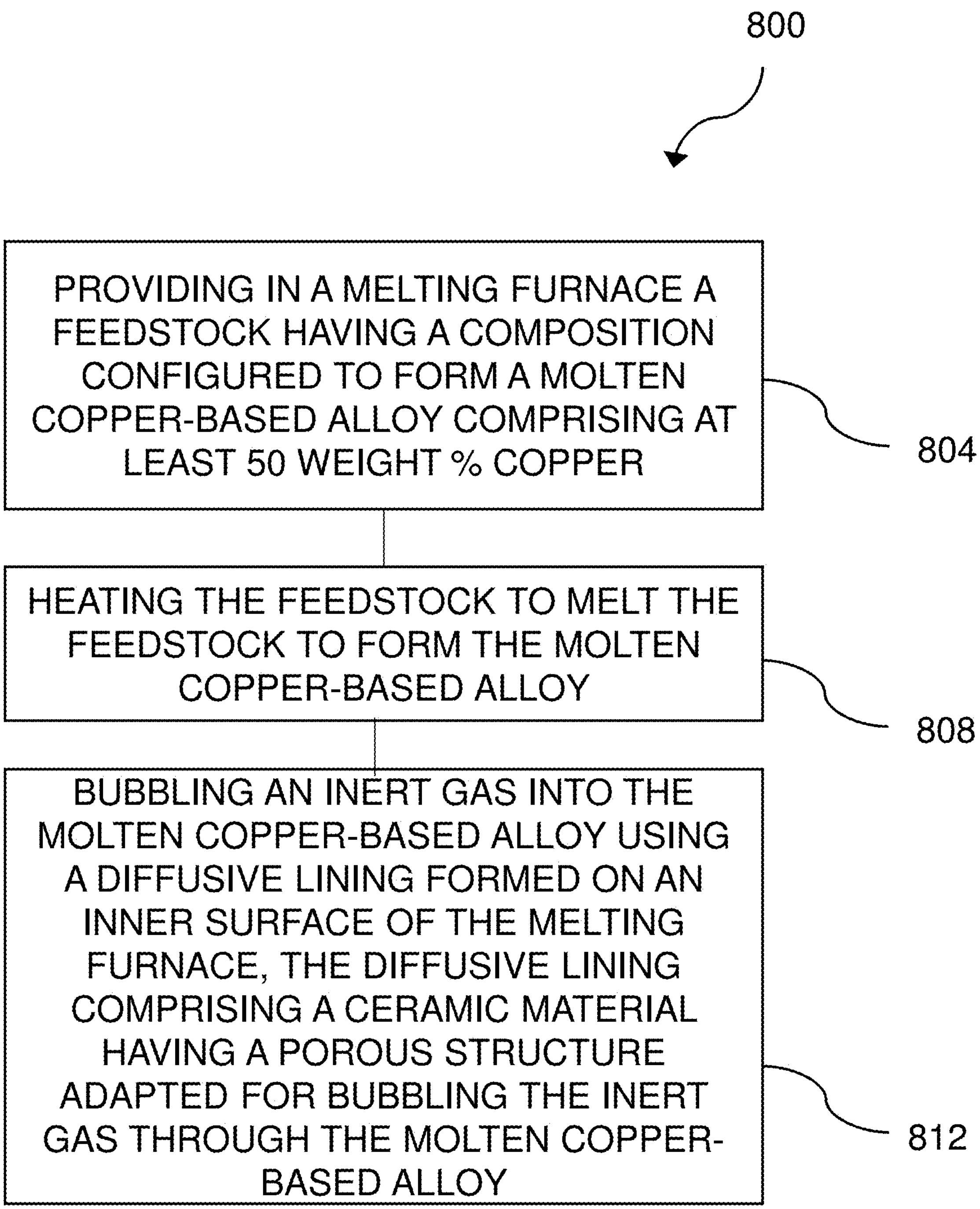
FIG. 8 illustrates method of manufacturing a copper-based alloy having low impurity content using a diffusive lining, according to embodiments.

FIG. 8 illustrates method of manufacturing a copper-based alloy having low impurity content using a melting furnace having a diffusive lining, according to embodiments. The illustrated method can include various features of the method 500 of manufacturing a copper-based alloy having low impurity content described above with respect to FIG. 5. Various features that can be commonly present between the method 500 (FIG. 5) and the method 800 (FIG. 8) are omitted herein for brevity. Similar to the method 500 of FIG. 5, the method 800 includes providing 804 in a melting furnace a feedstock. The feedstock can have, without limitation, a composition configured to form a molten copper-based alloy comprising at least 50 weight % copper. The method 800 additionally includes heating 808 the feedstock to melt the feedstock to form the molten alloy, e.g., a copper-based alloy. The method additionally includes bubbling 818 an inert gas into the molten alloy, e.g., the copper-based alloy. Unlike the method 500 (FIG. 5), however, the method 800 includes, using a diffusive lining formed on an inner surface of the melting furnace chamber, bubbling 812 the inert gas through the alloy. The diffusive lining can have any configuration of the diffusive lining 400A, 400B described above with respect to FIGS. 6A-6C. For example, the diffusive lining 400A, 400B comprises an aluminum-silicate ceramic material having a porous structure adapted for bubbling the inert gas through the molten copper-based alloy. According to embodiments, bubbling 812 the inert gas through the molten copper-based alloy can include using a diffusive lining substantially covering a bottom inner surface of the melting furnace and having a porous structure adapted for bubbling the inert gas into the molten copper-based alloy. According to embodiments, bubbling 812 the inert gas through the molten copper-based alloy can include using a diffusive lining formed on at least two different inner surfaces of the melting furnace such that the diffusive lining is adapted for bubbling the inert gas into the molten copper-based alloy from the at least two different inner surfaces.

EXPERIMENTAL EXAMPLES

To fabricate specimens used to obtain mechanical test results, a copper feedstock, e.g., a feedstock of alloy C87850 was melted at 1950° F. in a 4000 lb. furnace and argon gas was bubbled into the melting furnace through the copper-based alloy at a rate of 4 liters/minute for a period of 90 min. A reference ingot was also produced using the same system but without sparging, e.g., bubbling argon through the molten copper-based alloy in the melting furnace. Both the copper ingot produced with argon gas and the reference copper ingot were tested using ASTM E8/E8M-21, the American Society for Testing Materials Standard Test Methods for Tension Testing of Metallic Materials E8/E8M-21. The results of these tests can be seen in TABLE 1.

TABLE 1

| Copper-based alloy | Ultimate Tensile Strength (ksi) | 0.5% Yield Strength EUL (ksi) | Elongation in 2" (%) | Reduction of Area" (%) |
|---|---|---|---|---|
| Ref. Criteria | 85.0 | 35.0 | 15 | n/a |
| Sparged | 98.5 | 42.0 | 21 | 21 |
| Unsparged | 67.0 | 36.1 | 11 | 10 |

As shown, for the particular C87850 alloy, the measured mechanical properties are clearly superior. For example, the ultimate tensile strength is improved by 47%. Similar results were repeatably obtained for various copper-based alloys. Similar comparisons were made for four representative copper-based alloys including C87850, C89833, C99500 and C96400. The nominal compositions of the four alloys are shown in TABLE 2.

TABLE 3-continued

| Alloy | | Ultimate Strength (ski) | 0.5% Yield Strength EUL (ksi) | Elongation in 2" (%) |
|---|---|---|---|---|
| C89833 | Sparged | 41.6 | 18.5 | 36 |
| | Unsparged | 14.4 | 13.5 | 2.5 |
| | Difference | 27.2 | 5 | 33.5 |
| | % Difference from non-sparged | 188.89% | 37.04% | 1340.00% |
| C99500 | Sparged | 73.5 | 45.5 | 18 |
| | Unsparged | 69.5 | 45.4 | 7.5 |
| | Difference | 4 | 0.1 | 10.5 |
| | % Difference from non-sparged | 5.76% | 0.22% | 140.00% |
| C96400 | Sparged | 67.5 | 28.7 | 33 |
| | Unsparged | 37 | 26 | 18 |
| | Difference | 30.5 | 2.7 | 15 |
| | % Difference from non-sparged | 82.43% | 10.38% | 83.33% |

The measured mechanical properties of sparged ingots are clearly superior. For example, the ultimate tensile strength is improved by 46%, 189%, 6% and 82% for alloys having C87850, C89833, C99500 and C96400 alloy compositions.

As disclosed herein, a copper-based alloy composition according to various embodiments including a feedstock composition can include, in weight percent: Cu in the amount greater than 50%, 60%, 70%, 80%, 90% 95%, or a value in a range defined by any of these values; Sn in the amount greater than 0.1%, 0.2%, 0.5%, 1%, 2%, 5%, 10%, or a value in range defined by any of these values; Pb in the amount greater than 0.01%, 0.02%, 0.05%, 0.1%, 0.2%, 0.5%, or a value in range defined by any of these values; Zn in the amount greater than 0.1%, 0.2%, 0.5%, 1%, 2%, 5%, 10%, 20%, 30% or a value in range defined by any of these values; Fe in the amount greater than 0.1%, 0.2%, 0.5%, 1%, 2%, 5%, 10%, or a value in range defined by any of these values; Sb in the amount greater than 0.01%, 0.02%, 0.05%, 0.1%, 0.2%, 0.5%, or a value in range defined by any of

TABLE 2

| Description | CA# | Cu % | Sn % | Pb % | Zn % | Fe % | Sb % | Ni % | S % | P % | Al % | Si | Mn % | Bi % | Nb % |
|---|---|---|---|---|---|---|---|---|---|---|---|---|---|---|---|
| Silicon Bronze | C87850 | 74.00-78.00 | 0.30 max | 0.09 max | 20.00-24.00 | 0.10 max | — | 0.20 max | — | 0.05-0.20 | <0.01 | 2.70-3.40 | 0.10 max | | |
| Bismuth Brass Alloy | C89833 | 86.00-91.00 | 4.00-6.00 | 0.09 max | 2.00-4.00 | 0.20 max | 0.25 max | 1.00 max | 0.30 max | 0.05 max | 0.005 max | 0.005 max | — | 1.70-2.70 | |
| Copper Nickel | C96400 | Balance | — | 0.01 max | — | 0.25-1.50 | — | 28.0-32.0 | 0.02 max | 0.02 max | — | 0.05 max | 1.50 max | | 0.50-1.50 |
| Special Copper Alloy | C99500 | Balance | — | 0.25 max | 0.50-2.00 | 3.00-5.00 | — | 3.50-5.50 | — | — | 0.50-2.00 | 0.50-2.00 | 0.50 max | | |

For each alloy system shown in TABLE 2, copper ingot were produced with and without sparging using argon gas, and were tested using ASTM E8/E8M-21, the American Society for Testing Materials Standard Test Methods for Tension Testing of Metallic Materials E8/E8M-21. The results of these tests can be seen in TABLE 3.

TABLE 3

| Alloy | | Ultimate Strength (ski) | 0.5% Yield Strength EUL (ksi) | Elongation in 2" (%) |
|---|---|---|---|---|
| C87850 | Sparged | 75 | 33.4 | 19 |
| | Unsparged | 51.5 | 25 | 15 |
| | Difference | 23.5 | 8.4 | 4 |
| | % Difference from non-sparged | 45.63% | 33.60% | 26.67% |

these values; Ni in the amount greater than 0.1%, 0.2%, 0.5%, 1%, 2%, 5%, 10%, 20%, 30%, 40% or a value in range defined by any of these values; S in the amount greater than 0.01%, 0.02%, 0.05%, 0.1%, 0.2%, 0.5%, or a value in range defined by any of these values; Pin the amount greater than 0.01%, 0.02%, 0.05%, 0.1% or a value in range defined by any of these values; Al in the amount greater than 0.01%, 0.02%, 0.05%, 0.1%, 0.2%, 0.5%, 1%, 2%, 5%, or a value in range defined by any of these values; Si in the amount greater than 0.01%, 0.02%, 0.05%, 0.1%, 0.2%, 0.5%, 1%, 2%, 5%, or a value in range defined by any of these values; Mn in the amount greater than 0.01%, 0.02%, 0.05%, 0.1%, 0.2%, 0.5%, 1%, 2% or a value in a range defined by any of these values; Bi in the amount greater than 0.01%, 0.02%, 0.05%, 0.1%, 0.2%, 0.5%, 1%, 2%, 5% or a value in a range defined by any of these values; Nb in the amount greater than 0.01%, 0.02%, 0.05%, 0.1%, 0.2%, 0.5%, 1%, 2% or a value in a range defined by any of these values. Further, the copper-based alloy composition can include any one or more elements disclosed in TABLE 2 in a range defined by any of the corresponding amounts, including those corresponding to C87850, C89833, C99500 and C96400 alloy compositions.

In the following, various Additional Examples are disclosed. It will be appreciated that any one of the Additional Examples can be combined with any other one(s) of the Additional Examples, unless doing so would be contrariwise to the present disclosure.

Additional Examples I

1. An apparatus for manufacturing a copper-based alloy, the apparatus comprising:
 - an enclosed melting furnace configured to form a molten copper-based alloy comprising at least 50 weight % copper under an enclosed inert atmosphere and to bubble an inert gas through the molten copper-based alloy; and
 - a transfer ladle configured to receive the molten copper-based alloy from the melting furnace under the enclosed inert atmosphere and to transfer the molten copper-based alloy into one or more molds or a shot pit configured to solidify the molten copper-based alloy.

2. An apparatus for manufacturing a copper-based alloy, the apparatus comprising:
 - an enclosed melting furnace configured to form a molten copper-based alloy comprising at least 50 weight % copper under an enclosed inert atmosphere and to bubble an inert gas through the molten copper-based alloy; and
 - a transfer ladle configured to receive the molten copper-based alloy from the melting furnace through a velocity control element, and to transfer the molten copper-based alloy into one or more molds or a shot pit configured to solidify the molten copper-based alloy.

3. The apparatus of Embodiment 1, wherein the transfer ladle is configured to receive the molten copper-based alloy from the melting furnace through a velocity control element.

4. The apparatus of Embodiment 2, wherein the transfer ladle is configured to receive the molten copper-based alloy from the melting furnace under the enclosed inert atmosphere.

5. The apparatus of any one of the above Embodiments, wherein the transfer ladle is configured to transfer the molten copper-based alloy into the shot pit configured to solidify the molten copper-based alloy into a copper-based shot.

6. The apparatus of any one of the above Embodiments, wherein the one or more molds are ingot molds which are configured to solidify the molten copper-based alloy into a copper-based ingot.

7. The apparatus of any one of the above Embodiments, wherein the enclosed melting furnace and the transfer ladle are configured to substantially exclude outside air from mixing with the enclosed inert atmosphere.

8. The apparatus of any one of the above Embodiments, wherein the melting furnace and the transfer ladle are integrally connected to be sealed from an outer atmosphere while under a common enclosed inert atmosphere.

9. The apparatus of any one of the above Embodiments, wherein the inert gas and the same enclosed inert atmosphere consist essentially of argon.

10. The apparatus of any one of the above Embodiments, wherein the inert gas is hydrogen-free.

11. The apparatus of any one of the above Embodiments 1, 3 and 5-10, further comprising a velocity control element configured to transfer the molten copper-based alloy from the enclosed melting furnace to the encapsulated transfer ladle at a controlled velocity adapted for reduced velocity-induced entrainment in the copper-based alloy to a reference copper-based alloy formed from a reference apparatus configured to be the same as the apparatus except for the presence of the velocity control element.

12. The apparatus of Embodiment 11, wherein the velocity control element comprises a ramp.

13. The apparatus of Embodiments 11 or 12, wherein the controlled velocity is less than 100 in/s.

14. The apparatus of any one of the above embodiments, further comprising a second velocity control element configured to transfer the molten copper-based alloy from the encapsulated transfer ladle to the one or more molds or the shot pit at a second controlled velocity adapted for reduced velocity-induced entrainment in the copper-based alloy relative to a reference copper-based alloy formed from a reference apparatus configured to be the same as the apparatus except for the presence of the velocity control element.

15. The apparatus of Embodiment 14, wherein the second velocity control element comprises a ramp.

16. The apparatus of Embodiments 14 or 15, wherein the second controlled velocity is less than 30 in/s.

17. The apparatus of any one of the above Embodiments, wherein the encapsulated transfer ladle is thermally insulated.

18. The apparatus of any one of the above Embodiments, further comprising a diffuser disposed at the bottom of the melting furnace and having a plurality of through-holes adapted for bubbling the inert gas into the molten copper-based alloy in the form of inert gas bubbles having a size distribution adapted to reduce an oxygen content from the molten copper-based alloy.

19. The apparatus of Embodiment 18, wherein the diffuser is configured to flow therethrough the inert gas at a flow rate of 2-6 liters per minute.

20. The apparatus of Embodiments 18-19, wherein the diffuser has a porosity greater than 20%.

21. The apparatus of Embodiments 18-19, wherein the diffuser has a diameter greater than 5 cm and smaller than an inner diameter of the melting furnace.

22. The apparatus of Embodiments 18-19, wherein the melting furnace has an inner diameter exceeding 50 cm.

23. The apparatus of any one of the above Embodiments, wherein the apparatus is configured such that the copper-based alloy has an oxygen content that is reduced by at least 10% relative to a reference copper-based alloy formed from a reference apparatus configured to be the same as the apparatus except for the melting furnace and the transfer ladle being under the same enclosed inert atmosphere.

24. The apparatus of any one of the above Embodiments, wherein the apparatus is configured such that the copper-based alloy has an oxygen content that is reduced by at least 10% relative to a reference copper based alloy formed from a reference apparatus configured to be the same as the apparatus except for the melting furnace being configured to bubble the inert gas through the molten copper-based alloy.

25. The apparatus of any one of the above Embodiments, wherein the apparatus is configured such that one or more testing results obtained using an ASTM E8/E8M-21 method from the copper-based alloy has, relative to a reference copper-based alloy formed from a reference apparatus configured to be the same as the apparatus except for the melting furnace and the transfer ladle being under the same enclosed inert atmosphere:

an ultimate tensile strength that is increased by at least 5 ksi; 0.5% yield strength that is increased by at least 3 ksi;

elongation that is increased by at least 5%; and reduction in cross-sectional area that increased by at least 5%.

26. The apparatus of any one of the above Embodiments, wherein the apparatus is configured such that the copper-alloy has an ultimate tensile strength that is increased by at least 20 ksi relative to a reference copper-based alloy formed from a reference apparatus configured to be the same as the apparatus except for the melting furnace being configured to bubble the inert gas through the molten copper-based alloy.

27. The apparatus of Embodiment 1, wherein the transfer ladle is configured to transfer the molten copper-based alloy into the shot pit configured to solidify the molten copper-based alloy into the copper-based shot.

28. The apparatus of Embodiment 1, wherein the transfer ladle is configured to transfer the molten copper-based alloy into the one of more ingot molds configured to solidify the molten copper-based alloy into the copper-based ingot.

29. The apparatus of Embodiment 1, wherein the melting furnace is configured to transfer the molten copper-based alloy to the transfer ladle from a lower half of a volume of the molten copper-based alloy prior to transferring a remainder of the molten copper-based alloy.

30. The apparatus of Embodiment 1, wherein a first velocity element is connected to a lower half of the melting furnace.

31. The apparatus of any one of the above Embodiments, wherein the melting furnace further comprises a diffusive lining comprising an aluminum-silicate ceramic having a porous structure adapted for bubbling the inert gas through the molten copper-based alloy.

32. The apparatus of any one of Embodiments 1-30, wherein the melting furnace further comprises a diffusive lining substantially covering a bottom inner surface thereof and having a porous structure adapted for bubbling an inert gas into the molten copper-based alloy.

33. The apparatus of any one of Embodiments 1-30, wherein the melting furnace further comprises a diffusive lining having a porous structure, wherein the diffusive lining is formed on at least two different inner surfaces of the melting furnace such that the diffusive lining is adapted for bubbling an inert gas into the molten copper-based alloy from the at least two different inner surfaces.

34. The apparatus according to Embodiments 32 or 33, wherein the diffusive lining comprises an aluminum-silicate ceramic.

35. The apparatus according to Embodiments 31 or 33, wherein the diffusive lining substantially covers a bottom inner surface of the melting furnace.

36. The apparatus according to Embodiments 31 or 32, wherein the diffusive lining is formed on at least two different inner surfaces of the melting furnace such that the a diffusive lining is adapted for bubbling an inert gas into the molten copper-based alloy from the at least two different inner surfaces.

37. The apparatus according to any one of the above Embodiments, wherein the apparatus is further according to any one of Embodiments in Additional Examples III.

Additional Examples II

1. A method of manufacturing a copper-based alloy, the method comprising:

providing in a melting furnace a plurality of feedstock pieces having a combined composition configured to form a molten copper-based alloy comprising at least 50 weight % copper;

flowing an inert gas through gaps between the feedstock pieces prior to heating;

heating the feedstock pieces while flowing the inert gas therethrough, thereby melting the feedstock pieces to form the molten copper-based alloy;

bubbling the inert gas through the molten copper-based alloy; and transferring the molten copper-based alloy into a transfer ladle.

2. A method of manufacturing a copper-based alloy, the method comprising:

providing in a melting furnace a plurality of feedstock pieces having a combined composition configured to form a molten copper-based alloy comprising at least 50 weight % copper;

heating the feedstock pieces to form the molten copper-based alloy;

bubbling the inert gas through the molten copper-based alloy; and transferring the molten copper-based alloy into a transfer ladle, wherein one or more of heating the feedstock pieces, bubbling the inert gas and transferring the molten copper-based alloy is performed at least partly under an enclosed inert atmosphere configured to substantially exclude outside air from mixing with the enclosed inert atmosphere.

3. A method of manufacturing a copper-based alloy, the method comprising:

providing in a melting furnace a plurality of feedstock pieces having a combined composition configured to form a molten copper-based alloy comprising at least 50 weight % copper;

heating the feedstock pieces to form a molten copper-based alloy;

bubbling the inert gas through the molten copper-based alloy; and transferring the molten copper-based alloy into a transfer ladle, wherein transferring comprises limiting a velocity of the molten copper-based alloy that is transferred from the melting furnace to the transfer ladle to less than 100 in/sec.

4. The method of Embodiments 2 or 3, further comprising, prior to heating, flowing an inert gas through gaps between the feedstock pieces, and wherein heating comprises heating the feedstock pieces while flowing the inert gas therethrough.

5. The method of Embodiments 1 or 3, wherein one or more of heating the feedstock pieces, bubbling the inert gas and transferring the molten copper-based alloy is performed at least partly under an enclosed inert atmosphere configured to substantially exclude outside air from mixing with the enclosed inert atmosphere.

6. The method of Embodiments 1 or 2, wherein transferring comprises limiting a velocity of the molten copper-based alloy that is transferred from the melting furnace to the transfer ladle to less than 100 in/sec.

7. The method of any one of the above Embodiments, wherein the feedstock pieces comprise one or both of alloy pieces and elemental metal pieces.

8. The method of any one of the above Embodiments, wherein flowing the inert gas comprises flowing prior to initiating the heating of the feedstock pieces.

9. The method of any one of the above Embodiments, wherein flowing the inert gas comprises flowing at a sufficient flow rate such that the feedstock pieces are substantially under a flowing inert gas atmosphere prior to and during melting.

10. The method of any one of the above Embodiments, further comprising, prior to transferring, adding additional feedstock pieces while bubbling the inert gas through the molten copper-based alloy.

11. The method of any one of the above Embodiments, wherein bubbling the inert gas continues through transferring the molten copper-based alloy.

12. The method of any one of the above Embodiments, wherein bubbling the inert gas comprises bubbling at a sufficient flow rate such that the molten copper-based alloy is substantially under a flowing inert gas atmosphere during bubbling of the inert gas.

13. The method of any one of the above Embodiments, one or more of heating the feedstock pieces, bubbling the inert gas and transferring the molten copper-based alloy is performed under a common inert atmosphere.

14. The method of Embodiment 13, wherein the common inert atmosphere comprises an enclosed common inert atmosphere shared by the melting furnace and the transfer ladle.

15. The method of Embodiment 14, wherein the enclosed inert common atmosphere is enclosed by keeping an injector of the transfer ladle closed until immediately prior to ejecting the molten copper-based alloy from the transfer ladle to a mold.

16. The method of any one of the above Embodiments, wherein flowing and bubbling the inert gas comprise flowing and bubbling the inert gas consisting essentially of argon.

17. The method of any one of the above Embodiments, wherein flowing and bubbling the inert gas comprise flowing and bubbling the inert gas that is essentially hydrogen-free.

18. The method of any one of the above Embodiments, wherein flowing and bubbling the inert gas comprise diffusing through a diffuser disposed at a bottom of the melting furnace and having a plurality of pores adapted for bubbling the inert gas into the molten copper-based alloy in the form of inert gas bubbles.

19. The method of any one of the above Embodiments, wherein flowing and bubbling the inert gas comprise flowing at a flow rate of 2-6 liters per minute through a diffuser having a porosity greater than 20%.

20. The method of any one of the above Embodiments, wherein flowing and bubbling the inert gas comprise flowing at a flow rate of 2-6 liters per minute through a diffuser having a diameter greater than 5 cm and smaller than an inner diameter of the melting furnace.

21. The method of Embodiment 17, wherein flowing and bubbling the inert gas comprise flowing through the melting furnace having an inner diameter exceeding of 50 cm.

22. The method of any one of the above Embodiments, wherein heating comprises heating to a temperature greater than a temperature of the copper-based alloy by 100-400° C.

23. The method of Embodiment 22, further comprising, prior to transferring, cooling the molten copper-based alloy by 100-400° C.

24. The method of any one of the above Embodiments, wherein transferring comprises pouring the molten copper-based alloy disposed in a lower half of the melting furnace.

25. The method of any one of the above Embodiments, wherein transferring comprises limiting a velocity of the molten copper-based alloy that is transferred from the melting furnace to the transfer ladle using a sloped ramp.

26. The method of any one of the above Embodiments, after transferring the molten copper-based alloy to the transfer ladle by limiting a velocity thereof through a sloped ramp, ejecting the molten copper-based alloy from the transfer ladle by opening one or more injection valves.

27. The method of Embodiment 26, wherein the sloped ramp is under an inert atmosphere.

28. The method of Embodiment 24, transferring the molten copper-based alloy is performed under an enclosed common inert atmosphere shared by the melting furnace, the transfer ladle and the sloped ramp.

29. The method of any one of the above Embodiments, wherein after transferring the molten copper-based alloy to the transfer ladle by limiting a velocity thereof through a sloped ramp, ejecting the molten copper-based alloy from the transfer ladle by opening one or more injection valves one or more molds or a shot pit to solidify the molten copper-based alloy.

30. The method of any one of the above Embodiments, wherein after transferring the molten copper-based alloy to the transfer ladle by limiting a velocity thereof through a sloped ramp, ejecting the molten copper-based alloy from the transfer ladle to a second sloped ramp to further limit a velocity of the molten copper-based alloy, prior to disposing the molten copper-based alloy into one or more molds or a shot pit to solidify the molten copper-based alloy.

31. The method of any one of the above Embodiments, wherein bubbling the inert gas comprises bubbling using a diffusive lining formed on an inner surface of the melting furnace chamber, the diffusive lining comprising an aluminum-silicate ceramic material having a porous structure adapted for bubbling the inert gas through the molten copper-based alloy.

32. The method of any one of Embodiments 1-30, wherein bubbling the inert gas comprises bubbling using a diffusive lining formed in the melting furnace chamber, the diffusive lining substantially covering a bottom inner surface of the melting furnace and having a porous structure adapted for bubbling the inert gas into the molten copper-based alloy.

33. The method of any one of Embodiments 1-30, wherein bubbling the inert gas comprises bubbling using a diffusive lining having a porous structure, the diffusive lining formed on at least two different inner surfaces of the melting furnace such that the diffusive lining is adapted for bubbling the inert gas into the molten copper-based alloy from the at least two different inner surfaces.

34. The method according to Embodiments 32 or 33, wherein the diffusive lining comprises an aluminum-silicate ceramic.

35. The method according to Embodiments 31 or 33, wherein the diffusive lining substantially covers a bottom inner surface of the melting furnace.

36. The method according to Embodiments 31 or 32, wherein the diffusive lining is formed on at least two different inner surfaces of the melting furnace such that the a diffusive lining is adapted for bubbling an inert gas into the molten copper-based alloy from the at least two different inner surfaces.

37. The method according to any one of the above Embodiments, wherein the method is further according to any one of Embodiments in Additional Examples VI.

Additional Examples III

1. An apparatus for manufacturing a copper-based alloy, the apparatus comprising:

a melting furnace configured to form a molten copper-based alloy comprising at least 50 weight % copper; and a diffusive lining formed on an inner surface of the melting furnace and comprising an aluminum-silicate ceramic having a porous structure adapted for bubbling an inert gas through the molten copper-based alloy.

2. An apparatus for manufacturing a copper-based alloy, the apparatus comprising:

a melting furnace configured to form a molten copper-based alloy comprising at least 50 weight % copper; and a diffusive lining substantially covering a bottom inner surface of the melting furnace and having a porous structure adapted for bubbling an inert gas into the molten copper-based alloy.

3. An apparatus for manufacturing a copper-based alloy, the apparatus comprising:

a melting furnace configured to form a molten copper-based alloy comprising at least 50 weight % copper; and a diffusive lining having a porous structure in the melting furnace, wherein the diffusive lining is formed on at least two different inner surfaces of the melting furnace such that the diffusive lining is adapted for bubbling an inert gas into the molten copper-based alloy from the at least two different inner surfaces.

4. The apparatus according to Embodiments 2 or 3, wherein the diffusive lining comprises an aluminum-silicate ceramic.

5. The apparatus according to Embodiments 1 or 3, wherein the diffusive lining substantially covers a bottom inner surface of the melting furnace.

6. The apparatus according to Embodiments 1 or 2, wherein the diffusive lining is formed on at least two different inner surfaces of the melting furnace such that the a diffusive lining is adapted for bubbling an inert gas into the molten copper-based alloy from the at least two different inner surfaces.

7. The apparatus according to any one of the above Embodiments, wherein the diffusive lining comprises alumina and silica.

8. The apparatus according to any one of the above Embodiments, wherein the diffusive lining comprises mullite.

9. The apparatus according to any one of the above Embodiments, wherein the diffusive lining comprises at least two layers comprising a sintered ceramic layer and an unsintered ceramic layer.

10. The apparatus according to Embodiment 9, wherein the sintered ceramic layer comprises mullite.

11. The apparatus according to Embodiment 9, wherein the unsintered ceramic layer comprises alumina and silica.

12. The apparatus according to Embodiment 10, wherein the sintered ceramic layer is configured to contact the molten copper-based alloy.

13. The apparatus according to Embodiment 9, wherein the unsintered ceramic layer comprises a compacted ceramic powder layer comprising alumina and silica.

14. The apparatus according to Embodiment 9, wherein the sintered ceramic layer is formed by partially sintering a compacted ceramic powder layer such that the sintered ceramic layer and the unsintered ceramic layer have substantially the same chemical composition while having different phases.

15. The apparatus according to Embodiment 9, wherein the unsintered ceramic layer comprises 60-70% alumina and 20-25% silica.

16. The apparatus according to Embodiment 9, wherein the unsintered ceramic layer comprises a compacted ceramic powder layer having an average particle size less than 63 μm or corresponding to number 4 on the $\phi$ scale.

17. The apparatus according to any one of the above Embodiments, wherein the diffusive lining has a thickness of 3-6 inches.

18. The apparatus according to any one of the above Embodiments, wherein the diffusive lining covers an entire bottom inner surface of the melting furnace.

19. The apparatus according to any one of the above Embodiments, wherein the diffusive lining over a bottom inner surface of the melting furnace has a thickness of 4-6 inches.

20. The apparatus according to any one of the above Embodiments, wherein the diffusive lining covers at least an inner sidewall surface of the melting furnace.

21. The apparatus according to any one of the above Embodiments, wherein the diffusive lining over a an inner sidewall of the melting furnace has a thickness of 3-4 inches.

22. The apparatus according to any one of the above Embodiments, wherein the diffusive lining is configured to contact the molten copper-based alloy.

23. The apparatus according to any one of the above Embodiments, wherein the inert gas consists essentially of argon.

24. The apparatus according to any one of the above Embodiments, wherein the inert gas is hydrogen-free.

25. The apparatus according to any one of the above Embodiments, further comprising a diffuser centrally disposed within the diffusive lining at a bottom inner surface of the melting furnace, the diffuser comprising a diffuser material disposed within a container connected to an inert gas source and having an upper surface disposed below an upper surface of the diffusive lining covering the bottom inner surface.

26. The apparatus according to Embodiment 25, wherein the diffuser overlaps a portion of the diffusive lining over the bottom inner surface of the melting furnace.

27. The apparatus according to Embodiment 26, wherein the diffuser contacts the diffusive lining and comprises the same material as the diffusive lining.

28. The apparatus according to any one of Embodiments 25-27, wherein one or both of the diffuser and the diffusive lining have a porosity greater than 20%.

29. The apparatus according to any one of Embodiments 25-28, wherein the diffuser has a lateral dimension less than 50% of a lateral dimension of the diffusive lining covering a bottom inner surface of the melting furnace.

30. The apparatus according to any one of Embodiments 25-29, wherein the diffuser has a diameter greater than 5 cm and smaller than a diameter of the diffusive lining covering a bottom inner surface of the melting furnace.

31. The apparatus according to any one of Embodiments 25-30, wherein the diffusive lining covering a bottom inner surface of the melting furnace has a diameter exceeding 50 cm.

32. The apparatus according to any one of Embodiments 25-31, wherein the melting furnace is configured to melt the copper-based alloy under an enclosed chamber configuration in which an atmosphere above the molten copper-based alloy is isolated from an outside atmosphere.

33. The apparatus according to any one of Embodiments 25-31, wherein the melting furnace is configured to melt the copper-based alloy under an open chamber configuration in which an atmosphere above the molten copper-based alloy is exposed to an outside atmosphere.

34. The apparatus according to Embodiment 32, wherein the apparatus is configured to diffusedly flow the inert gas at a flow rate of 2-6 liters per minute under the enclosed chamber configuration.

35. The apparatus according to Embodiment 33, wherein the apparatus is configured to diffusedly flow the inert gas at a flow rate of 4-13 liters per minute under the open chamber configuration.

36. The apparatus according to any one of the above Embodiments, wherein the melting furnace is an induction furnace comprising an induction coil surrounding the melting furnace and configured to melt the copper-based alloy.

37. The apparatus according to Embodiment 36, wherein the induction furnace is configured to operate at a frequency less than 1000 Hz.

38. The apparatus according to Embodiments 36 and 37, wherein a topmost winding of the induction coil is disposed at a vertical position below a fill line of the molten copper-based alloy.

39. The apparatus according to any one of the above Embodiments, further comprising an inert gas source connected to the diffusive lining for supplying the inert gas to the melting furnace.

40. The apparatus according to any one of the above Embodiments, further comprising a diffuser smaller than and embedded within the diffusive lining covering a bottom inner surface of the melting furnace.

41. The apparatus according to Embodiment 40, wherein the diffuser and the diffusive lining comprise the same diffuser material.

42. The apparatus according to Embodiment 40, wherein the diffuser comprises a diffuser material disposed within a container connected to an inert gas source and having an upper surface disposed below an upper surface of the diffusive lining covering a bottom inner surface of the melting furnace.

43. The apparatus according to any one of the above Embodiments, wherein the apparatus is further according to any one of Embodiments in Additional Examples I Additional Examples IV 1. A method of manufacturing an apparatus for fabricating a copper-based alloy, the method comprising:

providing a melting furnace chamber configured to form a molten copper-based alloy comprising at least 50 weight % copper; and forming a diffusive lining on an inner surface of the melting furnace chamber, the diffusive lining comprising an aluminum-silicate ceramic material having a porous structure adapted for bubbling an inert gas through the molten copper-based alloy.

2. A method of manufacturing an apparatus for fabricating a copper-based alloy, the method comprising:

providing a melting furnace chamber configured to form a molten copper-based alloy comprising at least 50 weight % copper; and forming a diffusive lining substantially covering a bottom inner surface of the melting furnace and having a porous structure adapted for bubbling an inert gas into the molten copper-based alloy.

3. A method of manufacturing an apparatus for fabricating a copper-based alloy, the method comprising:

providing a melting furnace chamber configured to form a molten copper-based alloy comprising at least 50 weight % copper; and forming a diffusive lining having a porous structure on at least two different inner surfaces of the melting furnace such that the diffusive lining is adapted for bubbling an inert gas into the molten copper-based alloy from the at least two different inner surfaces.

4. The method according to Embodiments 2 or 3, wherein the diffusive lining comprises an aluminum-silicate ceramic.

5. The method according to Embodiments 1 or 3, wherein forming the diffusive lining comprises substantially covering a bottom inner surface of the melting furnace.

6. The method according to Embodiments 1 or 2, wherein forming the diffusive lining comprises forming on at least two different inner surfaces of the melting furnace such that the diffusive lining is adapted for bubbling an inert gas into the molten copper-based alloy from the at least two different inner surfaces.

7. The method according to any one of the above Embodiments, wherein the diffusive lining comprises alumina and silica.

8. The method according to any one of the above Embodiments, wherein the diffusive lining comprises mullite.

9. The method according to any one of the above Embodiments, wherein forming the diffusive lining comprises forming at least a sintered ceramic layer and an unsintered ceramic layer.

10. The method according to Embodiment 9, wherein forming the sintered ceramic layer comprises sintering a portion of a compacted ceramic powder layer to form mullite.

11. The method according to Embodiment 9, wherein forming the unsintered ceramic layer comprises forming a compacted ceramic powder layer comprising alumina and silica.

12. The method according to Embodiment 10, wherein forming the sintered ceramic layer comprises configuring to contact the molten copper-based alloy.

13. The method according to Embodiment 9, wherein forming the sintered layer and the unsintered layer comprises forming from a same compacted ceramic powder layer comprising alumina and silica.

14. The method according to Embodiment 9, wherein forming the sintered ceramic layer comprises partially sintering a compacted ceramic powder layer such that the sintered layer and the unsintered ceramic layer have substantially the same chemical composition while having different phases.

15. The method according to Embodiment 9, wherein the unsintered ceramic layer comprises 60-70% alumina and 20-25% silica.

16. The method according to Embodiment 9, wherein the unsintered ceramic layer comprises a compacted ceramic powder layer having an average particle size less than 63 $\mu m$ or corresponding to number 4 on the $\phi$ scale.

17. The method according to any one of the above Embodiments, wherein the diffusive lining has a thickness of 3-6 inches.

18. The method according to any one of the above Embodiments, wherein forming the diffusive lining comprises covering an entire bottom inner surface of the melting furnace.

19. The method according to any one of the above Embodiments, wherein the diffusive lining over a bottom inner surface of the melting furnace has a thickness of 4-6 inches.

20. The method according to any one of the above Embodiments, wherein forming the diffusive lining comprises covering at least a sidewall of the melting furnace.

21. The method according to any one of the above Embodiments, wherein the diffusive lining over a sidewall of the melting furnace has a thickness of 3-4 inches.

22. The method according to any one of the above Embodiments, wherein forming the diffusive lining comprises configuring to contact the molten copper-based alloy.

23. The method according to any one of the above Embodiments, wherein the inert gas consists essentially of argon.

24. The method according to any one of the above Embodiments, wherein the inert gas is hydrogen-free.

25. The method according to any one of the above Embodiments, further comprising disposing a diffuser centrally below the diffusive lining at a bottom of the melting furnace.

26. The method according to Embodiment 25, wherein disposing the diffuser comprises positioning to overlap a portion of the diffusive lining at the bottom of the melting furnace.

27. The method according to Embodiment 26, wherein disposing the diffuser comprises contacting the diffusive lining with the diffuser comprising the same material as the diffusive lining.

28. The method according to any one of Embodiments 25-27, wherein one or both of the diffuser and the diffusive lining have a porosity greater than 20%.

29. The method according to any one of Embodiments 25-28, wherein the diffuser has a lateral dimension less than 50% of a lateral dimension of the diffusive lining covering bottom inner surface of the melting furnace.

30. The method according to any one of Embodiments 25-29, wherein the diffuser has a diameter greater than 5 cm and smaller than the diffusive lining covering a bottom inner surface of the melting furnace.

31. The method according to any one of Embodiments 25-30, wherein the diffusive lining covering a bottom inner surface of the melting furnace has a diameter exceeding 50 cm.

32. The method according to any one of Embodiments 25-31, further comprising configuring the melting furnace to melt the copper-based alloy under an enclosed chamber configuration in which an atmosphere above the molten copper-based alloy is isolated from an outside atmosphere.

33. The method according to any one of Embodiments 25-31, further comprising configuring the melting furnace to melt the copper-based alloy under an open chamber configuration in which an atmosphere above the molten copper-based alloy is exposed to an outside atmosphere.

34. The method according to Embodiment 32, further comprising configuring the apparatus to diffusedly flow the inert gas at a flow rate of 2-6 liters per minute under an enclosed chamber configuration.

35. The method according to Embodiment 33, further comprising configuring the apparatus to diffusedly flow the inert gas at a flow rate of 4-13 liters per minute under an open chamber configuration.

36. The method according to any one of the above Embodiments, wherein the melting furnace is an induction furnace comprising a surrounding induction coil configured to melt the copper-based alloy.

37. The method according to Embodiment 36, wherein the induction furnace is configured to operate at a frequency less than 1000 Hz.

38. The method according to Embodiments 36 and 37, wherein a topmost winding of the induction coil is disposed half of a height of the molten copper-based alloy.

39. The method according to any one of the above Embodiments, wherein the method is further according to any one of Embodiments in Additional Examples V.

Additional Examples V

1. A method of manufacturing an apparatus for fabricating an alloy, the method comprising:

- providing a melting furnace chamber;
- disposing a compacted ceramic powder layer on an inner surface of the melting furnace chamber, the compacted ceramic powder layer comprising a mixture of silica and alumina; and
- sintering the compacted ceramic powder layer in the melting furnace to form a diffusive lining on the inner surface, the diffusive lining comprising an aluminum-silicate ceramic material having a porous structure adapted for diffusing gas therethrough.

2. A method of manufacturing an apparatus for fabricating an alloy, the method comprising:

- providing a melting furnace chamber;
- disposing a compacted ceramic powder layer on an inner surface of the melting furnace chamber; and
- selectively sintering a surface portion of the compacted ceramic powder layer, thereby forming a diffusive lining on the inner surface comprising a sintered ceramic layer on an unsintered ceramic layer.

3. A method of manufacturing an apparatus for fabricating an alloy, the method comprising:

- providing a melting furnace chamber;
- disposing a compacted ceramic powder layer on an inner surface of the melting furnace chamber; and
- sintering the compacted ceramic powder layer using heat from a heated material disposed in the melting furnace chamber, thereby forming a diffusive lining on the inner surface.

4. The method according to Embodiments 2 or 3, wherein sintering the compacted ceramic powder layer comprises sintering in the melting furnace to form the diffusive lining, the diffusive lining comprising an aluminum-silicate ceramic material having a porous structure adapted for diffusing gas therethrough.

5. The method according to Embodiments 1 or 3, wherein sintering comprises selectively sintering a surface portion of the compacted ceramic powder layer, thereby forming a diffusive lining on the inner surface comprising a sintered ceramic layer on an unsintered ceramic layer.

6. The method according to Embodiments 1 or 2, wherein sintering comprises using heat from a heated material disposed in the melting furnace chamber, thereby forming a diffusive lining on the inner surface.

7. The method according to any one of the above Embodiments, wherein disposing the compacted ceramic powder layer comprises covering a bottom surface of the melting furnace chamber with a bottom compacted ceramic powder layer.

8. The method according to any one of the above Embodiments, wherein disposing the compacted ceramic powder layer comprises covering a sidewall of the melting furnace chamber with a sidewall compacted ceramic powder layer.

9. The method according to any one of the above Embodiments, wherein sintering comprises using heat from a material disposed in the melting furnace chamber and heated using power applied to the melting furnace chamber.

10. The method according to Embodiment 9, wherein power applied to the melting furnace chamber comprises inductive power delivered through a coil surrounding the melting furnace chamber.

11. The method according to Embodiment 9, wherein sintering comprises using heat from an iron-containing material that is inductively heated by the power applied to the melting furnace chamber.

12. The method according to Embodiment 9, wherein sintering comprises using heat from an iron-containing material that is molten using power applied to the melting furnace chamber.

13. The method according to Embodiment 9, wherein the material is heated to a temperature sufficient to form mullite from silica and alumina.

14. The method according to any one of the above Embodiments, wherein the diffusive lining comprises alumina and silica.

15. The method according to any one of the above Embodiments, wherein the diffusive lining comprises mullite.

16. The method according to any one of the above Embodiments, wherein forming the diffusive lining comprises forming at least a sintered ceramic layer and an unsintered ceramic layer.

17. The method according to Embodiment 16, wherein forming the sintered ceramic layer is comprises sintering a portion of the compacted ceramic powder layer to form mullite.

18. The method according to Embodiment 17, wherein the unsintered ceramic layer comprises a remaining portion of the compacted ceramic powder layer that does not form mullite.

19. The method according to Embodiment 16, wherein forming the sintered ceramic layer comprises configuring to contact the molten copper-based alloy.

20. The method according to Embodiment 16, wherein forming the sintered layer and the unsintered layer comprises forming from the same compacted ceramic powder layer comprising alumina and silica.

21. The method according to Embodiment 16, wherein forming the sintered ceramic layer comprises partially sintering a compacted ceramic powder layer such that the sintered layer and the unsintered ceramic layer have substantially the same chemical composition while having different phases.

22. The method according to any one of the above Embodiments, wherein the compacted ceramic powder layer comprises 60-70% alumina and 20-25% silica.

23. The method according to any one of the above Embodiments, wherein the compacted ceramic powder layer comprises particles having an average particle size less than 63 μm or corresponding to number 4 on the ϕ scale.

24. The method according to any one of the above Embodiments, wherein the compacted ceramic powder layer has a thickness of 3-6 inches.

25. The method according to any one of the above Embodiments, wherein disposing the compacted ceramic powder layer comprises covering an entire bottom inner surface of the melting furnace.

26. The method according to any one of the above Embodiments, wherein the compacted ceramic powder layer over a bottom inner surface of the melting furnace has a thickness of 4-6 inches.

27. The method according to any one of the above Embodiments, wherein disposing the compacted ceramic powder layer comprises covering at least an inner sidewall surface of the melting furnace.

28. The method according to any one of the above Embodiments, wherein the compacted ceramic powder layer over an inner sidewall surface of the melting furnace has a thickness of 3-4 inches.

29. The method according to any one of the above Embodiments, wherein forming the diffusive lining comprises configuring to contact the molten copper-based alloy.

30. The method according to any one of the above Embodiments, further comprising disposing a diffuser centrally below the diffusive lining at a bottom of the melting furnace.

31. The method according to Embodiment 30, wherein disposing the diffuser comprises positioning to overlap a portion of the diffusive lining at the bottom of the melting furnace.

32. The method according to Embodiment 31, wherein disposing the diffuser comprises contacting the diffusive lining with the diffuser comprising the same material as the diffusive lining.

33. The method according to any one of Embodiments 30-32, wherein one or both of the diffuser and the diffusive lining have a porosity greater than 20%.

34. The method according to any one of Embodiments 30-33, wherein the diffuser has a lateral dimension less than 50% of a lateral dimension of the diffusive lining covering bottom inner surface of the melting furnace.

35. The method according to any one of Embodiments 30-34, wherein the diffuser has a diameter greater than 5 cm and smaller than the diffusive lining covering a bottom inner surface of the melting furnace.

36. The method according to any one of Embodiments 30-35, wherein the diffusive lining covering a bottom inner surface of the melting furnace has a diameter exceeding 50 cm.

37. The method according to any one of Embodiments 30-36, further comprising configuring the melting furnace to melt the copper-based alloy under an enclosed chamber configuration in which an atmosphere above the molten copper-based alloy is isolated from an outside atmosphere.

38. The method according to any one of Embodiments 30-37, further comprising configuring the melting furnace to melt the copper-based alloy under an open chamber configuration in which an atmosphere above the molten copper-based alloy is exposed to an outside atmosphere.

39. The method according to Embodiment 38, further comprising configuring the apparatus to diffusedly flow the inert gas at a flow rate of 2-6 liters per minute under an enclosed chamber configuration.

40. The method according to Embodiment 38, further comprising configuring the apparatus to diffusedly flow the inert gas at a flow rate of 4-13 liters per minute under an open chamber configuration.

41. The method according to any one of the above Embodiments, wherein the melting furnace is an induction furnace comprising a surrounding induction coil configured to melt the copper-based alloy.

42. The method according to Embodiment 41, wherein the induction furnace is configured to operate at a frequency less than 1000 Hz.

43. The method according to Embodiments 41 and 42, wherein a topmost winding of the induction coil is disposed half of a height of the molten copper-based alloy.

44. The method according to any one of the above Embodiments, further comprising connecting an inert gas supply to the diffusive lining.

45. The method according to any one of the above Embodiments, wherein the method is further according to any one of Embodiments in Additional Examples IV.

Additional Examples VI

1. A method of manufacturing a copper-based alloy, the method comprising:
- providing in a melting furnace a feedstock having a composition configured to form a molten copper-based alloy comprising at least 50 weight % copper;
- heating the feedstock to melt the feedstock to form the molten copper-based alloy; and
- bubbling an inert gas into the molten copper-based alloy using a diffusive lining formed on an inner surface of the melting furnace chamber, the diffusive lining comprising an aluminum-silicate ceramic material having a porous structure adapted for bubbling the inert gas through the molten copper-based alloy.

2. A method of manufacturing a copper-based alloy, the method comprising:
- providing in a melting furnace a feedstock having a composition configured to form a molten copper-based alloy comprising at least 50 weight % copper;
- heating the feedstock to melt the feedstock to form the molten copper-based alloy; and
- bubbling an inert gas through the molten copper-based alloy using a diffusive lining formed in the melting furnace chamber, the diffusive lining substantially covering a bottom inner surface of the melting furnace and having a porous structure adapted for bubbling the inert gas into the molten copper-based alloy.

3. A method of manufacturing a copper-based alloy, the method comprising:
- providing in a melting furnace a feedstock having a composition configured to form a molten copper-based alloy comprising at least 50 weight % copper;
- heating the feedstock to melt the feedstock to form the molten copper-based alloy; and
- bubbling an inert gas through the molten copper-based alloy using a diffusive lining having a porous structure, the diffusive lining formed on at least two different inner surfaces of the melting furnace such that the diffusive lining is adapted for bubbling the inert gas into the molten copper-based alloy from the at least two different inner surfaces.

4. The method according to Embodiments 2 or 3, wherein the diffusive lining comprises an aluminum-silicate ceramic.

5. The method according to Embodiments 1 or 3, wherein the diffusive lining substantially covers a bottom inner surface of the melting furnace.

6. The method according to Embodiments 1 or 2, wherein the diffusive lining is formed on at least two different inner surfaces of the melting furnace such that the a diffusive lining is adapted for bubbling an inert gas into the molten copper-based alloy from the at least two different inner surfaces.

7. The method according to any one of the above Embodiments, wherein the diffusive lining comprises alumina and silica.

8. The method according to any one of the above Embodiments, wherein the diffusive lining comprises mullite.

9. The method according to any one of the above Embodiments, wherein the diffusive lining comprises at least two layers comprising a sintered ceramic layer and an unsintered ceramic layer.

10. The method according to Embodiment 9, wherein the sintered ceramic layer comprises mullite.

11. The method according to Embodiment 9, wherein the unsintered ceramic layer comprises alumina and silica.

12. The method according to Embodiment 10, wherein the sintered ceramic layer contacts the molten copper-based alloy.

13. The method according to Embodiment 9, wherein the unsintered layer comprises compacted ceramic powder layer comprising alumina and silica.

14. The method according to Embodiment 9, wherein the sintered ceramic layer is formed by partially sintering a compacted ceramic powder layer such that the sintered layer and the unsintered ceramic layer have substantially the same chemical composition while having different phases.

15. The method according to Embodiment 9, wherein the unsintered ceramic layer comprises 60-70% alumina and 20-25% silica.

16. The method according to Embodiment 9, wherein the unsintered ceramic layer comprises a compacted ceramic powder having an average particle size less than 63 μm or corresponding to number 4 on the $\phi$ scale.

17. The method according to any one of the above Embodiments, wherein the diffusive lining has a thickness of 3-6 inches.

18. The method according to any one of the above Embodiments, wherein the diffusive lining covers an entire bottom inner surface of the melting furnace.

19. The method according to any one of the above Embodiments, wherein the diffusive lining over a bottom inner surface of the melting furnace has a thickness of 4-6 inches.

20. The method according to any one of the above Embodiments, wherein the diffusive lining covers at least a sidewall of the melting furnace.

21. The method according to any one of the above Embodiments, wherein the diffusive lining over a sidewall of the melting furnace has a thickness of 3-4 inches.

22. The method according to any one of the above Embodiments, wherein the diffusive lining is configured to contact the molten copper-based alloy.

23. The method according to any one of the above Embodiments, wherein the inert gas consists essentially of argon.

24. The method according to any one of the above Embodiments, wherein the inert gas is hydrogen-free.

25. The method according to any one of the above Embodiments, further comprising a diffuser centrally disposed below the diffusive lining at a bottom of the melting furnace.

26. The method according to Embodiment 25, wherein the diffuser overlaps a portion of the diffusive lining at the bottom of the melting furnace.

27. The method according to Embodiment 26, wherein the diffuser contacts the diffusive lining and comprises the same material as the diffusive lining.

28. The method according to any one of Embodiments 25-27, wherein one or both of the diffuser and the diffusive lining have a porosity greater than 20%.

29. The method according to any one of Embodiments 25-28, wherein the diffuser has a lateral dimension less than 50% of a lateral dimension of the diffusive lining covering a bottom inner surface of the melting furnace.

30. The method according to any one of Embodiments 25-29, wherein the diffuser has a diameter greater than 5 cm and smaller than the diffusive lining covering a bottom inner surface of the melting furnace.

31. The method according to any one of Embodiments 25-30, wherein the diffusive lining covering a bottom inner surface of the melting furnace has a diameter exceeding 50 cm.

32. The method according to any one of Embodiments 25-31, wherein melting the feedstock comprises melting under an enclosed chamber configuration in which an atmosphere above the molten copper-based alloy is isolated from an outside atmosphere.

33. The method according to any one of Embodiments 25-31, wherein melting the feedstock comprises melting under an open chamber configuration in which an atmosphere above the molten copper-based alloy is exposed to an outside atmosphere.

34. The method according to Embodiment 32, wherein bubbling the inert gas comprises diffusedly flow the inert gas through the diffusive lining at a flow rate of 2-6 liters per minute under an enclosed chamber configuration.

35. The method according to Embodiment 33, wherein bubbling the inert gas comprises diffusedly flow the inert gas through the diffusive lining at a flow rate of 4-13 liters per minute under an open chamber configuration.

36. The method according to any one of the above Embodiments, wherein melting comprises inductively heating the feedstock by supplying power to an induction coil surrounding the melting furnace.

37. The method according to any one of the above Embodiments, wherein providing the feedstock comprises providing a plurality of feedstock pieces having a combined composition configured to form the molten copper-based alloy and flowing the inert gas through gaps between the feedstock pieces prior to heating, wherein heating comprises heating the feedstock pieces while flowing the inert gas therethrough, thereby melting the feedstock pieces to form the molten copper-based alloy, and wherein the method further comprises, after bubbling the inert gas through the molten copper-based alloy, transferring the molten copper-based alloy into a transfer ladle.

38. The method according to any one of Embodiments 1-36, wherein providing the feedstock comprises providing a plurality of feedstock pieces having a combined composition configured to form the molten copper-based alloy and flowing the inert gas through gaps between the feedstock pieces prior to heating, wherein the method further comprises, after bubbling the inert gas through the molten copper-based alloy, transferring the molten copper-based alloy into a transfer ladle, and wherein one or more of heating the feedstock pieces, bubbling the inert gas and transferring the molten copper-based alloy is performed at least partly under an enclosed inert atmosphere configured to substantially exclude outside air from mixing with the enclosed inert atmosphere.

39. The method according to any one of Embodiments 1-36, wherein providing the feedstock comprises providing a plurality of feedstock pieces having a combined composition configured to form the molten copper-based alloy, wherein the method further comprises, after bubbling the inert gas through the molten copper-based alloy, transferring the molten copper-based alloy into a transfer ladle, and wherein transferring comprises limiting a velocity of the molten copper-based alloy that is transferred from the melting furnace to the transfer ladle to less than 100 in/sec.

40. The method according to Embodiments 38 or 39, further comprising, prior to heating, flowing an inert gas through gaps between the feedstock pieces, and wherein heating comprises heating the feedstock pieces while flowing the inert gas therethrough.

41. The method according to Embodiments 37 or 39, wherein one or more of heating the feedstock pieces, bubbling the inert gas and transferring the molten copper-based alloy is performed at least partly under an enclosed inert atmosphere configured to substantially exclude outside air from mixing with the enclosed inert atmosphere.

42. The method according to Embodiments 37 or 38, wherein transferring comprises limiting a velocity of the molten copper-based alloy that is transferred from the melting furnace to the transfer ladle to less than 100 in/sec.

43. The method according to any one of Embodiments 37-42, wherein the method is further according to any one of the methods according to any one of Embodiments 7-30 in Additional Examples—PART II.

44. The method according to any one of the above Embodiments, wherein the melting furnace is an induction furnace comprising a surrounding induction coil configured to melt the copper-based alloy.

45. The method according to Embodiment 44, wherein the induction furnace is configured to operate at a frequency less than 1000 Hz.

46. The method according to Embodiments 44 and 45, wherein a topmost winding of the induction coil is disposed half of a height of the molten copper-based alloy.

47. The method according to any one of the above Embodiments, wherein the method is further according to any one of Embodiments in Additional Examples II.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

In addition, unless otherwise specified, none of the steps of the methods of the present disclosure are confined to any particular order of performance. Modifications of the disclosed examples incorporating the spirit and substance of the disclosure may occur to persons skilled in the art and such modifications are within the scope of the present disclosure. Furthermore, all references cited herein are incorporated by reference in their entirety.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various examples described and the appended claims. Further, the disclosure herein of any particular feature, aspect, method, property, characteristic, quality, attribute, element, or the like in connection with an example can be used in all other examples set forth herein. Any methods disclosed herein need not be performed in the order recited. Depending on the example, one or more acts, events, or functions of any of the algorithms, methods, or processes described herein can be performed in a different sequence, can be added, merged, or left out altogether (e.g., not all described acts or events are necessary for the practice of the method). In some examples, acts or events can be performed concurrently. Further, no element, feature, block, or step, or group of elements, features, blocks, or steps, are necessary or indispensable to each example. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some examples may be performed using the sequence of operations described herein, while other examples may be performed following a different sequence of operations.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Numbers not preceded by a term such as "about" or "approximately" may be understood to based on the circumstances to be as accurate as reasonably possible under the circumstances, for example ±5%, ±10%, ±15%, etc. For example, "1 V" includes "0.9-1.1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure. The phrase "at least one of" is intended to require at least one item from the subsequent listing, not one type of each item from each item in the subsequent listing. For example, "at least one of A, B, and C" can include A, B, C, A and B, A and C, B and C, or A, B, and C.

What is claimed is:

1. A method of manufacturing a copper-based alloy, the method comprising:

providing in a melting furnace a feedstock in a solid phase and having a composition configured to form a molten copper-based alloy comprising at least 50 weight % copper and less than 5 weight % iron;

melting the feedstock in the melting furnace while flowing an inert gas through the feedstock to form the molten copper-based alloy under a substantially inert atmosphere; and bubbling the inert gas into the molten copper-based alloy using a diffusive lining formed on an inner surface of the melting furnace, the diffusive lining comprising an aluminum-silicate ceramic material directly contacting the molten copper-based alloy and having a porous structure adapted for bubbling the inert gas through the molten copper-based alloy.

2. The method according to claim 1, wherein the inert gas consists essentially of argon.

3. The method according to claim 2, wherein the inert gas is hydrogen-free.

4. The method according to claim 1, wherein the diffusive lining substantially covers at least a bottom inner surface of the melting furnace.

5. The method according to claim 1, wherein the diffusive lining comprises at least two layers comprising a sintered ceramic layer and an unsintered ceramic layer.

6. The method according to claim 5, wherein the sintered ceramic layer comprises mullite.

7. The method according to claim 5, wherein the unsintered ceramic layer comprises alumina and silica.

8. The method according to claim 5, wherein the sintered ceramic layer and the unsintered ceramic layer have substantially a same chemical composition while having different phases.

9. The method according to claim 1, wherein providing the feedstock comprises providing a plurality of feedstock pieces having a combined composition configured to form the molten copper-based alloy, the method further comprising, prior to melting the feedstock by heating, flowing the inert gas through gaps between the feedstock pieces.

10. The method according to claim 9, wherein heating comprises heating the feedstock pieces while flowing the inert gas therethrough, thereby melting the feedstock pieces to form the molten copper-based alloy.

11. A method of manufacturing a copper-based alloy, the method comprising:

providing in a melting furnace a feedstock in a solid phase and having a composition configured to form a molten copper-based alloy comprising at least 50 weight % copper and less than 5 weight % iron;

melting the feedstock in the melting furnace while flowing an inert gas through the feedstock to form the molten copper-based alloy under a substantially inert atmosphere; and bubbling the inert gas through the molten copper-based alloy using a diffusive lining formed in the melting furnace, the diffusive lining substantially covering a bottom inner surface of the melting furnace and having a porous structure adapted for bubbling the inert gas into the molten copper-based alloy, wherein bubbling comprises diffusing the inert gas through a ceramic material of the diffusive lining directly contacting the molten copper-based alloy.

12. The method according to claim 11, wherein the inert gas consists essentially of argon.

13. The method according to claim 11, wherein providing the feedstock comprises providing a plurality of feedstock pieces having a combined composition configured to form the molten copper-based alloy, the method further comprising, prior to melting the feedstock by heating, flowing the inert gas through gaps between the feedstock pieces.

14. The method according to claim 13, wherein heating comprises heating the feedstock pieces while flowing the inert gas therethrough, thereby melting the feedstock pieces to form the molten copper-based alloy.

15. The method according to claim 13, wherein bubbling the inert gas through the molten copper-based alloy comprises flowing the inert gas through a diffuser embedded within the diffusive lining covering the bottom inner surface of the melting furnace, prior to flowing the inert gas through the diffusive lining.

16. The method according to claim 15, wherein the diffuser and the diffusive lining comprise a same diffuser material, and wherein the diffuser comprises a diffuser material disposed within a container connected to an inert gas source.

17. The method according to claim 15, wherein the diffusive lining further covers a sidewall inner surface of the melting furnace.

18. The method according to claim 11, wherein the diffusive lining comprises at least two layers comprising a sintered ceramic layer and an unsintered ceramic layer.

19. The method according to claim 18, wherein the unsintered ceramic layer comprises alumina and silica.

20. The method according to claim 18, wherein the sintered ceramic layer comprises mullite.

21. A method of manufacturing a copper-based alloy, the method comprising:

providing in a melting furnace a feedstock in a solid phase and having a composition configured to form a molten copper-based alloy comprising at least 50 weight % copper and less than 5 weight % iron;

melting the feedstock in the melting furnace while flowing an inert gas through the feedstock to form the molten copper-based alloy under a substantially inert atmosphere; and bubbling the inert gas through the molten copper-based alloy using a diffusive lining having a porous structure, the diffusive lining formed on at least two different inner surfaces of the melting furnace such that the diffusive lining is adapted for bubbling the inert gas into the molten copper-based alloy through the at least two different inner surfaces, wherein bubbling comprises diffusing the inert gas through a ceramic material of the diffusive lining directly contacting the molten copper-based alloy.

22. The method according to claim 21, wherein providing the feedstock comprises providing a plurality of feedstock pieces having a combined composition configured to form the molten copper-based alloy, the method further comprising, prior to melting the feedstock by heating, flowing the inert gas through gaps between the feedstock pieces.

23. The method according to claim 22, wherein heating comprises heating the feedstock pieces while flowing the inert gas therethrough, thereby melting the feedstock pieces to form the molten copper-based alloy.

24. The method according to claim 21, wherein the at least two different inner surfaces comprises a bottom inner surface and a sidewall inner surface.

25. The method according to claim 24, wherein bubbling the inert gas further comprises diffusing the inert through a diffuser centrally disposed within the diffusive lining at the bottom inner surface, the diffuser comprising a diffuser material disposed within a container connected to an inert gas source and having an upper surface disposed below an upper surface of the diffusive lining covering the bottom inner surface.

26. The method according to claim 25, wherein bubbling the inert gas comprises diffusing the inert gas through the diffuser, the diffusive lining disposed on the bottom inner surface, and the diffusive lining on the sidewall inner surface.

27. The method according to claim 26, wherein one or both of the diffuser and the diffusive lining have a porosity greater than 20%.

28. The method according to claim 21, wherein the melting furnace is configured to melt the copper-based alloy under an open chamber configuration in which the inert gas is flown at a sufficiently high flow rate with the feedstock provided therein, such that the substantially inert atmosphere above the molten copper-based alloy is maintained during and after melting the feedstock without physically enclosing the melting furnace.

29. The method according to claim 21, wherein the melting furnace is an induction furnace comprising induction coil surrounding the melting furnace and configured to melt the feedstock.

30. The method according to claim 29, wherein the induction furnace is configured to operate at a frequency less than 1000 Hz.

* * * * *